United States Patent
Pham et al.

(10) Patent No.: US 12,311,308 B2
(45) Date of Patent: *May 27, 2025

(54) PARTICULATE-MATTER-SIZE-BASED FAN CONTROL SYSTEM

(71) Applicant: Copeland LP, Sidney, OH (US)

(72) Inventors: Hung M. Pham, Dayton, OH (US); Stuart K. Morgan, West Chester, OH (US); Brian R. Butler, Centerville, OH (US)

(73) Assignee: Copeland LP, Sidney, OH (US)

( * ) Notice: Subject to any disclaimer, the term of this patent is extended or adjusted under 35 U.S.C. 154(b) by 1122 days.

This patent is subject to a terminal disclaimer.

(21) Appl. No.: 17/048,866

(22) PCT Filed: Apr. 19, 2019

(86) PCT No.: PCT/US2019/028398
§ 371 (c)(1),
(2) Date: Oct. 19, 2020

(87) PCT Pub. No.: WO2019/204785
PCT Pub. Date: Oct. 24, 2019

(65) Prior Publication Data
US 2021/0236979 A1  Aug. 5, 2021

Related U.S. Application Data

(60) Provisional application No. 62/660,896, filed on Apr. 20, 2018, provisional application No. 62/660,890, (Continued)

(51) Int. Cl.
*B01D 46/00* (2022.01)
*B01D 46/44* (2006.01)
(Continued)

(52) U.S. Cl.
CPC ......... *B01D 46/46* (2013.01); *B01D 46/0086* (2013.01); *B01D 46/442* (2013.01);
(Continued)

(58) Field of Classification Search
CPC ...... F24F 11/0017; F24F 11/0086; F24F 3/14; F24F 3/16; B01D 53/30
(Continued)

(56) References Cited

U.S. PATENT DOCUMENTS

| 4,135,370 A | 1/1979 | Hosoda et al. |
| 4,136,529 A | 1/1979 | McCarty |

(Continued)

FOREIGN PATENT DOCUMENTS

| CN | 102019120 A | 4/2011 |
| CN | 102353751 A | 2/2012 |

(Continued)

OTHER PUBLICATIONS

Notice of Allowance regarding U.S. Appl. No. 17/078,031 dated Feb. 22, 2022.
(Continued)

*Primary Examiner* — Minh Chau T Pham
(74) *Attorney, Agent, or Firm* — Harness, Dickey & Pierce, P.L.C.

(57) ABSTRACT

A control system for a mitigation device includes a processor and a computer-readable medium that includes instructions executable by the processor. The instructions include monitoring a first measured particulate matter (PM) level of a conditioned space. The first measured PM level includes PM having a first range of sizes. The instructions further include monitoring a second measured PM level of the conditioned space. The second measured PM level includes PM having a second range of sizes. The first and second ranges are different but overlapping. The instructions also (Continued)

include asserting, in response to the first measured PM level being greater than a first predetermined threshold, an activation signal. The activation signal forces operation of a fan of the mitigation device. The instructions include asserting, in response to the second measured PM level being greater than a predetermined percentage of the first measured PM level, the activation signal.

20 Claims, 25 Drawing Sheets

Related U.S. Application Data filed on Apr. 20, 2018, provisional application No. 62/660,900, filed on Apr. 20, 2018.

(51) Int. Cl.
  B01D 46/46 (2006.01)
  B01D 53/04 (2006.01)
  B01D 53/30 (2006.01)
  F24F 11/30 (2018.01)
  F24F 11/64 (2018.01)
  F24F 110/64 (2018.01)

(52) U.S. Cl.
  CPC .......... B01D 46/444 (2013.01); B01D 53/04 (2013.01); B01D 53/30 (2013.01); F24F 11/30 (2018.01); F24F 11/64 (2018.01); B01D 2253/102 (2013.01); B01D 2253/104 (2013.01); B01D 2253/108 (2013.01); B01D 2257/708 (2013.01); B01D 2259/4508 (2013.01); B01D 2273/30 (2013.01); B01D 2279/50 (2013.01); F24F 2110/64 (2018.01)

(58) Field of Classification Search
  USPC .......................................... 55/385.2; 454/187
  See application file for complete search history.

(56) References Cited

U.S. PATENT DOCUMENTS

| | | | |
|---|---|---|---|
| 4,735,054 A | 4/1988 | Beckey |
| 4,922,808 A | 5/1990 | Smith |
| 4,977,818 A | 12/1990 | Taylor et al. |
| 5,067,394 A | 11/1991 | Cavallero |
| 5,129,234 A | 7/1992 | Alford |
| 5,259,553 A | 11/1993 | Shyu |
| 5,267,897 A | 12/1993 | Drees |
| 5,303,561 A | 4/1994 | Bahel et al. |
| 5,351,855 A | 10/1994 | Nelson et al. |
| 5,394,934 A | 3/1995 | Rein et al. |
| 5,428,964 A | 7/1995 | Lobdell |
| 5,598,715 A | 2/1997 | Edmisten |
| 5,707,005 A | 1/1998 | Kettler et al. |
| 5,832,411 A | 11/1998 | Schatzmann et al. |
| 5,887,784 A | 3/1999 | Haas |
| 5,892,690 A | 4/1999 | Boatman et al. |
| 5,904,896 A | 5/1999 | High |
| 6,161,764 A | 12/2000 | Jatnieks |
| 6,187,263 B1 | 2/2001 | Nielsen |
| 6,230,980 B1 | 5/2001 | Hudson |
| 6,251,344 B1 | 6/2001 | Goldstein |
| 6,288,646 B1 | 9/2001 | Skardon |
| 6,358,374 B1 | 3/2002 | Obee et al. |
| 6,369,716 B1 | 4/2002 | Abbas et al. |
| 6,377,858 B1 | 4/2002 | Koeppe |
| 6,391,102 B1 | 5/2002 | Bodden et al. |
| 6,392,536 B1 | 5/2002 | Tice et al. |
| 6,394,427 B1 | 5/2002 | Guetersloh et al. |
| 6,406,367 B1 | 6/2002 | Chou et al. |
| 6,406,506 B1 | 6/2002 | Moredock et al. |
| 6,423,118 B1 | 7/2002 | Becerra et al. |
| 6,448,896 B1 | 9/2002 | Bankus et al. |
| 6,466,133 B1 | 10/2002 | Skardon |
| 6,493,638 B1 | 12/2002 | McLean et al. |
| 6,494,053 B1 | 12/2002 | Forkosh et al. |
| 6,494,940 B1 | 12/2002 | Hak |
| 6,503,462 B1 | 1/2003 | Michalakos et al. |
| 6,557,365 B2 | 5/2003 | Dinnage et al. |
| 6,578,770 B1 | 6/2003 | Rosen |
| 6,582,295 B1 | 6/2003 | Abouchaar |
| 6,588,250 B2 | 7/2003 | Schell |
| 6,622,993 B2 | 9/2003 | Mulvaney |
| 6,691,526 B2 | 2/2004 | Gether et al. |
| 6,698,219 B2 | 3/2004 | Sekhar et al. |
| 6,711,470 B1 | 3/2004 | Hartenstein et al. |
| 6,752,713 B2 | 6/2004 | Johnson, Jr. |
| 6,790,136 B2 | 9/2004 | Sharp et al. |
| 6,826,920 B2 | 12/2004 | Wacker |
| 6,843,068 B1 | 1/2005 | Wacker |
| 6,848,266 B1 | 2/2005 | Sheehan |
| 6,884,399 B2 | 4/2005 | Reisfeld et al. |
| 6,898,960 B1 | 5/2005 | Bodnar |
| 6,902,592 B2 | 6/2005 | Green et al. |
| 6,916,239 B2 | 7/2005 | Siddaramanna et al. |
| 6,919,809 B2 | 7/2005 | Blunn et al. |
| 6,920,874 B1 | 7/2005 | Siegel |
| 6,924,326 B2 | 8/2005 | Meyer et al. |
| 6,926,079 B2 | 8/2005 | Kensok et al. |
| 6,941,193 B2 | 9/2005 | Frecska et al. |
| 6,952,715 B1 | 10/2005 | Kronz |
| 7,016,791 B2 | 3/2006 | Carnegie et al. |
| 7,048,776 B2 | 5/2006 | Moore et al. |
| 7,059,400 B2 | 6/2006 | Sekhar et al. |
| 7,114,343 B2 | 10/2006 | Kates |
| 7,151,264 B2 | 12/2006 | Ehlers, Sr. |
| 7,178,350 B2 | 2/2007 | Shah |
| 7,186,290 B2 | 3/2007 | Sheehan et al. |
| 7,222,494 B2 | 5/2007 | Peterson et al. |
| 7,241,326 B2 | 7/2007 | Han et al. |
| 7,253,743 B2 | 8/2007 | Liang et al. |
| 7,255,831 B2 | 8/2007 | Wei et al. |
| 7,261,762 B2 | 8/2007 | Kang et al. |
| 7,266,960 B2 | 9/2007 | Shah |
| 7,267,017 B1 | 9/2007 | Bodnar |
| RE39,871 E | 10/2007 | Skardon |
| 7,291,206 B1 | 11/2007 | Kiern et al. |
| 7,291,315 B2 | 11/2007 | Obee et al. |
| 7,302,313 B2 | 11/2007 | Sharp et al. |
| 7,306,650 B2 | 12/2007 | Slayzak et al. |
| 7,325,748 B2 | 2/2008 | Acker, Jr. |
| 7,326,388 B2 | 2/2008 | Uslenghi et al. |
| 7,357,828 B2 | 4/2008 | Bohlen |
| 7,366,588 B2 | 4/2008 | Kim et al. |
| 7,368,003 B2 | 5/2008 | Crapser et al. |
| 7,369,955 B2 | 5/2008 | Lee |
| 7,378,064 B2 | 5/2008 | Uslenghi et al. |
| 7,381,244 B2 | 6/2008 | Tyndall et al. |
| 7,389,158 B2 | 6/2008 | Desrochers et al. |
| 7,398,821 B2 | 7/2008 | Rainer et al. |
| 7,407,624 B2 | 8/2008 | Cumberland et al. |
| 7,413,594 B2 | 8/2008 | Paterson et al. |
| 7,434,413 B2 | 10/2008 | Wruck |
| 7,475,828 B2 | 1/2009 | Bartlett et al. |
| 7,552,030 B2 | 6/2009 | Guralnik et al. |
| 7,552,635 B2 | 6/2009 | Chang et al. |
| 7,574,871 B2 | 8/2009 | Bloemer et al. |
| 7,621,985 B1 | 11/2009 | Kuo |
| 7,632,178 B2 | 12/2009 | Meneely, Jr. |
| 7,632,340 B2 | 12/2009 | Brady et al. |
| 7,635,845 B2 | 12/2009 | Jensen et al. |
| 7,645,323 B2 | 1/2010 | Massenbauer-Strafe et al. |
| 7,651,256 B2 | 1/2010 | Lee et al. |
| 7,721,560 B2 | 5/2010 | Carpenter |
| 7,740,184 B2 | 6/2010 | Schnell et al. |
| 7,748,639 B2 | 7/2010 | Perry |
| 7,758,408 B2 | 7/2010 | Hagentoft |
| 7,765,792 B2 | 8/2010 | Rhodes et al. |
| 7,780,092 B2 | 8/2010 | Ahmed |
| 7,789,951 B2 | 9/2010 | Sung et al. |
| 7,811,363 B2 | 10/2010 | Zhang |

(56) References Cited

U.S. PATENT DOCUMENTS

| | | |
|---|---|---|
| 7,836,712 B2 | 11/2010 | Sasao et al. |
| 7,837,958 B2 | 11/2010 | Crapser et al. |
| 7,839,275 B2 | 11/2010 | Spalink et al. |
| 7,857,884 B2 | 12/2010 | Bohlen |
| 7,857,890 B2 | 12/2010 | Paterson et al. |
| 7,918,407 B2 | 4/2011 | Patch |
| 7,932,490 B2 | 4/2011 | Wang et al. |
| 7,938,896 B2 | 5/2011 | Paterson et al. |
| 7,951,327 B2 | 5/2011 | Reisfeld et al. |
| 7,966,104 B2 | 6/2011 | Srivastava et al. |
| 7,979,163 B2 | 7/2011 | Terlson et al. |
| 8,024,982 B2 | 9/2011 | Pettit et al. |
| 8,024,986 B2 | 9/2011 | Pettit et al. |
| 8,066,558 B2 | 11/2011 | Thomle et al. |
| 8,079,575 B2 | 12/2011 | Novotny et al. |
| 8,083,398 B2 | 12/2011 | Doll |
| 8,086,407 B2 | 12/2011 | Chan et al. |
| 8,097,067 B2 | 1/2012 | Fox et al. |
| 8,118,236 B2 | 2/2012 | Lestage et al. |
| 8,147,302 B2 | 4/2012 | Desrochers et al. |
| 8,172,154 B1 | 5/2012 | Figley et al. |
| 8,190,367 B2 | 5/2012 | Bassa |
| 8,219,249 B2 | 7/2012 | Harrod et al. |
| 8,231,112 B2 | 7/2012 | Cao et al. |
| 8,231,716 B2 | 7/2012 | Poon |
| 8,239,066 B2 | 8/2012 | Jennings et al. |
| 8,267,164 B2 | 9/2012 | Lestage et al. |
| 8,292,270 B2 | 10/2012 | Terlson et al. |
| 8,318,084 B2 | 11/2012 | Johnson et al. |
| 8,328,910 B2 | 12/2012 | Mulholland |
| 8,333,816 B2 | 12/2012 | Kummer et al. |
| 8,335,593 B2 | 12/2012 | Johnson et al. |
| 8,347,643 B2 | 1/2013 | Taras et al. |
| 8,392,025 B2 | 3/2013 | Orfield |
| 8,397,522 B2 | 3/2013 | Springer et al. |
| 8,398,917 B2 | 3/2013 | Itzhak et al. |
| 8,398,923 B2 | 3/2013 | Mole |
| 8,402,815 B2 | 3/2013 | Marra |
| 8,423,192 B2 | 4/2013 | Liu |
| 8,428,901 B2 | 4/2013 | Hsieh |
| 8,442,694 B2 | 5/2013 | Jang |
| 8,467,977 B2 | 6/2013 | Xia et al. |
| 8,473,429 B2 | 6/2013 | Cheng et al. |
| 8,479,560 B2 | 7/2013 | Cobianu et al. |
| 8,492,722 B2 | 7/2013 | Chang et al. |
| 8,496,514 B2 | 7/2013 | Kim et al. |
| 8,496,735 B2 | 7/2013 | Jones et al. |
| 8,529,830 B2 | 9/2013 | Zhou et al. |
| 8,544,288 B2 | 10/2013 | MacDonald |
| 8,554,375 B2 | 10/2013 | Nerling |
| 8,555,662 B2 | 10/2013 | Peterson et al. |
| 8,560,126 B2 | 10/2013 | Vass et al. |
| 8,567,204 B2 | 10/2013 | Seem |
| 8,574,343 B2 | 11/2013 | Bisson et al. |
| 8,615,327 B2 | 12/2013 | Takagi et al. |
| 8,640,970 B2 | 2/2014 | Dorendorf |
| 8,651,391 B2 | 2/2014 | Patch |
| 8,683,845 B2 | 4/2014 | Fleischer et al. |
| 8,689,572 B2 | 4/2014 | Evans et al. |
| 8,691,144 B2 | 4/2014 | Garfield et al. |
| 8,696,800 B2 | 4/2014 | Storm |
| 8,700,227 B2 | 4/2014 | Vass et al. |
| 8,726,721 B2 | 5/2014 | Minges |
| 8,734,565 B2 | 5/2014 | Hoglund et al. |
| 8,744,629 B2 | 6/2014 | Wallaert et al. |
| 8,755,942 B2 | 6/2014 | Bonilla et al. |
| 8,757,154 B2 | 6/2014 | Schuller |
| 8,758,262 B2 | 6/2014 | Rhee et al. |
| 8,761,945 B2 | 6/2014 | Hadzidedic |
| 8,768,521 B2 | 7/2014 | Amundson et al. |
| 8,797,159 B2 | 8/2014 | Kirkpatrick et al. |
| 8,813,583 B2 | 8/2014 | Kilps et al. |
| 8,838,037 B2 | 9/2014 | Niederberger et al. |
| 8,852,501 B2 | 10/2014 | Hedman |
| 8,860,569 B2 | 10/2014 | Hruska et al. |
| 8,880,224 B2 | 11/2014 | Eaton et al. |
| 8,883,083 B2 | 11/2014 | Law et al. |
| 8,886,785 B2 | 11/2014 | Apte et al. |
| 8,889,079 B2 | 11/2014 | Zahedi |
| 8,892,797 B2 | 11/2014 | Grohman |
| 8,899,055 B2 | 12/2014 | Kuenzel et al. |
| 8,900,518 B2 | 12/2014 | Seck |
| 8,907,803 B2 | 12/2014 | Martin |
| 8,920,537 B2 | 12/2014 | Seike |
| 8,922,971 B2 | 12/2014 | Abate et al. |
| 8,930,030 B2 | 1/2015 | Bester et al. |
| 8,955,761 B2 | 2/2015 | Malloy |
| 8,958,918 B2 | 2/2015 | Voysey |
| 8,961,881 B2 | 2/2015 | Hagh et al. |
| 8,963,728 B2 | 2/2015 | Kates |
| 8,973,845 B2 | 3/2015 | Kanaya et al. |
| 8,978,445 B2 | 3/2015 | Bergsten |
| 8,986,427 B2 | 3/2015 | Hauville et al. |
| 9,010,172 B2 | 4/2015 | Xia et al. |
| 9,019,111 B1 | 4/2015 | Sloo et al. |
| 9,023,304 B2 | 5/2015 | Nikles |
| 9,040,007 B2 | 5/2015 | Hui et al. |
| 9,040,008 B2 | 5/2015 | Zahedi |
| 9,061,230 B2 | 6/2015 | Barakat |
| 9,073,009 B2 | 7/2015 | Vanderspurt et al. |
| 9,078,082 B2 | 7/2015 | Gill et al. |
| 9,080,784 B2 | 7/2015 | Dean-Hendricks et al. |
| 9,091,497 B2 | 7/2015 | Schwendinger et al. |
| 9,092,040 B2 | 7/2015 | Fadell et al. |
| 9,095,636 B2 | 8/2015 | Schmidt et al. |
| 9,097,432 B2 | 8/2015 | Kreft et al. |
| 9,101,904 B2 | 8/2015 | Yates et al. |
| 9,103,557 B2 | 8/2015 | Choi et al. |
| 9,109,981 B2 | 8/2015 | Sharp |
| 9,109,989 B2 | 8/2015 | Hamann et al. |
| 9,121,618 B2 | 9/2015 | Fisher et al. |
| 9,121,837 B2 | 9/2015 | Chan et al. |
| 9,143,344 B2 | 9/2015 | Cho et al. |
| 9,157,647 B2 | 10/2015 | Leen et al. |
| 9,164,519 B2 | 10/2015 | Holloway |
| 9,166,992 B1 | 10/2015 | Stickle et al. |
| 9,175,872 B2 | 11/2015 | McKie et al. |
| 9,182,751 B1 | 11/2015 | Reeder |
| 9,186,609 B2 | 11/2015 | Sherman, III et al. |
| 9,200,804 B2 | 12/2015 | Park et al. |
| 9,208,676 B2 | 12/2015 | Fadell et al. |
| 9,234,667 B2 | 1/2016 | Ito et al. |
| 9,250,633 B2 | 2/2016 | Chen et al. |
| 9,254,459 B2 | 2/2016 | Miller |
| 9,261,290 B2 | 2/2016 | Storm |
| 9,278,304 B2 | 3/2016 | Lee |
| 9,280,884 B1 | 3/2016 | Schultz et al. |
| 9,286,779 B2 | 3/2016 | Shaw et al. |
| 9,304,511 B2 | 4/2016 | Blount et al. |
| 9,304,521 B2 | 4/2016 | Kates |
| 9,308,492 B2 | 4/2016 | Obee et al. |
| 9,310,088 B2 | 4/2016 | Melikov et al. |
| 9,311,807 B2 | 4/2016 | Schultz et al. |
| 9,316,410 B2 | 4/2016 | Meirav et al. |
| 9,317,659 B2 | 4/2016 | Balinski et al. |
| 9,323,895 B2 | 4/2016 | Balinski et al. |
| 9,325,516 B2 | 4/2016 | Pera et al. |
| 9,328,936 B2 | 5/2016 | Meirav et al. |
| 9,332,322 B2 | 5/2016 | Niemeyer et al. |
| 9,344,753 B2 | 5/2016 | Yerli |
| 9,347,678 B2 | 5/2016 | Stakutis et al. |
| 9,347,860 B1 | 5/2016 | Lalain et al. |
| 9,347,925 B2 | 5/2016 | Shen et al. |
| 9,353,964 B2 | 5/2016 | Kates |
| 9,353,966 B2 | 5/2016 | Finkam |
| 9,360,229 B2 | 6/2016 | Modi et al. |
| 9,366,448 B2 | 6/2016 | Dean-Hendricks et al. |
| 9,372,010 B2 | 6/2016 | Jung et al. |
| 9,375,672 B2 | 6/2016 | Meirav et al. |
| 9,377,768 B2 | 6/2016 | Grohman |
| 9,390,388 B2 | 7/2016 | Drees et al. |
| 9,395,096 B2 | 7/2016 | Fisher et al. |
| 9,399,187 B2 | 7/2016 | Meirav et al. |
| 9,400,119 B2 | 7/2016 | Malloy |

(56) References Cited

U.S. PATENT DOCUMENTS

| | | |
|---|---|---|
| 9,404,666 B2 | 8/2016 | Terlson et al. |
| 9,405,301 B2 | 8/2016 | Montero et al. |
| 9,410,752 B2 | 8/2016 | Wallace |
| 9,416,987 B2 | 8/2016 | Ragland et al. |
| 9,417,005 B1 | 8/2016 | Roth et al. |
| 9,417,637 B2 | 8/2016 | Matsuoka et al. |
| 9,423,144 B2 | 8/2016 | Evans et al. |
| 9,423,146 B2 | 8/2016 | Bruce et al. |
| 9,427,728 B2 | 8/2016 | Sidheswaran et al. |
| 9,449,491 B2 | 9/2016 | Sager et al. |
| 9,459,606 B2 | 10/2016 | Takayama et al. |
| 9,463,339 B2 | 10/2016 | Nozaki |
| 9,464,818 B2 | 10/2016 | Holm et al. |
| 9,498,555 B2 | 11/2016 | Hingorani et al. |
| 9,520,250 B2 | 12/2016 | O'Keeffe |
| 9,522,210 B2 | 12/2016 | Worrilow |
| 9,523,665 B2 | 12/2016 | Fleischer et al. |
| 9,535,407 B2 | 1/2017 | Durham et al. |
| 9,537,670 B2 | 1/2017 | Cho et al. |
| 9,557,069 B2 | 1/2017 | Matsui et al. |
| 9,568,445 B2 | 2/2017 | Klein et al. |
| 9,593,859 B2 | 3/2017 | Niazi |
| 9,593,861 B1 | 3/2017 | Burnett |
| 9,597,627 B2 | 3/2017 | Zhang |
| 9,599,353 B2 | 3/2017 | Cur et al. |
| 9,599,357 B2 | 3/2017 | Vogel |
| 9,612,188 B2 | 4/2017 | Johnston et al. |
| 9,618,224 B2 | 4/2017 | Emmons et al. |
| 9,638,434 B2 | 5/2017 | Alston |
| 9,638,436 B2 | 5/2017 | Arensmeier et al. |
| 9,643,117 B2 | 5/2017 | Rahlin et al. |
| 9,645,112 B2 | 5/2017 | Chan |
| 9,677,777 B2 | 6/2017 | Karamanos et al. |
| 9,694,309 B2 | 7/2017 | Weatherman et al. |
| 9,696,049 B2 | 7/2017 | Metteer |
| 9,696,735 B2 | 7/2017 | Matsuoka et al. |
| 9,709,291 B2 | 7/2017 | Dostmann |
| 9,714,844 B1 | 7/2017 | Stamatakis et al. |
| 9,715,242 B2 | 7/2017 | Pillai et al. |
| 9,723,380 B2 | 8/2017 | Patel et al. |
| 9,726,579 B2 | 8/2017 | Han et al. |
| 9,729,945 B2 | 8/2017 | Schultz et al. |
| 9,737,842 B2 | 8/2017 | Matlin et al. |
| 9,752,789 B2 | 9/2017 | Staniforth et al. |
| 9,759,437 B2 | 9/2017 | Kim et al. |
| 9,764,623 B2 * | 9/2017 | Fruehsorger ....... B60H 1/00985 |
| 9,789,436 B2 | 10/2017 | Meirav et al. |
| 9,797,620 B2 | 10/2017 | Matsugi et al. |
| 9,797,812 B2 | 10/2017 | Hamann et al. |
| 9,803,877 B2 | 10/2017 | Yun |
| 9,810,441 B2 | 11/2017 | Dean-Hendricks et al. |
| 9,816,724 B2 | 11/2017 | Phannavong et al. |
| 9,821,260 B2 | 11/2017 | Stoner, Jr. et al. |
| 9,833,734 B2 | 12/2017 | Fox et al. |
| 9,835,348 B2 | 12/2017 | Storm et al. |
| 9,839,872 B2 | 12/2017 | Spartz |
| 9,851,299 B2 | 12/2017 | Bertaux |
| 9,854,335 B2 | 12/2017 | Patel et al. |
| 9,856,883 B1 | 1/2018 | Olsen |
| 9,857,301 B1 | 1/2018 | Nourbakhsh et al. |
| 9,890,969 B2 | 2/2018 | Martin |
| 9,986,313 B2 | 5/2018 | Schwarzkopf et al. |
| 9,990,842 B2 | 6/2018 | Zribi et al. |
| 10,976,065 B2 * | 4/2021 | Kohn ................ B01D 46/0086 |
| 11,371,726 B2 * | 6/2022 | Pham ..................... F24F 3/16 |
| 11,543,147 B1 | 1/2023 | Rite |
| 2001/0045159 A1 | 11/2001 | Johnson et al. |
| 2003/0070544 A1 | 4/2003 | Mulvaney et al. |
| 2004/0006886 A1 * | 1/2004 | Lee ..................... D06F 58/22 |
| | | 34/82 |
| 2004/0109800 A1 | 6/2004 | Pahlman et al. |
| 2005/0098495 A1 | 5/2005 | Hughes |
| 2005/0277381 A1 | 12/2005 | Banerjee et al. |
| 2006/0055547 A1 | 3/2006 | DiMaggio |
| 2006/0267756 A1 | 11/2006 | Kates |
| 2007/0013534 A1 | 1/2007 | DiMaggio |
| 2007/0082601 A1 | 4/2007 | Desrochers et al. |
| 2007/0155305 A1 | 7/2007 | Heidel et al. |
| 2008/0014857 A1 | 1/2008 | Spadafora et al. |
| 2008/0022705 A1 | 1/2008 | Clearman |
| 2008/0182506 A1 | 7/2008 | Jackson et al. |
| 2009/0079098 A1 | 3/2009 | Ezra |
| 2009/0126382 A1 | 5/2009 | Rubino et al. |
| 2009/0179338 A1 | 7/2009 | Cottier |
| 2009/0204262 A1 | 8/2009 | Nishimura |
| 2011/0010071 A1 | 1/2011 | Rhodes et al. |
| 2011/0052453 A1 | 3/2011 | McLarnon et al. |
| 2011/0125044 A1 | 5/2011 | Rhee et al. |
| 2011/0151766 A1 | 6/2011 | Sherman et al. |
| 2011/0184250 A1 | 7/2011 | Schmidt et al. |
| 2012/0095684 A1 | 4/2012 | Chan et al. |
| 2012/0323374 A1 | 12/2012 | Dean-Hendricks et al. |
| 2013/0014522 A1 | 1/2013 | Lukasse et al. |
| 2013/0144527 A1 | 6/2013 | Kuhnreichi |
| 2013/0226352 A1 | 8/2013 | Dean-Hendricks et al. |
| 2013/0287626 A1 | 10/2013 | Benedek et al. |
| 2013/0289778 A1 | 10/2013 | Ishizaka |
| 2013/0323781 A1 | 12/2013 | Moularat et al. |
| 2013/0344609 A1 | 12/2013 | Mayer et al. |
| 2014/0020559 A1 | 1/2014 | Meirav et al. |
| 2014/0053586 A1 | 2/2014 | Poecher et al. |
| 2014/0079564 A1 | 3/2014 | Becerra et al. |
| 2014/0083292 A1 | 3/2014 | Weiden |
| 2014/0109649 A1 | 4/2014 | Fleischer et al. |
| 2014/0129004 A1 | 5/2014 | Takayama et al. |
| 2014/0139342 A1 | 5/2014 | Brown |
| 2014/0190679 A1 | 7/2014 | Roosli et al. |
| 2014/0207693 A1 | 7/2014 | Horst et al. |
| 2014/0217185 A1 | 8/2014 | Bicknell |
| 2014/0241970 A1 | 8/2014 | Smyrniotis et al. |
| 2014/0244043 A1 | 8/2014 | Foster |
| 2014/0262837 A1 | 9/2014 | Sidheswaran et al. |
| 2014/0266755 A1 | 9/2014 | Arensmeier et al. |
| 2014/0313048 A1 | 10/2014 | Sabata et al. |
| 2014/0346237 A1 | 11/2014 | Mirza et al. |
| 2014/0354976 A1 | 12/2014 | Evenstad et al. |
| 2014/0365017 A1 | 12/2014 | Hanna et al. |
| 2014/0370800 A1 | 12/2014 | Ansari |
| 2015/0011154 A1 | 1/2015 | Holm et al. |
| 2015/0032264 A1 | 1/2015 | Emmons et al. |
| 2015/0046179 A1 | 2/2015 | Kang |
| 2015/0050876 A1 | 2/2015 | Sakai et al. |
| 2015/0052975 A1 | 2/2015 | Martin |
| 2015/0077737 A1 | 3/2015 | Belinsky et al. |
| 2015/0088786 A1 | 3/2015 | Anandhakrishnan |
| 2015/0140919 A1 | 5/2015 | Zwijack |
| 2015/0153061 A1 | 6/2015 | Riberon et al. |
| 2015/0153317 A1 | 6/2015 | Krebs |
| 2015/0168003 A1 | 6/2015 | Stefanski et al. |
| 2015/0168964 A1 | 6/2015 | Wu et al. |
| 2015/0202563 A1 | 7/2015 | Spartz |
| 2015/0241318 A1 | 8/2015 | Hamann et al. |
| 2015/0246150 A1 | 9/2015 | De Koster et al. |
| 2015/0256355 A1 | 9/2015 | Pera et al. |
| 2015/0285524 A1 | 10/2015 | Saunders |
| 2015/0285755 A1 | 10/2015 | Moss et al. |
| 2015/0289802 A1 | 10/2015 | Thomas et al. |
| 2015/0298043 A1 | 10/2015 | Meirav et al. |
| 2015/0301513 A1 | 10/2015 | Sager et al. |
| 2015/0306271 A1 | 10/2015 | Willette |
| 2015/0323206 A1 | 11/2015 | Chan et al. |
| 2015/0323427 A1 | 11/2015 | Sharp |
| 2015/0330650 A1 | 11/2015 | Abiprojo et al. |
| 2015/0330817 A1 | 11/2015 | Law et al. |
| 2015/0330861 A1 * | 11/2015 | Alsaleem ................ F24F 11/49 |
| | | 702/183 |
| 2015/0335834 A1 | 11/2015 | Anandhakrishnan |
| 2015/0347910 A1 | 12/2015 | Fadell et al. |
| 2015/0348400 A1 | 12/2015 | Zribi et al. |
| 2015/0354848 A1 | 12/2015 | Abel et al. |
| 2015/0369503 A1 | 12/2015 | Flaherty et al. |
| 2015/0369507 A1 | 12/2015 | Flaherty et al. |
| 2015/0370986 A1 | 12/2015 | Hayward |
| 2015/0375187 A1 | 12/2015 | Yates et al. |

(56) References Cited

U.S. PATENT DOCUMENTS

| | | |
|---|---|---|
| 2016/0015277 A1 | 1/2016 | Dumoulin et al. |
| 2016/0015278 A1 | 1/2016 | Campo et al. |
| 2016/0015314 A1 | 1/2016 | Dusanter et al. |
| 2016/0015315 A1 | 1/2016 | Auphan et al. |
| 2016/0026201 A1 | 1/2016 | Vellanki et al. |
| 2016/0029805 A1 | 2/2016 | Arens et al. |
| 2016/0041074 A1 | 2/2016 | Pliskin |
| 2016/0048143 A1 | 2/2016 | Chan et al. |
| 2016/0054023 A1 | 2/2016 | Baker et al. |
| 2016/0061472 A1 | 3/2016 | Lee et al. |
| 2016/0061794 A1 | 3/2016 | Schultz et al. |
| 2016/0078751 A1 | 3/2016 | Sloo et al. |
| 2016/0088438 A1 | 3/2016 | O'Keeffe |
| 2016/0089089 A1 | 3/2016 | Kakkar et al. |
| 2016/0091216 A1 | 3/2016 | Tran et al. |
| 2016/0107114 A1 | 4/2016 | Fu et al. |
| 2016/0110782 A1 | 4/2016 | Tadajewski |
| 2016/0116181 A1 | 4/2016 | Aultman et al. |
| 2016/0125714 A1 | 5/2016 | Kates et al. |
| 2016/0132031 A1 | 5/2016 | Kozura et al. |
| 2016/0133108 A1 | 5/2016 | Bucsa et al. |
| 2016/0139038 A1 | 5/2016 | Oldsen et al. |
| 2016/0147506 A1 | 5/2016 | Britt et al. |
| 2016/0153674 A1 | 6/2016 | Lancaster |
| 2016/0153884 A1 | 6/2016 | Han et al. |
| 2016/0161137 A1 | 6/2016 | Chen et al. |
| 2016/0169544 A1 | 6/2016 | Fischer et al. |
| 2016/0169545 A1 | 6/2016 | Mangsuli et al. |
| 2016/0178586 A1 | 6/2016 | Stark |
| 2016/0209065 A1 | 7/2016 | Hagstrom et al. |
| 2016/0209070 A1 | 7/2016 | Hrejsa et al. |
| 2016/0209316 A1 | 7/2016 | Buseyne et al. |
| 2016/0228809 A1 | 8/2016 | Meirav et al. |
| 2016/0228811 A1 | 8/2016 | Meirav et al. |
| 2016/0231014 A1 | 8/2016 | Ro et al. |
| 2016/0238527 A1 | 8/2016 | Tseng et al. |
| 2016/0245784 A1 | 8/2016 | Matocha et al. |
| 2016/0256590 A1 | 9/2016 | Taghipour |
| 2016/0263263 A1 | 9/2016 | Robert |
| 2016/0263268 A1 | 9/2016 | Kirschman |
| 2016/0292781 A1 | 10/2016 | Nahmad et al. |
| 2016/0313290 A1 | 10/2016 | Forzani et al. |
| 2016/0332170 A1 | 11/2016 | Wennerstrom |
| 2016/0334121 A1 | 11/2016 | Oobayashi |
| 2016/0348938 A1 | 12/2016 | Simon et al. |
| 2016/0356511 A1 | 12/2016 | Messinger et al. |
| 2016/0363332 A1 | 12/2016 | Blackley |
| 2016/0363339 A1 | 12/2016 | Blackley |
| 2016/0370021 A1 | 12/2016 | Wiley et al. |
| 2016/0370029 A1 | 12/2016 | Kurelowech |
| 2016/0377305 A1 | 12/2016 | Kwa |
| 2017/0007954 A1 | 1/2017 | Ehdaie |
| 2017/0010006 A1 | 1/2017 | Kim et al. |
| 2017/0021298 A1 | 1/2017 | Williams et al. |
| 2017/0080373 A1 | 3/2017 | Engelhard |
| 2017/0089810 A1 | 3/2017 | Novaro |
| 2017/0095762 A1 | 4/2017 | Wolowicz |
| 2017/0097165 A1 | 4/2017 | Yasuda et al. |
| 2017/0098230 A1 | 4/2017 | Orangkhadivi |
| 2017/0108231 A1 | 4/2017 | Hasegawa et al. |
| 2017/0130981 A1 | 5/2017 | Willette et al. |
| 2017/0159964 A1 | 6/2017 | Arai et al. |
| 2017/0167743 A1 | 6/2017 | Dempsey et al. |
| 2017/0189844 A1 | 7/2017 | McLeod et al. |
| 2017/0193788 A1 | 7/2017 | Kim et al. |
| 2017/0193792 A1 | 7/2017 | Bermudez Rodriguez et al. |
| 2017/0234570 A1 | 8/2017 | Livchak et al. |
| 2017/0246486 A1* | 8/2017 | Cazier .................... A61B 5/087 |
| 2017/0248332 A1 | 8/2017 | Wright et al. |
| 2017/0268797 A1 | 9/2017 | Mowris et al. |
| 2017/0273256 A1 | 9/2017 | Hutzel |
| 2017/0273845 A1 | 9/2017 | Phillips et al. |
| 2017/0292432 A1 | 10/2017 | Hall et al. |
| 2017/0314812 A1 | 11/2017 | Hurley |
| 2017/0323550 A1 | 11/2017 | Patil et al. |
| 2017/0328591 A1 | 11/2017 | Kelly et al. |
| 2017/0333838 A1 | 11/2017 | Bender et al. |
| 2017/0341001 A1 | 11/2017 | Jousma et al. |
| 2017/0341002 A1 | 11/2017 | Cama et al. |
| 2017/0343227 A1 | 11/2017 | Mowris |
| 2017/0347499 A1 | 11/2017 | Ross et al. |
| 2017/0350610 A1 | 12/2017 | Michielsen et al. |
| 2017/0350611 A1 | 12/2017 | Su et al. |
| 2017/0356670 A1* | 12/2017 | Zhang .................... F24F 11/77 |
| 2017/0368488 A1 | 12/2017 | Wall |
| 2018/0001249 A1 | 1/2018 | Sher |
| 2018/0017275 A1 | 1/2018 | Merrill |
| 2018/0017278 A1 | 1/2018 | Klein et al. |
| 2018/0017513 A1 | 1/2018 | Le Neel et al. |
| 2018/0017536 A1 | 1/2018 | Le Neel et al. |
| 2018/0021613 A1 | 1/2018 | Li |
| 2018/0023831 A1 | 1/2018 | Ha et al. |
| 2018/0023834 A1 | 1/2018 | Hatch et al. |
| 2018/0050302 A1 | 2/2018 | Kamiyama et al. |
| 2018/0073759 A1 | 3/2018 | Zhang et al. |
| 2018/0119974 A1 | 5/2018 | Kotake et al. |
| 2018/0135877 A1 | 5/2018 | Seiler |
| 2018/0148180 A1 | 5/2018 | Fagundes et al. |
| 2019/0023099 A1* | 1/2019 | Li .................... B60H 1/008 |
| 2021/0041119 A1* | 2/2021 | Pham .................... F24F 3/14 |
| 2023/0070313 A1* | 3/2023 | Douglas .................... F24F 11/65 |

FOREIGN PATENT DOCUMENTS

| | | |
|---|---|---|
| CN | 102393882 A | 3/2012 |
| CN | 202792383 U | 3/2013 |
| CN | 203090662 U | 7/2013 |
| CN | 104089361 A | 10/2014 |
| CN | 203949322 U | 11/2014 |
| CN | 104359815 A | 2/2015 |
| CN | 104534617 A | 4/2015 |
| CN | 103958976 B | 11/2016 |
| CN | 106196506 A | 12/2016 |
| CN | 107676931 A | 2/2018 |
| CN | 107940682 A | 4/2018 |
| DE | 10108274 A1 | 9/2002 |
| EP | 0893657 A1 | 1/1999 |
| EP | 1402935 A1 | 3/2004 |
| EP | 1904905 A2 | 4/2008 |
| EP | 2450640 A2 | 5/2012 |
| EP | 2134556 B1 | 7/2012 |
| EP | 2368616 B1 | 12/2012 |
| EP | 2564114 A1 | 3/2013 |
| EP | 2713159 A2 | 4/2014 |
| EP | 2891019 A1 | 7/2015 |
| EP | 2937961 A1 | 10/2015 |
| EP | 3040948 A1 | 7/2016 |
| EP | 3073883 A1 | 10/2016 |
| EP | 3121524 A1 | 1/2017 |
| JP | H05180487 A | 7/1993 |
| JP | 09-280640 | 10/1997 |
| JP | 2007083106 A | 4/2007 |
| JP | 5231476 B2 | 7/2013 |
| JP | 2014208343 A | 11/2014 |
| JP | 2015152175 A | 8/2015 |
| KR | 100355352 B1 | 9/2002 |
| KR | 20030016787 A | 3/2003 |
| KR | 20040061677 A | 7/2004 |
| KR | 100509332 B1 | 8/2005 |
| KR | 20050120911 A | 12/2005 |
| KR | 20070072787 A | 7/2007 |
| KR | 100819077 B1 | 4/2008 |
| KR | 100930346 B1 | 12/2009 |
| KR | 20100089605 A | 8/2010 |
| KR | 20110074222 A | 6/2011 |
| KR | 20110093329 A | 8/2011 |
| KR | 101199180 B1 | 11/2012 |
| KR | 101566592 B1 | 11/2015 |
| KR | 101765454 B1 | 8/2017 |
| KR | 101771053 B1 | 8/2017 |
| KR | 20170122043 A | 11/2017 |
| KR | 20180007381 A | 1/2018 |
| LU | 92350 A1 | 7/2015 |
| WO | WO-9409324 A1 | 4/1994 |

(56) References Cited

FOREIGN PATENT DOCUMENTS

| WO | WO-2005110580 A2 | 11/2005 | |
|---|---|---|---|
| WO | WO-2013163612 A1 | 10/2013 | |
| WO | WO-2015078672 A1 | 6/2015 | |
| WO | WO-2016102337 A1 | 6/2016 | |
| WO | WO-2016139544 A1 | 9/2016 | |
| WO | WO-2017146637 A1 | 8/2017 | |
| WO | WO 2020109963 A1 * | 6/2020 | .............. F24F 11/58 |

OTHER PUBLICATIONS

Non-Final Office Action for U.S. Appl. No. 17/048,993 dated Aug. 21, 2023.
Non-Final Office Action for U.S. Appl. No. 17/048,910 dated Jul. 27, 2023.
International Search Report of the ISA/KR regarding International Application No. PCT/US2019/028409 dated Aug. 9, 2019.
Written Opinion of the ISA/KR regarding International Application No. PCT/US2019/028409 dated Aug. 9, 2019.
International Search Report of the ISA/KR regarding International Application No. PCT/US2019/028400 dated Aug. 9, 2019.
Written Opinion of the ISA/KR regarding International Application No. PCT/US2019/028400 dated Aug. 9, 2019.
International Search Report of the ISA/KR regarding International Application No. PCT/US2019/028398 dated Aug. 6, 2019.
Written Opinion of the ISA/KR regarding International Application No. PCT/US2019/028398 dated Aug. 6, 2019.
"Clean Your Air with Keen Home Smart Filters", Keen Home, Inc., <https://keenhome.io/pages/smart-filter> 2018.
"Home Comfort: Digital, App-Based Climate Control", Ecovent Systems Inc., <https://www.ecoventsystems.com/> 2018.
"Meet the Keen Home Zoning System—How It Works", Keen Home, Inc., <https://keenhome.io/pages/how-it-works> 2018.
Doty, Steve, et al., "Building Operations: Balancing Energy Efficiency with Indoor Air Quality", 2009.
El Mankibi, Mohamed, "Indoor air quality control in case of scheduled or intermittent occupancy based building: Development of a scale model", 2009.
Emmerich, Steven, et al., "Indoor air quality impacts of residential HVAC systems, phase 1 report: Computer simulation plan", NISTIR 5346: Building and Fire Research Laboratory; National Institute of Standards and Technology: http://www.researchgate.net/profile/Steven_Emmerich/publication/236454476_Indoor_air_quality_impacts_of_residential_HVAC_systems_phase_1_report_Computer_simulation_plan/links/565f5f2308ae1ef929854780.pdf; Feb. 1994; 108 Pages.
Footbot; Product Specifications; www.footbot.io. Accessed Sep. 13, 2017.
Herberger, Simone, et al., "Indoor Air Quality Monitoring Improving Air Quality Perception", 2012.
International Search Report of the ISA/KR regarding International Application No. PCT/US2018/062190 dated Mar. 21, 2019.
Shaw, C. Y., "Maintaining acceptable air quality in office buildings through ventilation", Construction Technology Updated No. 3, Institute for Research in Construction, National Research Council of Canada, Jan. 1997; 4 Pages.
Turner, William J.N., et al., "Energy and IAQ implications of residential ventilation cooling", ResearchGate: http://www.researchgate.net/profile/William_Turner10/publication/278961832_Energy_and_IAQ_implications_of_residential_ventilation_cooling/links/5587e12608aef58c03a06547.pdf, Aug. 2014; 52 pages.
Written Opinion of the ISA/KR regarding International Application No. PCT/US2018/062190 dated Mar. 21, 2019.
Zhong, Lexuan, et al., "Ozonation Air Purification Technology in HVAC Applications", Concordia University: http://www.researchgate.net/profile/Lexuan_Zhong/publication/260363850_Ozonation_Air_Purification_Technology_in_HVAC_Applications/links/0a85e530e28d98ecf4000000, 2014; 8 Pages.
Non-Final Office Action regarding U.S. Appl. No. 17/078,031 dated Oct. 20, 2021.
U.S. Appl. No. 17/078,031, filed Oct. 22, 2020, Stuart K. Morgan.
U.S. Appl. No. 17/048,993, filed Oct. 19, 202, Jeffrey N. Arensmeier.
U.S. Appl. No. 17/048,910, filed Oct. 19, 2020, Hung M. Pham.

* cited by examiner

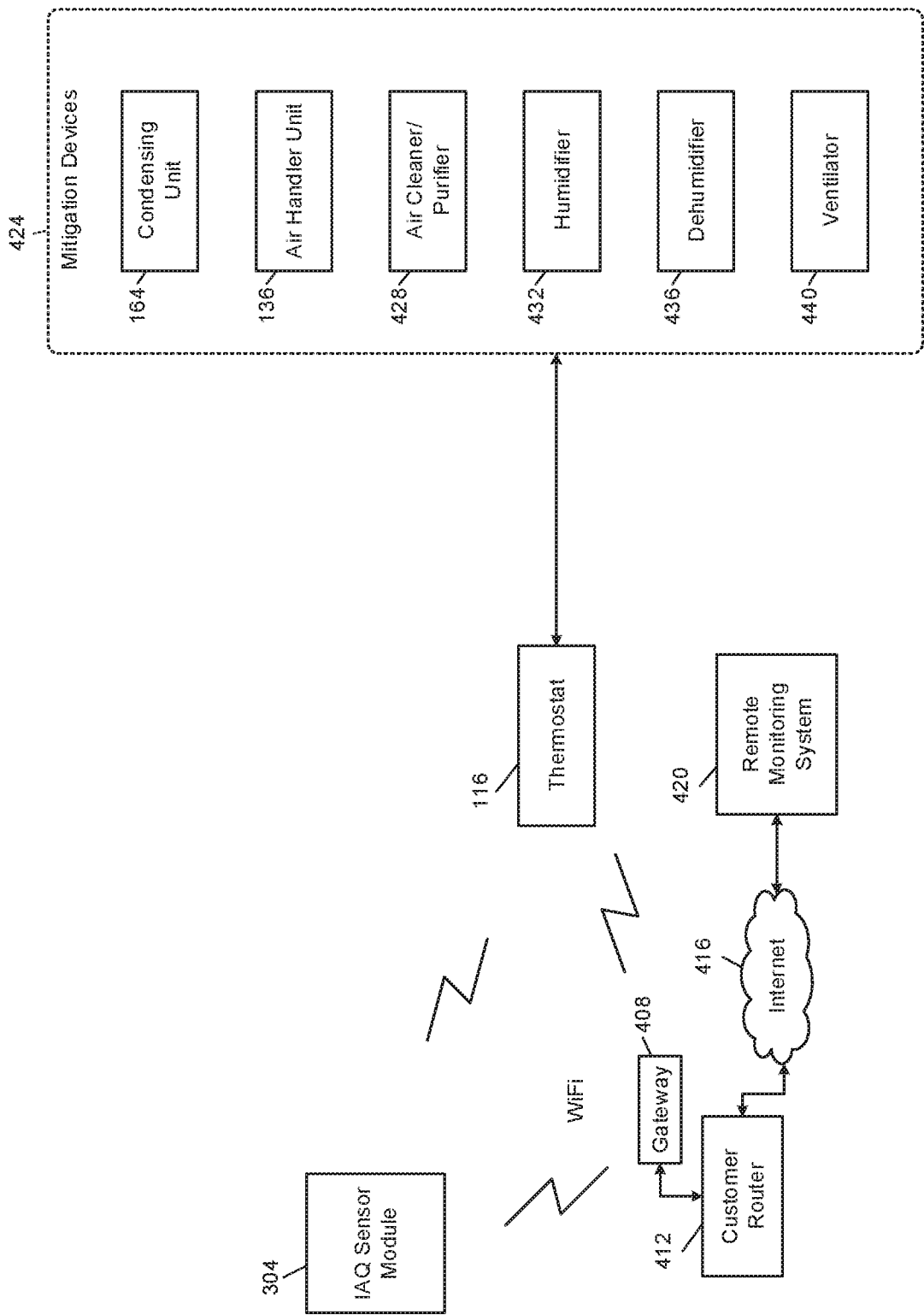

| Control Mode | | Devices | |
|---|---|---|---|
| Heat Mode | ● | AC/Heat Pump Stage 1 | ● |
| Extra Heat Mode | ● | AC/Heat Pump Stage 2 | ● |
| Cool Mode | ● | Electric Heat Stage 1 | ● |
| Humidify Mode | ● | Electric Heat Stage 2 | ● |
| Economizer Mode | ● | Reversing Valve | ● |
| Vent Mode | ● | Humidifier | ● |
| Dehumidify Mode | ● | Mixed Air Damper | ● |
| Extra Dehumidify Mode | ● | Economizer | ● |
| DeVOC Mode | ● | Fan | ● |
| DeParticle Mode | ● | Fan Speed Low | ● |
| DeCO2 Mode | ● | Fan Speed Medium | ● |
| Failsafe Mode | ● | Fan Speed High | ● |
| | | Ventilator | ● |
| | | Purifier | ● |

| PM \ RT | MERV 7 Filter | | | |
|---|---|---|---|---|
| | 30% | 50% | 80% |
| 7 | 12.0 | 7.2 | 4.5 |
| 10 | 8.4 | 5.0 | 3.7 |
| 13 | 6.5 | 3.9 | 2.4 |

FIG. 16

| | Day | Week | Month | 6 Months |
|---|---|---|---|---|
| Pollutant level (PL) in micrograms/m³ | 9.7 | 9.6 | 9.6 | 9.6 |
| Filter efficiency (FE) of a MERV 14 filter | 0.90 | 0.90 | 0.90 | 0.90 |
| Airflow in m³/hr (CMH) | 1868 | 1868 | 1868 | 1868 |
| Fan Run Time (RT) in hours | 8 | 56 | 240 | 1440 |
| Total weight of pollutant in grams (PL * FE * CMH * RT) | 0.13 | 0.91 | 3.9 | 23.4 |

PARTICULATE-MATTER-SIZE-BASED FAN CONTROL SYSTEM

CROSS-REFERENCE TO RELATED APPLICATIONS

This application is the U.S. National Phase Application under 35 U.S.C. 371 of International Application No. PCT/US2019/028398, filed Apr. 19, 2019, which claims the benefit of U.S. Provisional Application No. 62/660,900, filed Apr. 20, 2018, U.S. Provisional Application No. 62/660,890, filed Apr. 20, 2018, and U.S. Provisional Application No. 62/660,896, filed Apr. 20, 2018. The entire disclosures of the applications referenced above are incorporated by reference.

FIELD

The present disclosure relates to environmental control systems and more particularly to control of air filtration systems.

BACKGROUND

A residential or light commercial HVAC (heating, ventilation, and air conditioning) system controls temperature and humidity of a building. Upper and lower temperature limits may be specified by an occupant or owner of the building, such as an employee working in the building or a homeowner. A thermostat controls operation of the HVAC system based on a comparison of measured air temperature and a target value. The thermostat controls the HVAC system to heat the building when the temperature is less than the lower temperature limit. The thermostat controls the HVAC system to cool the building when the temperature is greater than the upper temperature limit. Heating and cooling the building generally decreases humidity, although the HVAC system may include a humidifier that adds humidity to warm air output by the HVAC system during heating of the building.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A control system for mitigation device is disclosed. The control system includes a processor and a computer-readable medium that includes instructions executable by the processor. The instructions include monitoring a first measured particulate matter (PM) level of a conditioned space of a building. The first measured PM level includes PM having a first range of sizes. The instructions further include monitoring a second measured PM level of the conditioned space. The second measured PM level includes PM having a second range of sizes. The first and second ranges are different but overlapping. The instructions also include asserting, in response to the first measured PM level being greater than a first predetermined threshold, an activation signal. The activation signal forces operation of a fan of the mitigation device. The instructions include asserting, in response to the second measured PM level being greater than a predetermined percentage of the first measured PM level, the activation signal.

In other features, the first range is bounded at an upper end by a first size and unbounded at a lower end. The second range is bounded at an upper end by a second size and unbounded at a lower end. In other features, the first size is 2.5 micrometers and the second size is 1 micrometer. In other features, the instructions include, while the activation signal is asserted monitoring the second measured PM level and deasserting the activation signal in response to the second measured PM level reaching a steady state. In yet other features, the instructions include determining that the second measured PM level has reached a steady state in response to the second measured PM level decreasing by less than a predetermined amount in each of a predetermined number of consecutive windows of time.

In further features, the instructions include, while the activation signal is asserted monitoring the first measured PM level and the second measured PM level. The instructions further include de-asserting the activation signal in response to concurrence of (i) the first measured PM level being less than a second predetermined threshold and (ii) the second measured PM level being less than a second predetermined percentage of the first measured PM level. In other features, the instructions include, while the activation signal is asserted, monitoring the first measured PM level, the second measured PM level, and a third measured PM level. The third measured PM level includes PM having a third range of sizes. The third range is different than the first range. The third range is different than the second range. The instructions further include de-asserting the activation signal in response to concurrence of (i) the first measured PM level being less than a second predetermined threshold, (ii) the second measured PM level being less than a second predetermined percentage of the first measured PM level, and (iii) the third measured PM level being less than a third predetermined threshold.

In other features, the instructions include determining a difference between the first measured PM level at a first time and at a second time. The first time corresponds to the assertion of the activation signal and the second time corresponds to subsequent de-assertion of the activation signal. The instruction further include generating, in response to the difference being less than a predetermined removal expectation, an alert indicating low PM removal.

In yet other features, monitoring the first measured PM level includes receiving values of the first measured PM level from an indoor air quality (IAQ) sensor module. Monitoring the second measured PM level includes receiving values of the second measured PM level from the IAQ sensor module. In other features, the mitigation device is a heating, ventilation, and air conditioning (HVAC) system of the building and the activation signal forces operation of a circulator blower of the HVAC system of the building.

In other features, the instructions include: determining an airflow associated with the circulator blower; determining a first removal efficiency of a filter of the HVAC system with respect to the first range of sizes of PM; and determining a second removal efficiency of the filter with respect to the second range of sizes of PM. The instructions further include, while the circulator blower is operating, incrementing a weight of filtered pollutant based on (i) the airflow, (ii) a product of the first measured PM level and the first removal efficiency, and (iii) a product of the second measured PM level and the second removal efficiency.

In other features, the instructions include determining a retention threshold corresponding to a capacity of the filter and generating, in response to the weight exceeding the retention threshold, an alert suggesting replacement of the filter. In yet other features, the mitigation device is one of an air purifier, a ventilator, and a humidifier.

A method of controlling a mitigation device is disclosed. The method includes monitoring a first measured particulate matter (PM) level of a conditioned space of a building and monitoring a second measured PM level of the conditioned space. The first measured PM level includes PM having a first range of sizes. The second measured PM level includes PM having a second range of sizes. The first and second ranges are different but overlapping. The method further includes asserting, in response to the first measured PM level being greater than a first predetermined threshold, an activation signal. The activation signal forces operation of a fan of the mitigation device. The method also include, in response to the second measured PM level being greater than a predetermined percentage of the first measured PM level, asserting the activation signal.

In other features, the first range is bounded at an upper end by a first size and unbounded at a lower end and the second range is bounded at an upper end by a second size and unbounded at a lower end. In other features, the first size is 2.5 micrometers and the second size is 1 micrometer. In yet other features, the method includes, while the activation signal is asserted, monitoring the second measured PM level and de-asserting the activation signal in response to the second measured PM level reaching a steady state.

In other features, the method includes determining that the second measured PM level has reached a steady state in response to the second measured PM level decreasing by less than a predetermined amount in each of a predetermined number of consecutive windows of time. In other features, the method includes, while the activation signal is asserted, monitoring the first measured PM level and the second measured PM level and de-asserting the activation signal in response to concurrence of (i) the first measured PM level being less than a second predetermined threshold and (ii) the second measured PM level being less than a second predetermined percentage of the first measured PM level.

In yet other features, the method includes, while the activation signal is asserted, monitoring the first measured PM level, the second measured PM level, and a third measured PM level. The third measured PM level includes PM having a third range of sizes. The third range is different than the first range. The third range is different than the second range. The method further includes de-asserting the activation signal in response to concurrence of (i) the first measured PM level being less than a second predetermined threshold, (ii) the second measured PM level being less than a second predetermined percentage of the first measured PM level, and (iii) the third measured PM level being less than a third predetermined threshold.

In other features, the method includes determining a difference between the first measured PM level at a first time and at a second time. The first time corresponds to the assertion of the activation signal and the second time corresponds to subsequent de-assertion of the activation signal. The method also includes generating, in response to the difference being less than a predetermined removal expectation, an alert indicating low PM removal.

In other features, monitoring the first measured PM level includes receiving values of the first measured PM level from an indoor air quality (IAQ) sensor module and monitoring the second measured PM level includes receiving values of the second measured PM level from the IAQ sensor module. In other features, the mitigation device is a heating, ventilation, and air conditioning (HVAC) system of the building. The activation signal forces operation of a circulator blower of the HVAC system of the building.

In other features, the method includes determining an airflow associated with the circulator blower, determining a first removal efficiency of a filter of the HVAC system with respect to the first range of sizes of PM, and determining a second removal efficiency of the filter with respect to the second range of sizes of PM. The method further includes, while the circulator blower is operating, incrementing a weight of filtered pollutant based on (i) the airflow, (ii) a product of the first measured PM level and the first removal efficiency, and (iii) a product of the second measured PM level and the second removal efficiency. In yet other features, the method includes determining a retention threshold corresponding to a capacity of the filter and in response to the weight exceeding the retention threshold, generating an alert suggesting replacement of the filter. In further features, the mitigation device is one of an air purifier, a ventilator, and a humidifier.

An indoor air quality (IAQ) system for a heating, ventilation, and air conditioning (HVAC) system of a building is disclosed. The IAQ system includes an IAQ sensor module located within the building that is configured to measure a pollutant level in air surrounding the IAQ sensor module. The IAQ sensor module includes at least one of a particulate sensor configured to measure an amount of particulate of at least a predetermined size present in the air and the measured pollutant level is based on the amount of particulate, or a volatile organic compound (VOC) sensor configured to measure an amount of VOCs present in the air and the measured pollutant level is based on the amount of VOCs. The IAQ system also includes an IAQ control module configured to determine a nominal airflow associated with an air handler of the HVAC system, determine a threshold corresponding to a capacity of a filter of the air handler, determine a removal efficiency of the filter, monitor a state of a fan of the air handler, and according to the state of the fan, calculate a weight of filtered pollutant based on the nominal airflow, the removal efficiency of the filter, and the measured pollutant level. The IAQ control module is further configured to, in response to the weight exceeding the threshold, generate an alert suggesting replacement of the filter.

In other features, the IAQ sensor module is configured to periodically update the measured pollutant level. The IAQ control module is configured to increase the weight of filtered pollutant based on the updated measured pollutant level according to the state of the fan. In other features, increasing the weight of the filtered pollutant includes a stepwise increase for each increment of time in which the state of the fan indicates that the fan is running. In yet other features, calculating the weight of filtered pollutant is based on an average of the measured pollutant level over a preceding period of time. In other features, the IAQ control module is configured to determine a minimum efficiency reporting value (MERV) rating of the filter. Determining the removal efficiency of the filter includes determining a removal efficiency associated with the MERV rating of the filter.

In yet other features, the IAQ control module is configured to determine a filtering material of the filter. Determining the removal efficiency of the filter includes determining a removal efficiency associated with the filtering material. In further features, the filtering material is one of (i) activated charcoal, (ii) zeolite, (iii) baking soda, and (iv) alumina oxide. In other features, the IAQ control module is configured to determine a remaining life of the filter based on a length of time that the filter has been installed in the air handler, the weight of filtered pollutant, and the capacity of the filter. In yet other features, the IAQ control module is configured to, in response to the weight of filtered pollutant equaling or exceeding the capacity of the filter, generate an alert indicating that the filter needs to be replaced. In further features, generating the alert suggesting replacement of the filter includes generating the alert only once per predetermined period. The predetermined period is greater than or equal to one day.

A method of monitoring a heating, ventilation, and air conditioning (HVAC) system of a building is disclosed. The method includes measuring a pollutant level using an indoor air quality (IAQ) sensor module located within the building. The IAQ sensor module includes at least one of a particulate sensor configured to measure an amount of particulate of at least a predetermined size present in the air surrounding the IAQ sensor module and a volatile organic compound (VOC) sensor configured to measure an amount of VOCs present in the air surrounding the IAQ sensor module. The measured pollutant level is based on either the amount of particulate or the amount of VOCs. The method further includes: determining a nominal airflow associated with and air handler of the HVAC system; determining a threshold corresponding to a capacity of a filter of the air handler; determining a removal efficiency of the filter; monitoring a state of a fan of the air handler; calculating a weight of filtered pollutant based on the nominal airflow, the removal efficiency of the filter, and the measured pollutant level according to the state of the fan; and generating, in response to the weight exceeding the threshold, an alert suggesting replacement of the filter.

In other features, the method includes periodically updating the measured pollutant level and increasing the weight of filtered pollutant based on the updated measured pollutant level according to the state of the fan. In further features, increasing the weight of the filtered pollutant includes a stepwise increase for each increment of time in which the state of the fan indicates that the fan is running. In other features, calculating the weight of filtered pollutant is based on an average of the measured pollutant level over a preceding period of time.

In other features, the method includes determining a minimum efficiency reporting value (MERV) rating of the filter. Determining the removal efficiency of the filter includes determining a removal efficiency associated with the MERV rating of the filter. In yet other features, the method includes determining a filtering material of the filter. Determining the removal efficiency of the filter includes determining a removal efficiency associated with the filtering material.

In further features, the filtering material is one of (i) activated charcoal, (ii) zeolite, (iii) baking soda, and (iv) alumina oxide. In other features, the method includes determining a remaining life of the filter based on a length of time that the filter has been installed in the air handler, the weight of filtered pollutant, and the capacity of the filter. In other features, the method includes generating, in response to the weight of filtered pollutant equaling or exceeding the capacity of the filter, an alert indicating that the filter needs to be replaced. In further features, generating the alert suggesting replacement of the filter includes generating the alert only once per predetermined period. The predetermined period is greater than or equal to one day.

An indoor air quality (IAQ) system for a building is disclosed. The IAQ system includes a first IAQ sensor module that is (i) located within the building and (ii) configured to periodically measure a first pollutant level in air surrounding the first IAQ sensor module. The first IAQ sensor module includes at least one of a particulate sensor configured to measure an amount of particulate of at least a predetermined size present in the air as the first pollutant level and a volatile organic compound (VOC) sensor configured to measure an amount of VOCs present in the air as the first pollutant level. The IAQ system also includes an IAQ control module configured to compare the first pollutant level to a first threshold, in response to the first pollutant level being greater than the first threshold, (i) begin generating an activation signal and (ii) store the first pollutant level as an initial pollutant level, and obtain an expected efficacy for a filter of the pollutant mitigation device. The activation signal commands operation of a pollutant mitigation device. The IAQ control module is also configured to, while the activation signal is being generated, in response to the first pollutant level decreasing by less than a predetermined amount for a predetermined period of time, (i) halt generation of the activation signal and (ii) calculate an actual efficacy of the filter based on the initial pollutant level and a last measured first pollutant level.

In other features, the IAQ control module is configured to, while the activation signal is being generated, delay for a sampling period and then calculate a second threshold based on a previously measured first pollutant level. The IAQ control module is configured to, in response to the first pollutant level being greater than or equal to the second threshold, increment a counter. Further, the IAQ control module is configured to, in response to the counter exceeding a predetermined value, determine that the first pollutant level is decreasing by less than the predetermined amount for the predetermined period of time.

In other features, the IAQ control module is configured to, while the activation signal is being generated, reset the counter to zero in response to the first pollutant level being less than the second threshold. In further features, the IAQ control module is configured to, in response to the actual efficacy being less than the expected efficacy, generate an alert indicating the filter is operating at less than the expected efficacy.

In other features, the IAQ system includes a second IAQ sensor module located within the building that is configured to periodically measure a second pollutant level in air surrounding the second IAQ sensor module. The second IAQ sensor module includes at least one of a particulate sensor configured to measure an amount of particulate of at least a predetermined size present in the air as the second pollutant level, and a volatile organic compound (VOC) sensor configured to measure an amount of VOCs present in the air as the second pollutant level. The IAQ control module is further configured to, while the activation signal is being generated, delay for a predetermined transit time and calculate a second threshold based on the first pollutant level. The IAQ control module is also configured to, in response to the second pollutant level being greater than or equal to the second threshold, determine that the first pollutant level is decreasing by less than the predetermined amount for the predetermined period of time.

In other features, the IAQ control module is configured to, in response to the actual efficacy being less than the expected efficacy, generate an alert indicating the filter is operating at less than the expected efficacy.

In further features, the pollutant mitigation device is an air handler unit of a heating, ventilation, and air conditioning (HVAC) system of the building. The activation signal commands operation of a circulator blower of the air handler unit. In other features, the filter is an air filter of the air handler unit. In yet other features, the filter is a VOC filter of the air handler unit. In other features, the pollutant mitigation device is one of an air purifier, a ventilator, and a humidifier.

A method for controlling a pollutant mitigation device in a building is disclosed. The method includes using a first IAQ sensor module located within the building to periodically measure a first pollutant level in air surrounding the first IAQ sensor module. The first IAQ sensor module includes at least one of a particulate sensor configured to measure an amount of particulate of at least a predetermined size present in the air as the first pollutant level and a volatile organic compound (VOC) sensor configured to measure an amount of VOCs present in the air as the first pollutant level. The method further includes comparing the first pollutant level to a first threshold and in response to the first pollutant level being greater than the first threshold, (i) begin generating an activation signal and (ii) storing the first pollutant level as an initial pollutant level. The activation signal commands operation of the pollutant mitigation device. The method also includes obtaining an expected efficacy for a filter of the pollutant mitigation device and, while the activation signal is being generated, in response to the first pollutant level decreasing by less than a predetermined amount for a predetermined period of time, (i) halting generation of the activation signal and (ii) calculating an actual efficacy of the filter based on the initial pollutant level and a last measured first pollutant level.

In other features, the method includes, while the activation signal is being generated, delaying for a sampling period and calculating a second threshold based on a previously measured first pollutant level. The method also includes, in response to the first pollutant level being greater than the second threshold, incrementing a counter and in response to the counter exceeding a predetermined value, determining that the first pollutant level is decreasing by less than the predetermined amount for the predetermined period of time.

In other features, the method includes resetting, while the activation signal is being generated, the counter to zero in response to the first pollutant level being less than the second threshold. In other features, the method includes generating, in response to the actual efficacy being less than the expected efficacy, an alert indicating the filter is operating at less than the expected efficacy.

In other features, the method includes using a second IAQ sensor module located within the building to periodically measure a second pollutant level in air surrounding the second IAQ sensor module. The second IAQ sensor module includes at least one of a particulate sensor configured to measure an amount of particulate of at least a predetermined size present in the air as the second pollutant level, and a volatile organic compound (VOC) sensor configured to measure an amount of VOCs present in the air as the second pollutant level. The method further includes delaying for a predetermined transit time and calculating a second threshold based on the first pollutant level. The method also includes, in response to the second pollutant level being greater than or equal to the second threshold, determining that the first pollutant level is decreasing by less than the predetermined amount for the predetermined period of time.

In further features, the method includes generating, in response to the actual efficacy being less than the expected efficacy, an alert indicating the filter is operating at less than the expected efficacy. In further features, the pollutant mitigation device is an air handler unit of a heating, ventilation, and air conditioning (HVAC) system of the building. The activation signal commands operation of a circulator blower of the air handler unit. In other features, the filter is an air filter of the air handler unit. In yet other features, the filter is a VOC filter of the air handler unit. In other features, the pollutant mitigation device is one of an air purifier, a ventilator, and a humidifier.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIGS. 4A-4C are functional block diagrams of an example IAQ control system.

FIGS. 6-9 are example user interfaces displayed by a user computing device during execution of an application based on data received from a remote monitoring system.

FIG. 15 is a table showing the estimated life of an air filter with a minimum efficiency reporting value (MERV) of 7 under various operating conditions.

FIG. 16 is a table showing the estimated weight of an air filter over different periods of time.

In the drawings, reference numbers may be reused to identify similar and/or identical elements.

DETAILED DESCRIPTION

Introduction

Figure 1:
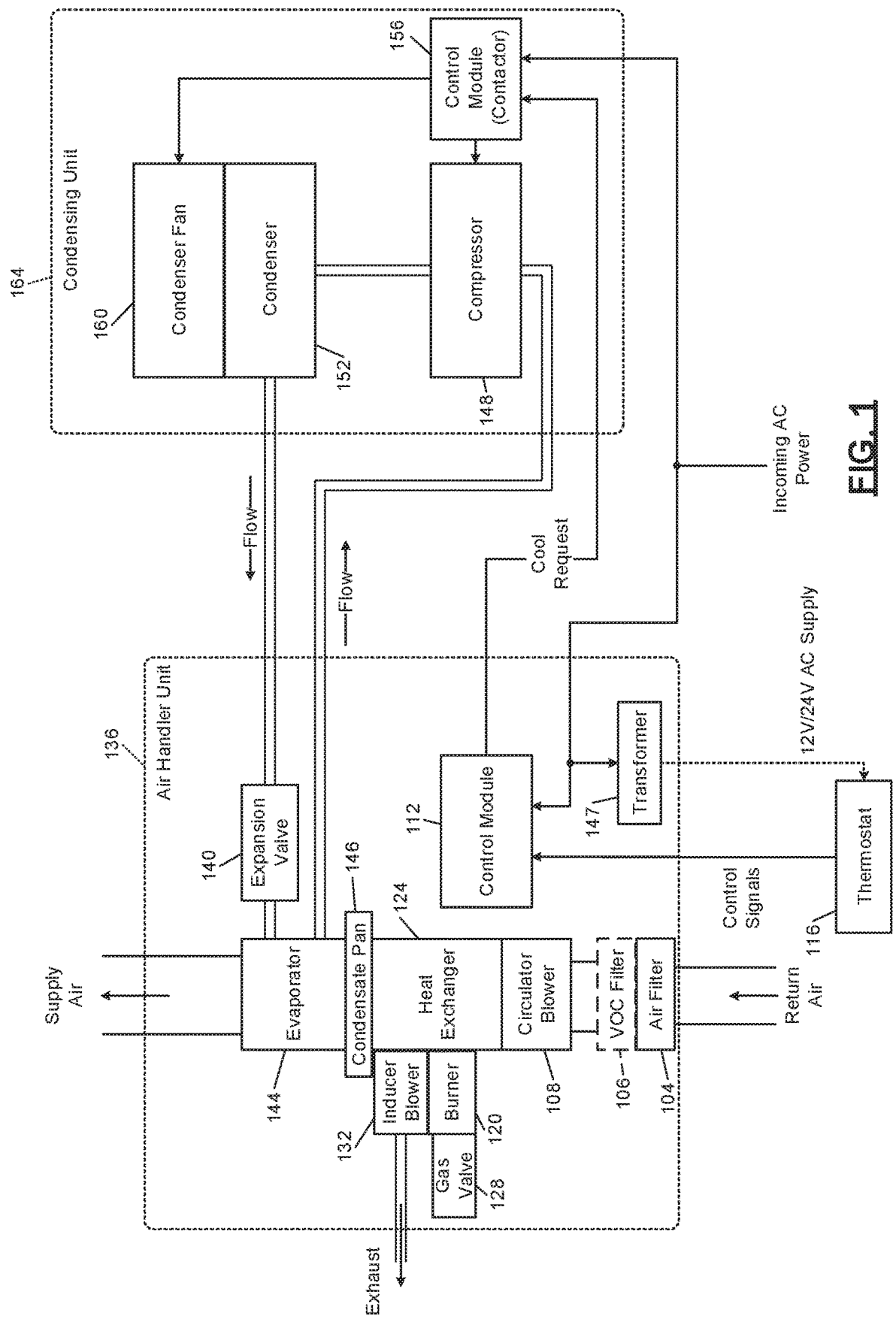
FIG. 1 is a block diagram of an example heating, ventilation, and air conditioning (HVAC) system.

In an environmental control system, one or more mitigation devices may be capable of reducing levels of particulate matter in a conditioned space. For example, an air purifier may include one or more filters and may include a fan to increase airflow through the filters. In some operating regimes, a humidifier may also mitigate particulate matter. A heating, ventilation, and air conditioning (HVAC) system may include one or more filters and a circulator blower that draws air through the filter(s). The circulator blower may be activated when the HVAC system is attempting to heat or cool the conditioned space (which may be described as mitigating deviations from a desired temperature range). The circulator blower may also be turned on independently of heating and cooling to distribute air around the conditioned space as well as to collect pollutants (such as particulate matter and, in some configurations, volatile organic compounds) in the filter(s).

For simplicity of illustration, the below control strategies will be described with respect to the HVAC system as the mitigation device even though the principles apply to additional and alternative mitigation devices. For example, multiple mitigation devices may be activated in response to levels of particulate matter that exceed a certain threshold, while a lower threshold may be used to activate a single mitigation device.

There is a wide variety of sizes of particulate matter. Certain sizes of particulate matter may be more deleterious to the health of humans and pets than other sizes. For example, particulate matter smaller than 2.5 micron (μm) may be problematic because the smaller particulate matter can more deeply infiltrate a human's lungs. In various analyses, particulate matter smaller than 1 μm may be even more injurious than particulate matter sized between 1 μm and 2.5 μm.

An indoor air quality (IAQ) control module may activate one or more mitigation devices to decrease levels of particulate matter. For example, targets for acceptable levels of particulate matter may be based on health advisories from governmental agencies, nonprofit organizations, and independent testing. When particulate matter measurement devices are able to provide more granular measurements, such as levels of particulate matter of different sizes, the mitigation devices can be controlled based on these different levels, which may be prioritized differently. The prioritization may be based on, for example, the respective health effects of different sizes of particulate matter.

As one example, a measurement device described below may be able to measure particulate matter that is smaller than 10 μm, particulate matter that is smaller than 2.5 μm, and particulate matter that is smaller than 1 μm. in various implementations, the particulate matter sensors may measure or calculate levels of particulate matter within closed-ended ranges. For example, a measured or calculated value may be produced for particulate matter smaller than 10 μm but larger than 2.5 μm. For simplicity of explanation, the sizes of particulate matter described below will be defined only by an upper bound, making each particulate matter level cumulative of the levels of particulate matter of smaller size. In other words, the level of particulate matter smaller than 2.5 μm will be cumulative of the level of particulate matter smaller than 1 μm, and the level of particulate matter smaller than 10 μm will be cumulative of the level of particulate matter smaller than 2.5 μm. For each range, there is no explicit lower bound, meaning that the lower bound of the range is simply the smallest particulate matter size that the sensor can detect.

If the health effects of particulate matter smaller than 1 μm are considered to be the most severe, the mitigation devices may be controlled to focus mitigation efforts on that size of particulate matter. This size of particulate matter (referred to in shorthand as PM1) will be used in the below description, recognizing that the control system may be configured to focus on particulate matter of other sizes based on scientific research, environmental conditions in and around the building, and sensitivities of occupants of the building. To the extent that a mitigation device can be controlled or configured to increase effectiveness of removal of PM1, the IAQ control module may perform that control or instruct an operator (such as an HVAC contractor) to so configure the mitigation device.

In devices where the relative effectiveness of particulate matter removal based on size cannot be changed, the level of PM1 may be used as a control variable, optimizing the level of PM1 preferentially over other sizes of particulate matter. As an example, the circulator blower of an HVAC system may be activated in response to undesirable levels of particulate matter. The circulator blower may be maintained in the active state until PM1 falls below a predetermined acceptable level. In other implementations, the circulator blower may remain activated until the apparent effectiveness of the HVAC system to remove PM1 falls below a threshold. For example, the amount of decrease in measured levels of PM1 may be observed over time and once the amount of decrease of PM1 stays below a predetermined threshold over a predetermined period of time, the circulator blower activation may be ended.

The IAQ control module may assert a circulator blower activation signal to activate the circulator blower. The circulator blower activation signal may be similar to or implemented as a call for fan. The call for fan may be made by a thermostat to indicate that the fan should remain running even when the HVAC system is not heating or cooling the conditioned space. If the HVAC system is already heating or cooling the conditioned space, the circulator blower will already be active and the circulator blower activation signal may have no additional effect. In conditions where the circulator blower speed can be increased without adversely affecting heating, cooling, humidification, or dehumidification, the circulator blower activation signal may cause the speed of the circulator blower to increase. This increased speed increases airflow through the filter and accelerates removal of particulate matter. The circulator blower activation may be ended by deasserting the circulator blower activation signal.

In another implementation, the circulator blower activation signal is activated in response to undesirable levels of particulate matter. The circulator blower activation signal is only deasserted once the level of particulate matter smaller than 10 μm is acceptable, the level of particulate matter smaller than 2.5 μm is acceptable, and the proportion of PM1 is less than a threshold percentage of particulate matter smaller than 2.5 μm. For example, when PM1 makes up more than 90% of the particulate matter smaller than 2.5 μm, the circulator blower activation signal may remain asserted to attempt to remove the undesirable PM1.

When the amount of particulate matter in the air is measured with finer granularity, estimates of how much particulate matter is captured by filters may be more accurate. Therefore, while the circulator blower is drawing air through the filter, the amount of particulate matter in the air and the characteristics of the filter may be used to estimate how much particulate matter is captured by the filter, according to the amounts (and associated weights) of particulate matter of different sizes. In various implementations, the usage of a filter may be determined based on an estimated weight of particulate matter trapped by the filter, and a filter capacity may be determined according to how much weight the filter can be expected to carry without substantive reductions in effectiveness or airflow.

Monitoring System

The IAQ control module and/or the thermostat may upload data to a remote location. The remote location may be accessible via any suitable network, including the Internet. The remote location includes one or more computers, which will be referred to as servers. The servers implement a monitoring system on behalf of a monitoring company. Additionally or alternatively, a user computing device may serve as the monitoring system. The monitoring system receives and processes the data from the controller and/or thermostat of customers who have such systems installed. The monitoring system can provide performance information, diagnostic alerts, and error messages to one or more users associated with the building and/or third parties, such as designated HVAC contractors.

A server of the monitoring system includes a processor and memory. The memory stores application code that processes data received from the controller and/or the thermostat. The processor executes this application code and stores received data either in the memory or in other forms of storage, including magnetic storage, optical storage, flash memory storage, etc. While the term server is used in this application, the application is not limited to a single server.

A collection of servers may together operate to receive and process data from multiple buildings. A load balancing algorithm may be used between the servers to distribute processing and storage. The present application is not limited to servers that are owned, maintained, and housed by a monitoring company. Although the present disclosure describes diagnostics, processing, and alerting occurring in a remote monitoring system, some or all of these functions may be performed locally using installed equipment and/or customer resources, such as on a customer computer or computers.

Customers and/or HVAC contractors may be notified of current and predicted issues (e.g., dirty filter) affecting effectiveness or efficiency of the HVAC system and/or other mitigating devices, and may receive notifications related to routine maintenance. The methods of notification may take the form of push or pull updates to an application, which may be executed on a smartphone, tablet, another type of mobile device, or on a computer (e.g., laptop or desktop). Notifications may also be viewed using web applications or on local displays, such as on the thermostat and/or other displays located throughout the building. Notifications may also include text messages, emails, social networking messages, voicemails, phone calls, etc.

Based on measurements from the IAQ control module, the thermostat, and/or the IAQ sensor module, the monitoring company can determine whether various components are operating at their peak performance. The monitoring company can advise the customer and a contractor when performance is reduced. This performance reduction may be measured for the system as a whole, such as in terms of efficiency, and/or may be monitored for one or more individual components.

In addition, the monitoring system may detect and/or predict failures of one or more components of the system. When a failure is detected, the customer can be notified and potential remediation steps can be taken immediately. For example, components of the HVAC system may be shut down to prevent or minimize damage, such as water damage, to HVAC components. A contractor can also be notified that a service call may be required. Depending on the contractual relationship between the customer and the contractor, the contractor may schedule a service call to the building.

The monitoring system may provide specific information to a contractor, such as identifying information of the customer's components, including make and model numbers, as well as indications of the specific part numbers of components. Based on this information, the contractor can allocate the correct repair personnel that have experience with the specific components and/or the system. In addition, a service technician is able to bring replacement parts, avoiding return trips after diagnosis.

Depending on the severity of the failure, the customer and/or contractor may be advised of relevant factors in determining whether to repair or replace some or all of the components. For example only, these factors may include relative costs of repair versus replacement, and may include quantitative or qualitative information about advantages of replacement equipment. For example, expected increases in efficiency and/or comfort with new equipment may be provided. Based on historical usage data and/or electricity or other commodity prices, the comparison may also estimate annual savings resulting from the efficiency improvement.

As mentioned above, the monitoring system may also predict impending failures. This allows for preventative maintenance and repair prior to an actual failure of a component. Alerts regarding detected or impending failures reduce the time when the HVAC system is out of operation and allows for more flexible scheduling for both the customer and contractor. If the customer is out of town, these alerts may prevent damage from occurring when the customer is not present to detect the failure of a component. For example, failure of heating components of the HVAC system in winter may lead to pipes freezing and bursting.

Alerts regarding potential or impending failures may specify statistical timeframes before the failure is expected. For example only, if a sensor is intermittently providing bad data, the monitoring system may specify an expected amount of time before it is likely that the sensor effectively stops working due to the prevalence of bad data. Further, the monitoring system may explain, in quantitative or qualitative terms, how the current operation and/or the potential failure will affect operation of the HVAC system. This enables the customer to prioritize and budget for repairs.

For the monitoring service, the monitoring company may charge a periodic rate, such as a monthly rate. This charge may be billed directly to the customer and/or may be billed to the contractor. The contractor may pass along these charges to the customer and/or may make other arrangements, such as by requiring an up-front payment and/or applying surcharges to repairs and service visits.

The monitoring service allows the customer to remotely monitor real-time data within the building, outside of the building, and/or control components of the system, such as setting temperature and relative humidity setpoints and other IAQ setpoints, enabling or disabling heating, cooling, ventilation, air purification, etc. In addition, the customer may be able to track usage data for components of the system and/or historical data.

In addition to being uploaded to the remote monitoring service (also referred to as the cloud), monitored data may be transmitted to a local device in the building. For example, a smartphone, laptop, or proprietary portable device may receive monitoring information to diagnose problems and receive real-time performance data. Alternatively, data may be uploaded to the cloud and then downloaded onto a local computing device, such as via the Internet from an interactive website.

HVAC System

In FIG. 1, a block diagram of an example HVAC system is presented. As used in this application, the term HVAC encompasses all environmental comfort systems in a building, including heating, cooling, humidifying, dehumidifying, air exchanging, and purifying. Environmental comfort systems include devices such as furnaces, heat pumps, humidifiers, dehumidifiers, ventilators, and air conditioners. HVAC systems as described in this application do not necessarily include both heating and air conditioning, and may instead have only one or the other.

In this particular example, a forced air system with a gas furnace is shown. Return air is pulled from the building through an air filter 104 by a circulator blower 108. The air filter 104 reduces the amount of particulate matter in the return air. The air filter 104 is assigned a minimum efficiency reporting value (MERV) rating that is based on the filtration efficiency of the filter. Air filters with a higher MERV rating remove a larger percentage of particulate matter than air filters with a lower MERV rating. As an example, a typical, low-cost HVAC air filter may have a MERV rating of 7, removing only 50%-70% particulate matter 3 microns or larger in size and removing negligible amounts of particulate matter that is smaller than 3 microns. In contrast, an air filter with a MERV rating of 14 removes at least 90% of the particulate matter 3 microns or larger, 90% of the particulate matter between 3 microns and 1 micron in size, and 75%-85% of the particulate matter between 0.3 micron and 1 micron in size. Particulate matter that is 1 micron or smaller in size poses the greatest risk to health in humans.

The return air may also be drawn through a volatile organic compound (VOC) filter 106. The VOC filter 106 reduces the amount of VOCs in the return air. The VOC filter 106 may be an absorbent type VOC filter. For example, the VOC filter 106 may be an activated charcoal filter, a zeolite filter, an alumina oxide filter, or a baking soda filter. Activated charcoal filters are able to remove by absorption 9-10% of toluene, benzene, and o-xylene-three common VOCs found in a home. Activated charcoal filters may be unable to absorb alcohols, carbon monoxide, or inorganics. In various implementations, the air filter 104 may include both a particulate matter filter and an absorbent type VOC filter, which may be integrated into a single filter frame. The circulator blower 108, also referred to as a fan, is controlled by a control module 112. The control module 112 receives signals from a thermostat 116. For example only, the thermostat 116 may include one or more temperature setpoints specified by the user. The thermostat 116 may be a WiFi thermostat having wireless networking capability.

The thermostat 116 may direct that the circulator blower 108 be turned on at all times or only when a heat request or cool request is present (automatic fan mode). In various implementations, the circulator blower 108 can operate at one or more discrete speeds or at any speed within a predetermined range. For example, the control module 112 may actuate one or more switching relays (not shown) to control the circulator blower 108 and/or to select a speed of the circulator blower 108.

The thermostat 116 provides the heat and/or cool requests to the control module 112. When a heat request is made, the control module 112 causes a burner 120 to ignite. Heat from combustion is introduced to the return air provided by the circulator blower 108 in a heat exchanger 124. The heated air is supplied to the building and is referred to as supply air.

The burner 120 may include a pilot light, which is a small constant flame for igniting the primary flame in the burner 120. Alternatively, an intermittent pilot may be used in which a small flame is first lit prior to igniting the primary flame in the burner 120. A sparker may be used for an intermittent pilot implementation or for direct burner ignition. Another ignition option includes a hot surface igniter, which heats a surface to a temperature high enough that gas introduced to the heated surface will combust. Fuel for combustion, such as natural gas, may be provided by a gas valve 128.

The products of combustion are exhausted outside of the building. In a high efficiency furnace, the products of combustion may not be hot enough to have sufficient buoyancy to exhaust via convection. Therefore, an inducer blower 132 creates a draft to exhaust the products of combustion. The inducer blower 132 may be turned on prior to ignition of the burner 120. The inducer blower 132 may remain running while the burner 120 is operating. In addition, the inducer blower 132 may continue running for a set period of time after the burner 120 turns off.

An enclosure, which will be referred to as air handler unit 136, may include the air filter 104, the VOC filter 106, the circulator blower 108, the control module 112, the burner 120, the heat exchanger 124, the inducer blower 132, an expansion valve 140, an evaporator 144, a condensate pan 146, and a transformer 147. The transformer 147 is connected to an alternating current (AC) power line in order to provide AC power to the control module 112 and the thermostat 116. For example, the transformer 147 may be a 10-to-1 transformer and therefore provide either a 12 V or 24 V AC supply depending on whether the air handler unit 136 is operating on nominal 120 V or nominal 240 V power. In various implementations, the air handler unit 136 includes an electrical heating device (not shown) instead of or in addition to the burner 120. When used in addition to the burner 120, the electrical heating device may provide backup or secondary (extra) heat.

The HVAC system of FIG. 1 includes a split air conditioning system. Refrigerant is circulated through a compressor 148, a condenser 152, the expansion valve 140, and the evaporator 144. The evaporator 144 is placed in series with the supply air so that when cooling is desired, the evaporator 144 removes heat from the supply air, thereby cooling the supply air. During cooling, the evaporator 144 is cold (generally, below the dew point of the air within the building), which causes water vapor to condense. This water vapor is collected in the condensate pan 146, which drains or is pumped out.

A control module 156 receives a cool request from the control module 112 and controls the compressor 148 accordingly. The control module 156 also controls a condenser fan 160, which increases heat exchange between the condenser 152 and outside air. In such a split system, the compressor 148, the condenser 152, the control module 156, and the condenser fan 160 are generally located outside of the building, often in an enclosure referred to as a condensing unit 164.

In various implementations, the control module 156 may include a run capacitor, a start capacitor, and a contactor or relay. In various implementations, the start capacitor may be omitted, such as when the condensing unit 164 includes a scroll compressor instead of a reciprocating compressor. The compressor 148 may be a variable-capacity compressor and may respond to a multiple-level cool request. For example, the cool request may indicate a mid-capacity call for cooling or a high-capacity call for greater cooling. The compressor 148 therefore varies its capacity according to the cool request.

The electrical lines provided to the condensing unit 164 may include a 240 V mains power line and a 24 V switched control line. The 24 V control line may correspond to the cool request shown in FIG. 1. The 24 V control line controls operation of the contactor. When the control line indicates that the compressor should be on, the contactor contacts close, connecting the 240 V power supply to the compressor 148. In addition, the contactor may connect the 240 V power supply to the condenser fan 160. In various implementations, such as when the condensing unit 164 is located in the ground as part of a geothermal system, the condenser fan 160 may be omitted. When the 240 V mains power supply arrives in two legs, as is common in the U.S., the contactor may have two sets of contacts, and can be referred to as a double-pole single-throw switch.

The thermostat 116 typically includes a temperature sensor and sometimes includes a relative humidity sensor. When in a heating (heat) mode, the thermostat 116 generates a heat request when the temperature measured by the temperature sensor is less than a lower temperature limit. When in a cooling (cool) mode, the thermostat 116 generates a cool request when the temperature measured by the temperature sensor is greater than an upper temperature limit. The upper and lower temperature limits may be set based on a setpoint temperature plus and minus a predetermined amount (such as 1, 2, 3, 4, 5 degrees Fahrenheit). The setpoint temperature may be set to a predetermined temperature by default and may be adjusted by a user.

In many systems, the air handler unit 136 is located inside the building, while the condensing unit 164 is located outside the building. The present disclosure is not limited to that arrangement, however, and applies to other systems including, as examples only, systems where the components of the air handler unit 136 and the condensing unit 164 are located in close proximity to each other or even in a single enclosure. The single enclosure may be located inside or outside of the building. In various implementations, the air handler unit 136 may be located in a basement, garage, or attic. In ground source systems, where heat is exchanged with the earth, the air handler unit 136 and the condensing unit 164 may be located near the earth, such as in a basement, crawlspace, garage, or on the first floor, such as when the first floor is separated from the earth by only a concrete slab.

In split HVAC systems, an air handler unit is often located indoors and a condensing unit is often located outdoors. In heat pump systems, the function of the air handler unit and the condensing unit are reversed depending on the mode of the heat pump. As a result, although the present disclosure uses the terms air handler unit and condensing unit, the terms indoor unit and outdoor unit could be used instead in the context of a heat pump. The terms indoor unit and outdoor unit emphasize that the physical locations of the components stay the same while their roles change depending on the mode of the heat pump. A reversing valve selectively reverses the flow of refrigerant from what is shown in FIG. 1 depending on whether the system is heating the building or cooling the building in a heat pump system. When the flow of refrigerant is reversed, the roles of the evaporator and condenser are reversed—in other words, refrigerant evaporation occurs in what is labeled the condenser while refrigerant condensation occurs in what is labeled as the evaporator.

Figure 2:
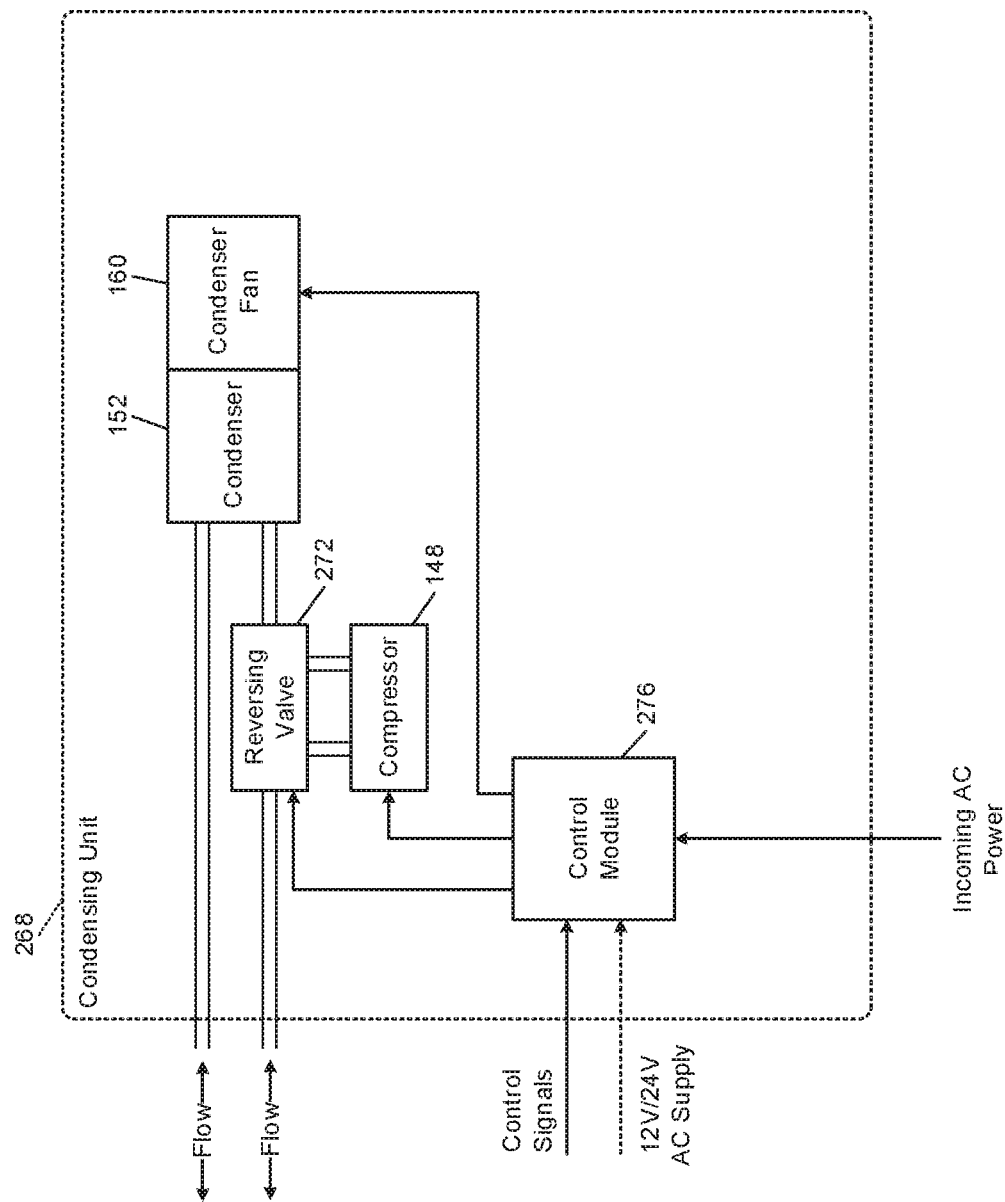
FIG. 2 is a functional block diagram of an example condenser unit of an example HVAC system that includes a heat pump.

In FIG. 2, an example condensing unit 268 is shown for a heat pump implementation in which the HVAC system would include the condensing unit 268 in place of the condensing unit 164 of FIG. 1. The condensing unit 268 may be configured similarly to the condensing unit 164 of FIG. 1. Although referred to as the condensing unit 268, the mode of the heat pump determines whether the condenser 152 of the condensing unit 268 is actually operating as a condenser or as an evaporator. A reversing valve 272 is controlled by a control module 276 and determines whether the compressor 148 discharges compressed refrigerant toward the condenser 152 (cooling mode) or away from the condenser 152 (heating mode). The control module 276 controls the reversing valve 272 and the compressor 148 based on the control signals. The control module 276 may receive power from, for example, the transformer 147 of the air handler unit 136 or the incoming alternating current (AC) power line.

IAQ Sensor Module

Figure 3:
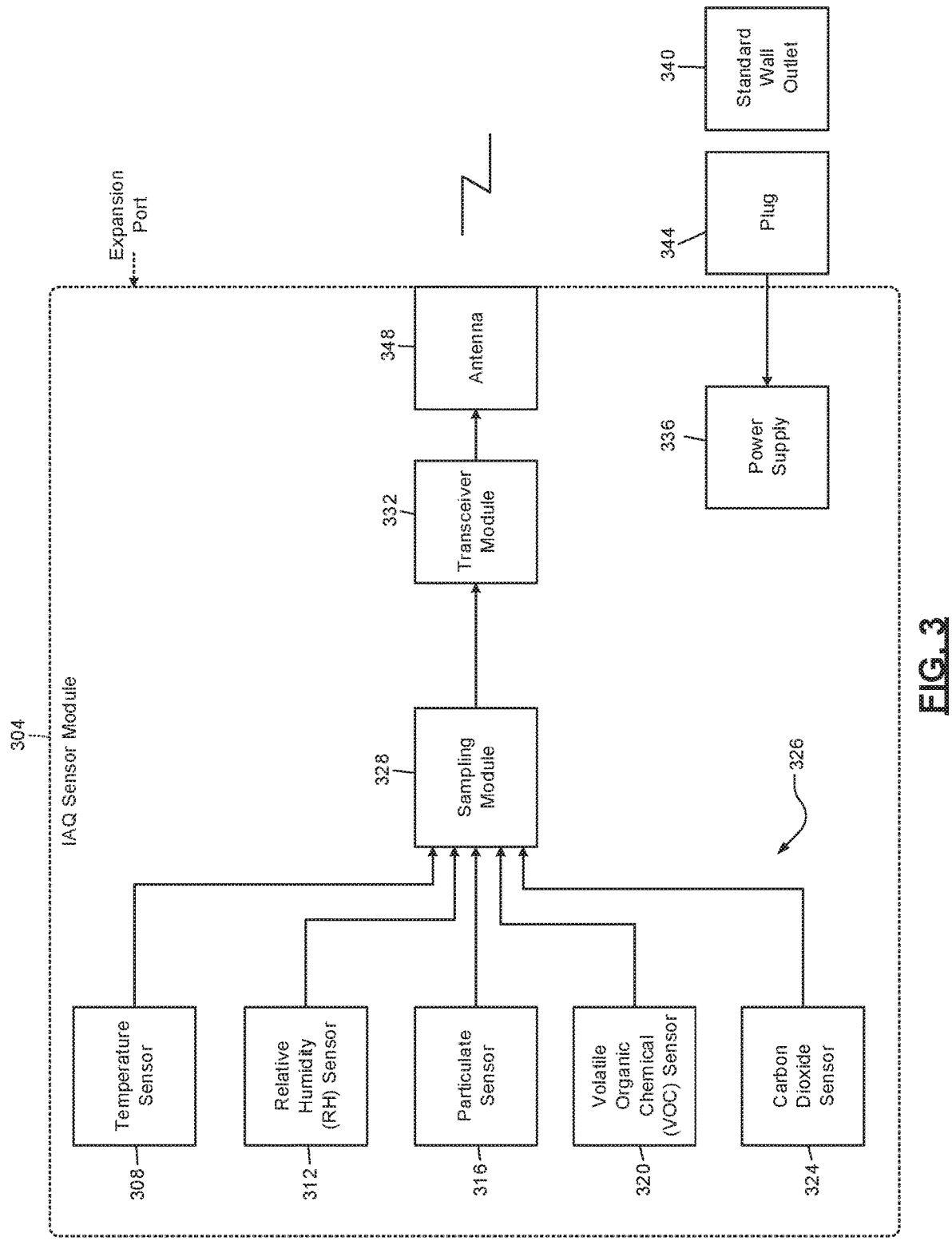
FIG. 3 is a functional block diagram of an example indoor air quality (IAQ) sensor module that can be used with an HVAC system and/or other IAQ mitigation devices.

FIG. 3 includes a functional block diagram of an example indoor air quality (IAQ) sensor module 304 that can be used with an HVAC system and/or one or more other mitigation devices. The IAQ sensor module 304 includes one or more of: a temperature sensor 308, a relative humidity sensor 312, a particulate sensor 316, a VOC sensor 320, and a carbon dioxide sensor 324. The IAQ sensor module may also include one or more other IAQ sensors, such as occupancy, barometric pressure, airflow, light, sound, etc. The included sensors of the IAQ sensor module 304 will be referred to collectively as IAQ sensors 326. The IAQ sensor module 304 may also include a sampling module 328 and a transceiver module 332.

A power supply 336 may receive AC power from a standard wall outlet (or receptacle) 340 via a plug 344. For example, the standard wall outlet 340 may provide nominal 120 V or nominal 240 V AC power. The power supply 336 may include an AC-to-DC (direct current) converter that converts the AC power into DC power, such as 5 V, 12 V, or 24 V DC power. The power supply 336 supplies power to the components of the IAQ sensor module 304, including the sensors, the sampling module 328, and the transceiver module 332. In various implementations, the power supply 336 may provide two or more different DC voltages to different components of the IAQ sensor module 304. In other implementations, the power supply 336 may be integrated with the plug 344.

Additionally or alternatively, the power supply 336 may include a battery (or multiple batteries) and/or a solar cell (or multiple solar cells) that supplies power to the components of the IAQ sensor module 304. The battery may be replaceable or non-replaceable. In the example of the battery being non-replaceable, the battery may be re-chargeable, such as via a standard wall outlet. In this example, the IAQ sensor module 304 may include a charger that charges the battery using power supplied, for example, via the standard wall outlet 340.

The IAQ sensor module 304 may be portable for easy movement into different rooms of a building. The IAQ sensor module 304 could also be placed outside the building, for example, to measure one or more conditions outside of the building, for calibration, or for other reasons. The temperature sensor 308 measures a temperature of air at the IAQ sensor module 304. The relative humidity sensor 312 measures a relative humidity of air at the IAQ sensor module 304. The particulate sensor 316 measures an amount (for example, micrograms (μg)) of particulate in air (for example, a cubic meter ($m^3$)) at the IAQ sensor module 304 having a diameter that is less than a predetermined size (for example, 2.5 or 10 micrometers (μm)). The VOC sensor 320 measures an amount (for example, parts per billion (ppb)) of VOC in air at the IAQ sensor module 304. The carbon dioxide sensor 324 measures an amount (for example, parts per million (ppm)) of carbon dioxide in air at the IAQ sensor module 304.

The sampling module 328 samples (analog) measurements of the IAQ sensors 326. The sampling module 328 may also digitize and/or store values of the measurements of the IAQ sensors 326. In various implementations, the IAQ sensors 326 may be digital sensors and output digital values corresponding to the respective measured parameters. In such implementations, the sampling module 328 may perform a storage function or may be omitted.

The IAQ sensor module 304 may include one or more expansion ports to allow for connection of additional sensors and/or to allow connection to other devices. Examples of other devices include one or more other IAQ sensor modules, other types of IAQ sensors not included in the IAQ sensor module 304, a home security system, a proprietary handheld device for use by contractors, a mobile computing device, and other types of devices.

The transceiver module 332 transmits frames of data corresponding to predetermined periods of time. Each frame of data may include the measurements of the IAQ sensors 326 over a predetermined period. One or more calculations may be performed for the data of each frame of data, such as averages. Each frame (including the calculations and/or the measurements) may be transmitted to a monitoring system, as discussed further below. The measurements of the IAQ sensors 326 may be sampled at a predetermined rate, such as 10 samples per minute or another suitable rate. In various implementations, individual sensors of the IAQ sensors 326 may be sampled at different rates. Each frame may correspond to a predetermined number of sets of samples (e.g., 10) or a predetermined window of time. The monitoring system may provide visual representations of the measurements over predetermined periods of time along with other data, as discussed further below.

The transceiver module 332 transmits each frame (including the calculations and/or the measurements) to an IAQ control module 404 (see FIG. 4B) and/or the thermostat 116. The transceiver module 332 transmits the frames wirelessly via one or more antennas, such as antenna 348, using a proprietary or standardized, wired or wireless protocol, such as Bluetooth, ZigBee (IEEE 802.15.4), 900 Megahertz, 2.4 Gigahertz, or WiFi (IEEE 802.11). The IAQ sensor module 304 may communicate directly with the IAQ control module 404 and/or the thermostat 116 or with a separate computing device, such as a smartphone, tablet, or another type of computing device.

IAQ Control Module

Figure 4B:
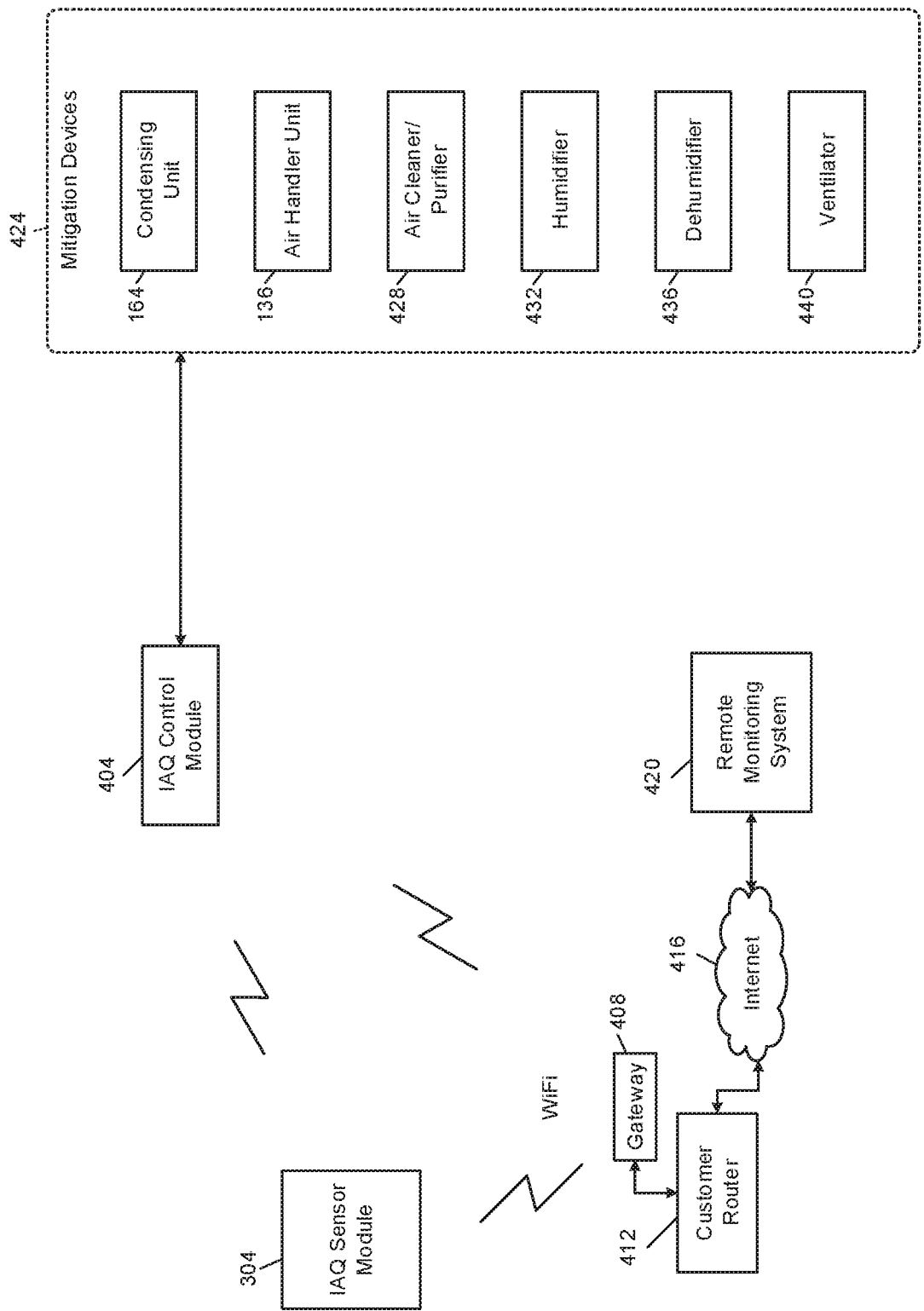
Figure 4C:
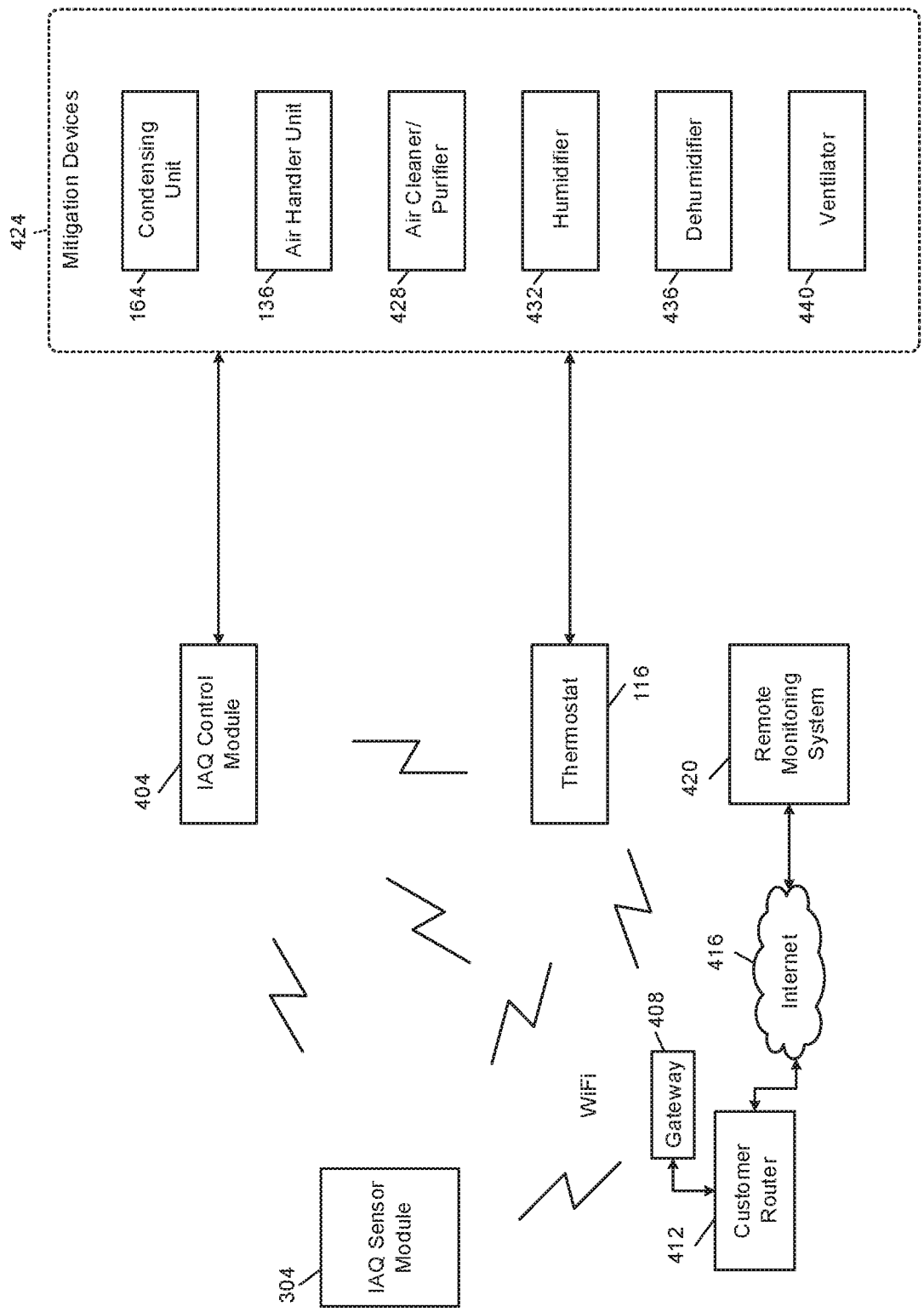

Referring now to FIGS. 4A-4C, functional block diagrams of example IAQ control systems are presented. In various implementations, a gateway 408 is implemented, which creates a wireless network for the IAQ sensor module 304, IAQ control module 404, and the thermostat 116. The gateway 408 may also interface with a customer router 412 using a wired or wireless protocol, such as Ethernet (IEEE 802.3). The IAQ control module 404 may communicate with the customer router 412 using WiFi. Alternatively, the IAQ control module 404 may communicate with the customer router 412 via the gateway 408. The thermostat 116 may also communicate with the customer router 412 using WiFi or via the gateway 408. In various implementations, the IAQ control module 404 and the thermostat 116 may communicate directly or via the gateway 408.

The IAQ sensor module 304, the IAQ control module 404, and/or the thermostat 116 transmit data measured by the IAQ sensor module 304 and parameters of the IAQ control module 404 and/or the thermostat 116 over a wide area network, such as the Internet 416. The IAQ sensor module 304, the IAQ control module 404, and/or the thermostat 116 may access the Internet 416 using the customer router 412 of the customer. The customer router 412 may already be present to provide Internet access to other devices (not shown) within the building, such as a customer computer and/or various other devices having Internet connectivity, such as a DVR (digital video recorder) or a video gaming system.

The IAQ sensor module 304, the IAQ control module 404, and/or the thermostat 116 transmit the data to a remote monitoring system 420 via the Internet 416 using the customer router 412. Further discussion of the remote monitoring system 420 is provided below.

The IAQ control module 404 and/or the thermostat 116 controls operation of mitigation devices 424 based on the measurements from the IAQ sensor module 304. For example, the measurements of the IAQ sensor module 304 may be provided to the thermostat 116 and the thermostat 116 may control operation of the mitigation devices 424 in various implementations (e.g., FIG. 4A). The IAQ control module 404 can be omitted in such implementations. While the example of the thermostat 116 controlling the mitigation devices 424 will be discussed, alternatively the IAQ control module 404 may control operation of the mitigation devices 424 (e.g., FIG. 4B), or the thermostat 116 and the IAQ control module 404 may together control the mitigation devices 424 (e.g., FIG. 4C).

The IAQ control module 404 and/or thermostat 116 can communicate with the mitigation devices 424 wirelessly, by wire, or using a combination of wireless and wired connections. In the case of wireless control and communication, the IAQ control module 404, the thermostat 116, and the mitigation devices 424 include respective transceivers.

The mitigation devices 424 include: (i) the condensing unit 164, (ii) the air handler unit 136 (including the circulator blower 108), (iii) an air cleaner/purifier 428, (iv) a humidifier 432, (v) a dehumidifier 436, and (vi) a ventilator 440. Operation of the mitigation devices 424 may be controlled via the thermostat 116, the IAQ sensor module 304, and/or the remote monitoring system 420. The mitigation devices 424 may communicate directly with the thermostat 116, via the customer router 412, and or via a remote back-end, such as the remote monitoring system 420. The mitigation devices 424 may communicate using wired or wireless interfaces, which may be standardized or proprietary. For illustration only, the thermostat 116 will be the controlling device in the following discussion.

The air cleaner/purifier 428 is separate from the air handler unit 136. In other implementations, the air handler unit 136 may serve as the air cleaner/purifier 428. The air cleaner/purifier 428 draws in air and forces the air through a filter before expelling filtered air to the building. The filter may be rated to remove a predetermined amount (for example, 95%) of particulate of the size measured by the particulate sensor 316. Operation of the air cleaner/purifier 428 may include whether the air cleaner/purifier 428 is on or off and, when on, a speed of the air cleaner/purifier 428. The air cleaner/purifier 428 may have a single speed or multiple discrete speeds.

The thermostat 116 may control whether the air cleaner/purifier 428 is on or off and, if on, the speed of the air cleaner/purifier 428. As one example, the thermostat 116 may turn the air cleaner/purifier 428 on when the amount of particulate measured by the particulate sensor 316 is greater than a first predetermined amount of particulate. The thermostat 116 may leave the air cleaner/purifier 428 on until the amount of particulate measured by the particulate sensor 316 is less than a second predetermined amount of particulate that is less than the first predetermined amount of particulate. The thermostat 116 may turn the air cleaner/purifier 428 off when the amount of particulate measured by the particulate sensor 316 is less than the second predetermined amount of particulate. In various implementations, the thermostat 116 may vary the speed of the air cleaner/purifier 428 based on the amount of particulate measured by the particulate sensor 316. For example, the thermostat 116 may increase the speed of the air cleaner/purifier 428 as the amount of particulate increases and vice versa.

The humidifier 432 humidifies air within the building. Operation of the humidifier 432 may also reduce the amount of particulate in air within the building. The humidifier 432 may be included with the air handler unit 136 or may be a stand-alone humidifier. For example, when included with the air handler unit 136, the humidifier 432 may add moisture to the supply air before the supply air is outputted from vents to the building. The humidifier 432 may add moisture to air, for example, by supplying water to a medium (such as a pad) and forcing air through the hydrated medium. Alternatively, the humidifier 432 may spray water in the form of mist into air. In the example of a stand-alone humidifier, the humidifier 432 may spray water in the form of mist into the conditioned space.

Operation of the humidifier 432 may include whether the humidifier 432 is on or off. In various implementations, operation of the humidifier 432 may also include a humidification rate (for example, an amount of water supplied to the pad or into the air as mist over a period of time). The humidifier 432 may have a single humidification rate or multiple discrete humidification rates.

When the humidifier 432 is included with the air handler unit 136, the humidifier 432 may turn on with the burner 120, governed by a predetermined humidity setpoint. In various implementations, the thermostat 116 may control this setpoint or command the humidifier 432 to turn off. If the humidifier 432 is implemented separately from the air handler unit 136, the thermostat 116 may control whether the humidifier 432 is on or off and a humidification rate when on. For example only, the thermostat 116 may turn the humidifier 432 on when the relative humidity measured by the relative humidity sensor 312 is less than a first predetermined relative humidity. The thermostat 116 may leave the humidifier 432 on until the relative humidity measured by the relative humidity sensor 312 is greater than a second predetermined relative humidity that is greater than the first predetermined relative humidity. The thermostat 116 may turn the humidifier 432 off when the relative humidity measured by the relative humidity sensor 312 is greater than the second predetermined relative humidity.

The dehumidifier 436 dehumidifies air within the building. The dehumidifier 436 may be included with the air handler unit 136 or may be a stand-alone dehumidifier. For example, the dehumidifier 436 may draw moisture from the supply air (or add dry air to the supply air) before the supply air is outputted from vents to the building. Operation of the dehumidifier 436 may include whether the dehumidifier 436 is on or off.

The thermostat 116 may control whether the dehumidifier 436 is on or off. For example only, the thermostat 116 may turn the dehumidifier 436 on when the relative humidity measured by the relative humidity sensor 312 is greater than a third predetermined relative humidity. The third predetermined relative humidity may be the same as the second predetermined relative humidity or different than (for example, greater than) the second predetermined relative humidity. The thermostat 116 may leave the dehumidifier 436 on until the relative humidity measured by the relative humidity sensor 312 is less than a fourth predetermined relative humidity that is less than the third predetermined relative humidity. The fourth predetermined relative humidity may be the same as the first predetermined relative humidity or different than (for example, greater than) the first predetermined relative humidity.

The ventilator 440 vents air from within the building out of the building. This also draws air from outside of the building into the building. The ventilator 440 may be included with the air handler unit 136 (for example, the inducer blower 132) or a stand-alone ventilator. Examples of stand-alone ventilators include blowers that blow air from within the building out of the building (for example, range hoods fans, bathroom fans, etc.). Operation of the ventilator 440 may include whether the ventilator 440 is on or off and, when on, a speed. The ventilator 440 may have a single speed or multiple discrete speeds.

The thermostat 116 may control whether the ventilator 440 is on or off and, if on, the speed of the ventilator 440. As one example, the thermostat 116 may turn the ventilator 440 on when the amount of VOCs measured by the VOC sensor 320 is greater than a first predetermined amount of VOCs. The thermostat 116 may leave the ventilator 440 on until the amount of VOCs measured by the VOC sensor 320 is less than a second predetermined amount of VOCs that is less than the first predetermined amount of VOCs.

As another example, the thermostat 116 may turn the ventilator 440 on when the amount of carbon dioxide measured by the carbon dioxide sensor 324 is greater than a first predetermined amount of carbon dioxide. The thermostat 116 may leave the ventilator 440 on until the amount of carbon dioxide measured by the carbon dioxide sensor 324 is less than a second predetermined amount of carbon dioxide that is less than the first predetermined amount of carbon dioxide.

The mitigation devices 424 are described only as examples. One or more of the example mitigation devices may be omitted. One or more other types of mitigation devices may be included. Additionally, while the example of only one of each type of mitigation device is provided, two or more of a given type of mitigation device may be included and controlled.

Changes in temperature and/or humidity also cause changes in particulate matter, VOCs, and/or carbon dioxide. For example, a change in temperature may cause a change in VOCs, relative humidity, particulate, and/or carbon dioxide. As another example, a change in relative humidity may cause a change in particulate matter, VOCs, and/or carbon dioxide. For example, particulate matter may increase as relative humidity increases and vice versa.

The thermostat 116 therefore may control operation of the mitigation devices 424 based on all of the parameters measured by the IAQ sensor module 304 in an attempt to: adjust the temperature to within a predetermined temperature range, adjust the relative humidity to within a predetermined relative humidity range, adjust the amount of particulate (if measured) to less than a predetermined amount of particulate, adjust the amount of VOCs (if measured) to less than a predetermined amount of VOCs, and to adjust the amount of carbon dioxide (if measured) to less than a predetermined amount of carbon dioxide.

Block Diagrams

Figure 5A:
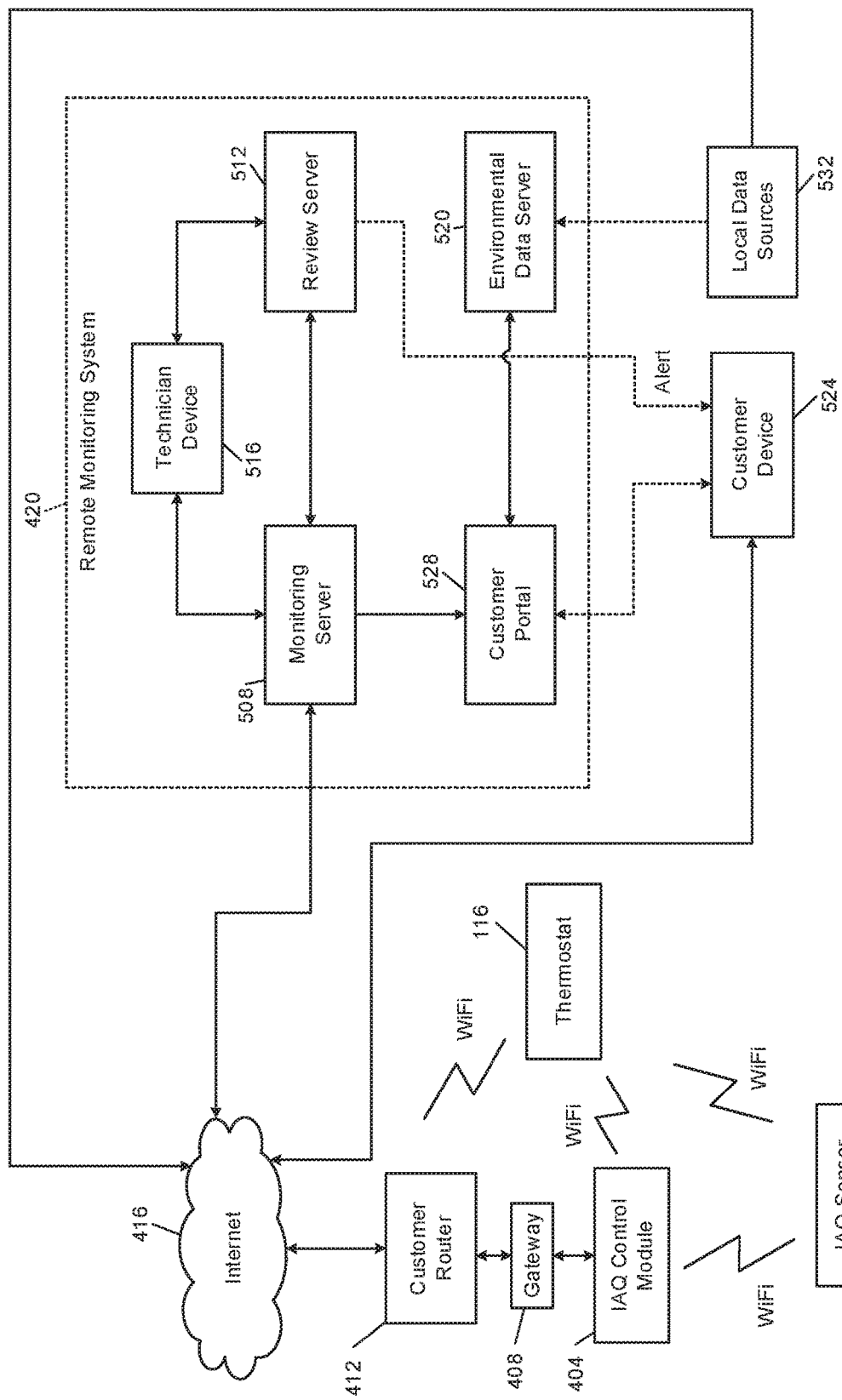
FIG. 5A is a functional block diagram of an example remote monitoring system.

FIG. 5A includes a functional block diagram of an example monitoring system. In FIG. 5A, the IAQ control module 404 and/or the thermostat 116 are shown transmitting, using the customer router 412, data to the remote monitoring system 420 via the Internet 416. In other implementations, the IAQ control module 404 and/or the thermostat 116 may transmit the data to an external wireless receiver. The external wireless receiver may be a proprietary receiver for a neighborhood in which the building is located, or may be an infrastructure receiver, such as a metropolitan area network (such as WiMAX) receiver, a WiFi access point, or a mobile phone base station.

The remote monitoring system 420 includes a monitoring server 508 that receives data from the IAQ control module 404 and/or the thermostat 116 and maintains and verifies network continuity with the IAQ control module 404 and/or the thermostat 116. The monitoring server 508 executes various algorithms to store setpoints for the building and to store measurements from the thermostat 116 and/or the IAQ sensor module 304.

The monitoring server 508 may notify a review server 512 when one or more predetermined conditions are satisfied. This programmatic assessment may be referred to as an advisory. Some or all advisories may be triaged by a technician to reduce false positives and potentially supplement or modify data corresponding to the advisory. For example, a technician device 516 operated by a technician may be used to review the advisory and to monitor data (in various implementations, in real time) from the IAQ control module 404 and/or the thermostat 116 via the monitoring server 508.

A technician using the technician device 516 may review the advisory. If the technician determines that a problem or fault is either already present or impending, the technician instructs the review server 512 to send an alert to a customer device 524 that is associated with the building. The technician may determine that, although a problem or fault is present, the cause is more likely to be something different than specified by the automated advisory. The technician can therefore issue a different alert or modify the advisory before issuing an alert based on the advisory. The technician may also annotate the alert sent to the customer device 524 with additional information that may be helpful in identifying the urgency of addressing the alert and presenting data that may be useful for diagnosis or troubleshooting.

In various implementations, minor problems may not be reported to the customer device 524 so as not to alarm the customer or inundate the customer with alerts. The review server 512 (or a technician) may determine whether a problem is minor based on a threshold. For example, an efficiency decrease that is less than a predetermined threshold may not be reported to the customer device 524.

In various implementations, the technician device 516 may be remote from the remote monitoring system 420 but connected via a wide area network. For example only, the technician device 516 may include a computing device such as a laptop, desktop, smartphone, or tablet.

Using the customer device 524, the customer can access a customer portal 528, which provides historical and real-time data from the IAQ control module 404 and/or the thermostat 116. The customer portal 528 may also provide setpoints and predetermined ranges for each of the measurements, local outdoor air quality data, statuses of the mitigation devices 424 (e.g., on or off), and other data to the customer device 524. The customer portal 528 may be accessed using a web browser and/or a proprietary client application. Via the customer device 524, the customer may change the setpoints, predetermined ranges, and other data collected from the customer device 524. The monitoring server 508 transmits changed setpoints and predetermined ranges to the thermostat 116 and/or the IAQ control module 404 for use in controlling operation of the mitigation devices 424.

The remote monitoring system 420 includes an environmental data server 520 that obtains local environmental data for the geographical area surrounding the building. The environmental data server 520 may obtain the local environmental data from one or more environmental data sources 532 via a wide area network, such as the Internet 416. The geographical location of the building may be specified by, for example, an address, zip code, coordinates, or other geographical identifier of the building. The remote monitoring system 420 may obtain the geographical location of the building, for example, via the customer device 524 before providing data to the customer device 524. The local environmental data includes, for example, air temperature, relative humidity, amount of VOCs in the air, amount of particulate matter (which may be restricted to certain sizes measurable by the particulate sensor 316), amount of carbon dioxide, barometric pressure, allergen information, and weather forecast information.

Figure 5B:
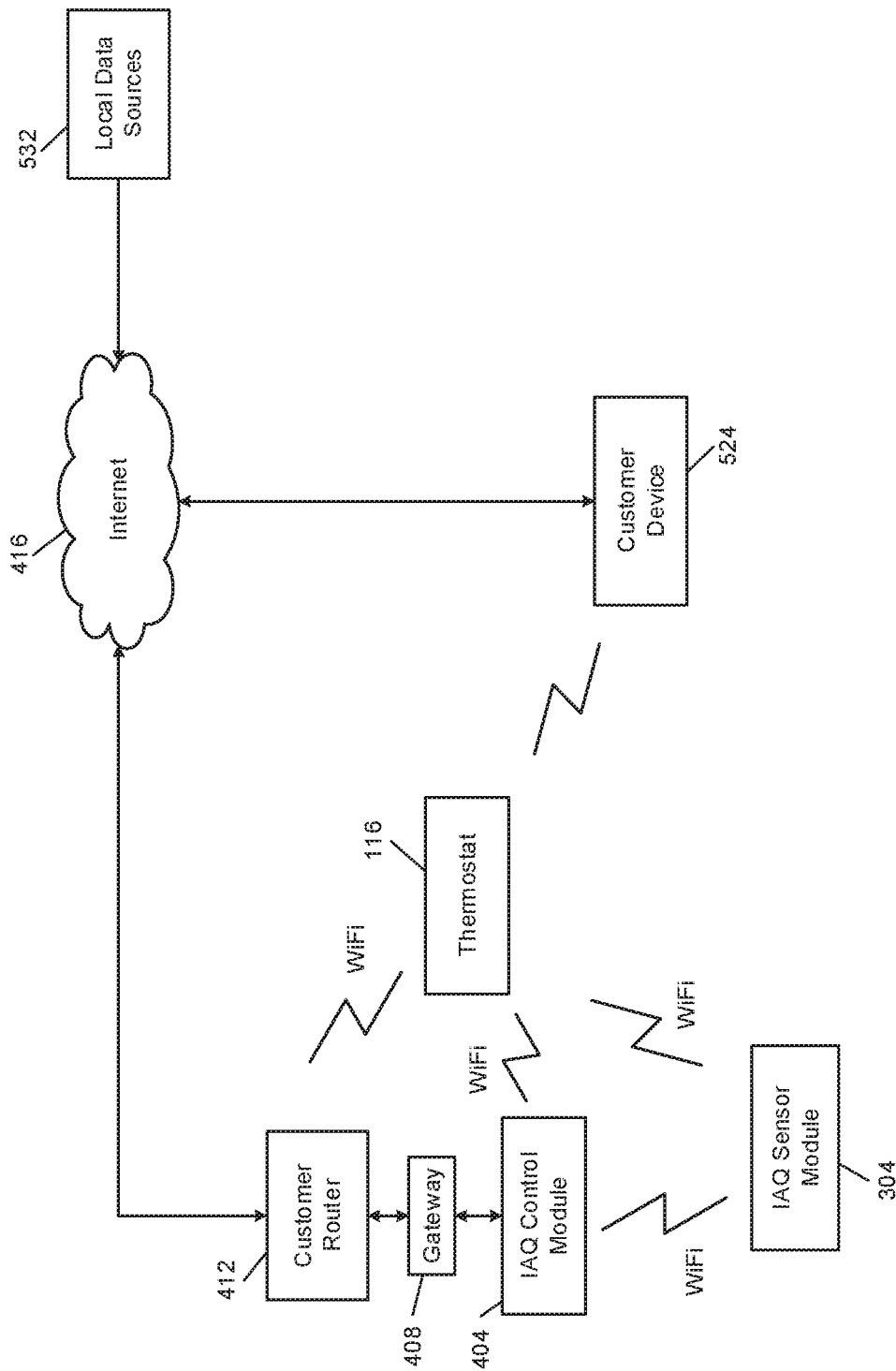
FIG. 5B is a functional block diagram of an example monitoring system.

FIG. 5B includes a functional block diagram of an example monitoring system where the customer device 524 serves as a monitoring system and provides the functionality of the remote monitoring system. The thermostat 116 and/or the IAQ control module 404 transmit data to the customer device 524 directly, such as via a Bluetooth connection, WiFi, or another wireless connection or via the Internet 416. The customer device 524 may obtain the local environmental data from the environmental data sources 532 via a wide area network, such as the Internet 416.

User Interface

Figure 6:
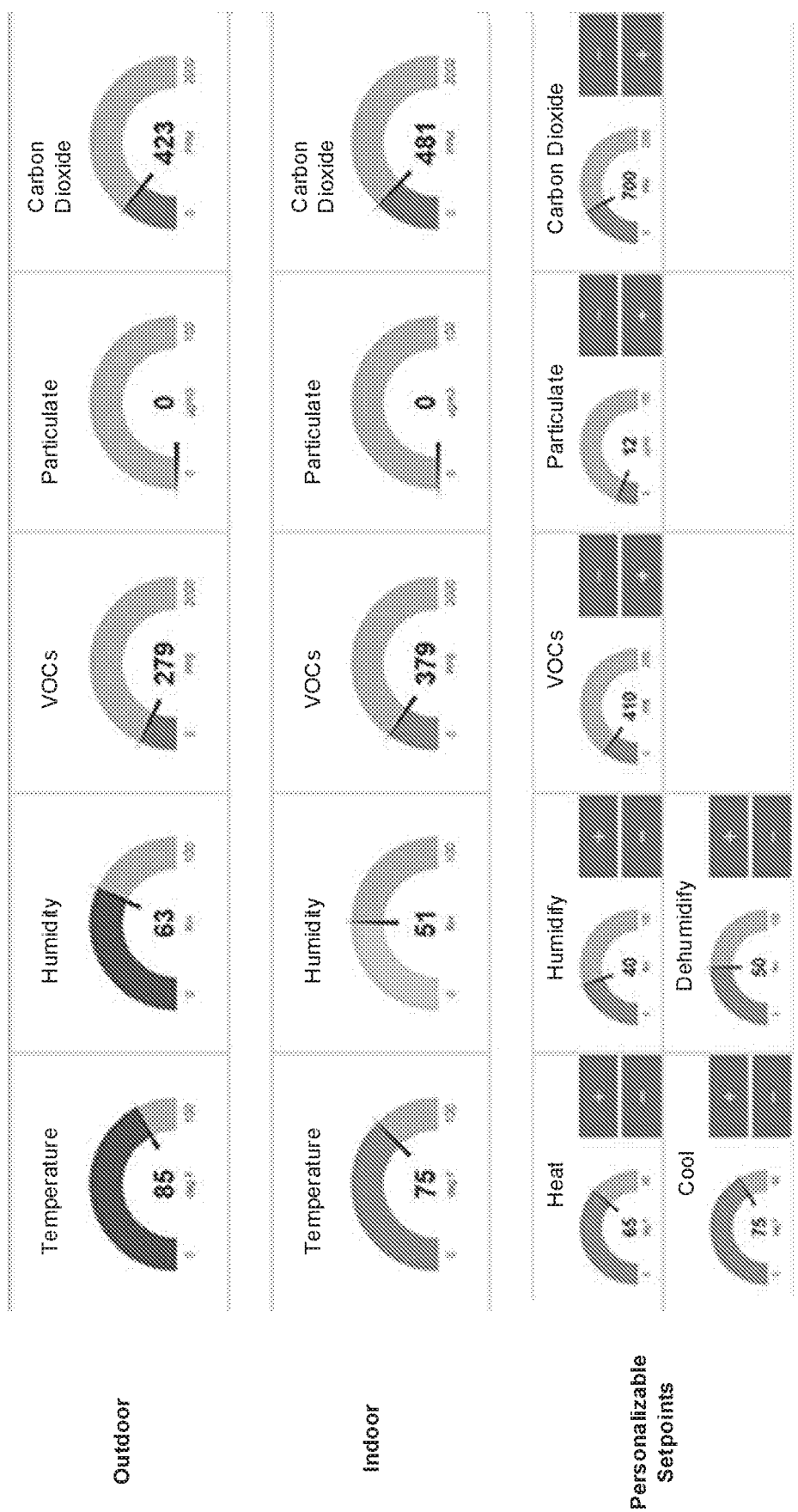

FIG. 6 includes an example user interface displayed by the customer device 524 based on data from the customer portal 528. The following functions may be performed by the customer device 524 during execution of an installed IAQ application.

As shown in FIG. 6, the customer device 524 may display real-time values of the temperature, relative humidity, amount of VOCs, amount of particulate, and amount of carbon dioxide ($CO_2$) measured by the IAQ sensor module 304. In FIG. 6, these are illustrated in the row labeled "Indoor" as they represent parameters within the building. The real-time values are received by the customer device 524 from the monitoring server 508 via the customer portal 528.

The customer device 524 may also display real-time values of the temperature, relative humidity, amount of VOCs, amount of particulate, and amount of carbon dioxide (CO₂) of the air surrounding the building. In FIG. 6, these are illustrated in the row labeled "Outdoor" as they represent parameters outside of the building. The real-time values are received by the customer device 524 from the monitoring server 508 via the customer portal 528.

The customer device 524 may also display present setpoints for beginning heating (Heat) of the building, cooling (Cool) of the building, humidification (Humidify), dehumidification (Dehumidify), VOC removal (VOCs), particulate removal (Particulate), and carbon dioxide removal (Carbon Dioxide). In FIG. 6, these are illustrated in the row labeled "Personalizable Setpoints" as they represent setpoints for beginning associated mitigation actions within the building. The present setpoints may be received by the customer device 524 from the monitoring server 508 via the customer portal 528.

A range of desired values for a measurement may be set based on the corresponding setpoint. For example, a range of desired values for humidification may be bounded by the humidify setpoint plus and minus a predetermined amount. A range of desired values for particulate may be bounded by the particulate setpoint plus and minus a predetermined amount.

The customer device 524 may allow a user to adjust one or more of the setpoints via the customer device 524. For example, the customer device 524 may provide positive and negative adjustment inputs in association with one or more of the setpoints to allow for adjustment of the present setpoints. FIG. 6 includes the example of "+" serving as the positive adjustment input and "−" serving as the negative adjustment input. Adjustment inputs labeled and configured differently, however, may be used.

In response to receipt of input indicative of user interaction (such as touching, clicking, etc.) with an adjustment input associated with a setpoint, the customer device 524 may transmit a command to the monitoring server 508 to adjust (increment or decrement) the setpoint by a predetermined amount. For example, in response to receipt of input indicative of user interaction with the positive adjustment input associated with the heating temperature setpoint, the customer device 524 may transmit a command to the monitoring server 508 to increment the heating temperature setpoint by a first predetermined amount. In response to receipt of input indicative of user interaction with the negative adjustment input associated with the heating temperature setpoint, the customer device 524 may transmit a command to the monitoring server 508 to decrement the heating temperature setpoint by the first predetermined amount. As another example, in response to receipt of input indicative of user interaction with the positive adjustment input associated with the humidification relative humidity setpoint, the customer device 524 may transmit a command to the monitoring server 508 to increment the humidification relative humidity setpoint by a second predetermined amount.

The monitoring server 508 relays (transmits) received commands for adjusting setpoints to the thermostat 116 and/or the IAQ control module 404 via the Internet 416. The thermostat 116 and/or the IAQ control module 404 adjust the associated setpoints in response to the commands received from the monitoring server 508.

Figure 7:
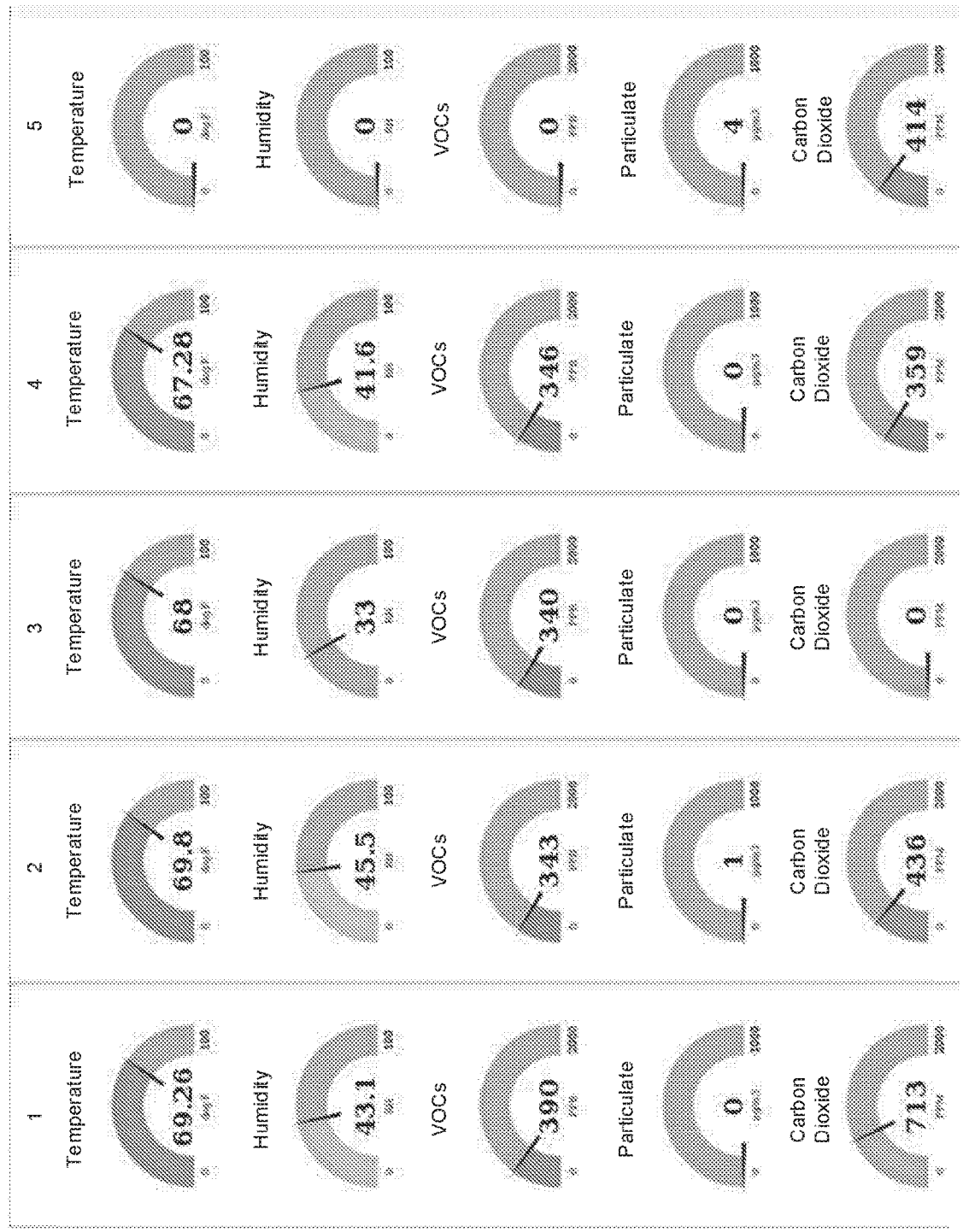

As discussed above, one or more than one IAQ sensor module 304 may be concurrently used within the building, such as in different rooms of the building. FIG. 7 includes an example user interface displayed by the customer device 524 during execution of the application based on data from the customer portal 528 when the building includes multiple IAQ sensor modules. In the example of FIG. 7, the measurements from each IAQ sensor module are shown in a separate column. In the user interface, each column includes a customizable label. In FIG. 7, the columns labels are numerical values—for example, 1, 2, and 3. However, a user may use the customer device 524 to edit the label of each column to aid in identifying the location of each IAQ sensor—for example, "Living Room" or "Kitchen".

As also discussed above, one or more of the IAQ sensors may be omitted from an IAQ sensor module. For example, as shown in the right-most column of FIG. 7, the associated IAQ sensor module only includes a particulate sensor and a carbon dioxide sensor. The temperature, relative humidity, and VOC readings of zero indicate that the IAQ sensor module does not include a temperature sensor, a humidity sensor, or a VOC sensor. Alternatively, the user interface may only display icons associated with the sensors included in each IAQ sensor.

FIG. 8 includes an example user interface displayed by the customer device 524 during execution of the application based on additional data from the customer portal 528 indicative of present statuses of control modes and present statuses of various devices of the building. The present status of a control mode or device may be on (currently in use) or off (not currently in use). One type of indicator may be used to indicate a present status of on, while another type of indicator may be used to indicate a present status of off. The customer device 524 may display the additional data concurrently with the data from one or more IAQ modules, the local environmental data, and/or the setpoint data.

The customer device 524 selectively displays measurements of one or more IAQ sensor modules, local data, control modes, and/or statuses from a predetermined period of time. The predetermined period of time may be, for example, the present day, a predetermined number of days, a predetermined number of hours before a present time, a predetermined number of minutes before the present time, or another suitable period. By default, a predetermined period may be selected (for example, the present day) but a user may select a different predetermined period to cause the customer device 524 to display the data for the selected predetermined period.

Figure 9:
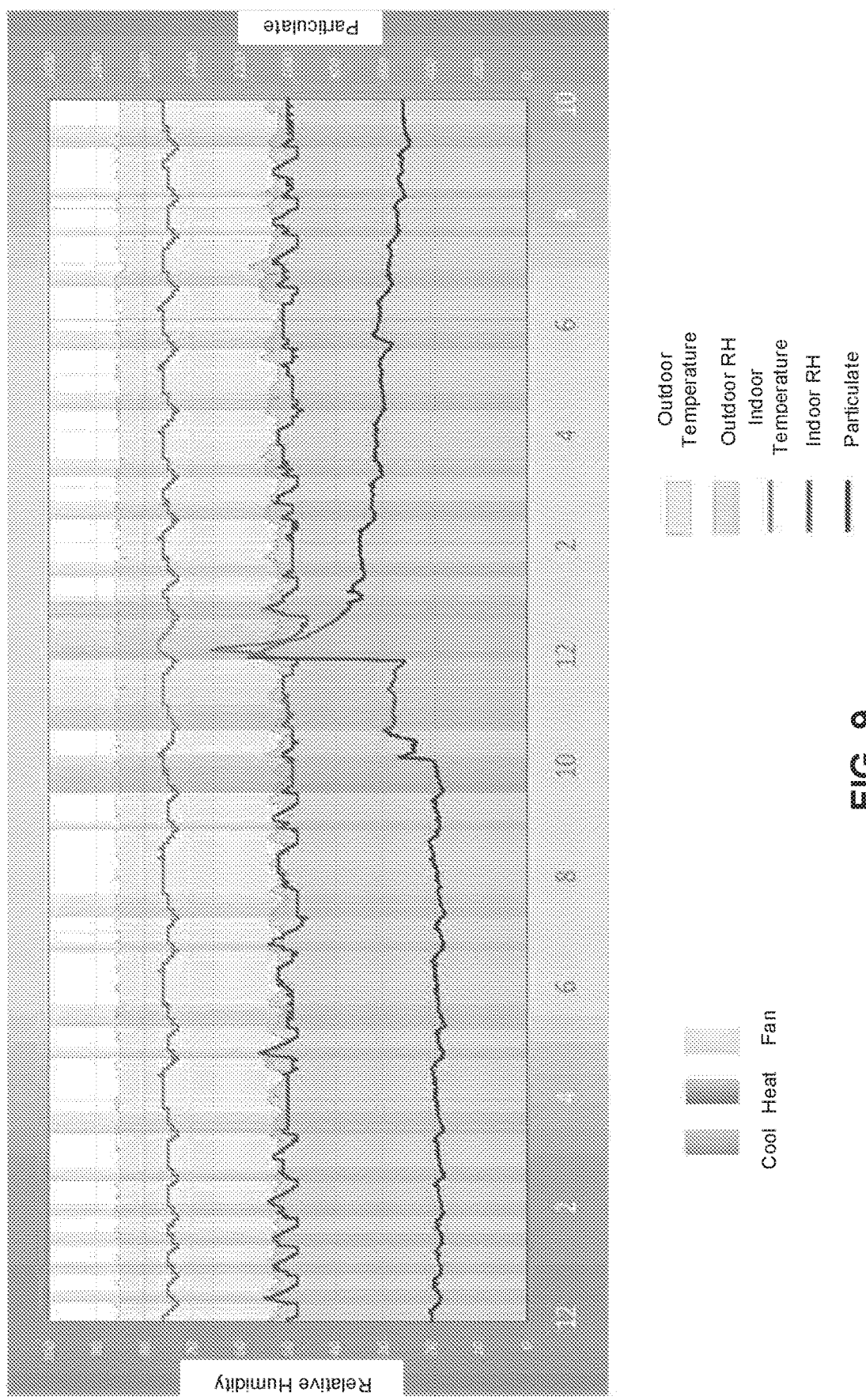

FIG. 9 includes an example user interface displayed by the customer device 524 during execution of the application based on data from the customer portal 528 for the present day (from 12:01 AM of the present day to the present time). The customer device 524 displays data selected by a user of the customer device 524. By default, all data may be selected, but a user may be allowed to select less than all of the data for display.

For example, in FIG. 9, only outdoor temperature (from the local environmental data), outdoor relative humidity (from the local environmental data), indoor temperature (from the IAQ sensor module 304), indoor relative humidity (from the IAQ sensor module 304), and particulate (from the IAQ sensor module 304) are graphed over time. Indicators of the statuses of the cooling mode, the heating mode, and use of the circulator blower 108 are also concurrently shown over time.

The customer device 524 selectively displays a user interface for user selection of a priority for mitigating deviations in IAQ parameters. For example, the customer device 524 may display a user interface that allows user assignment of an order of prioritization for: (i) temperature control, (ii) relative humidity control, (iii) particulate control, (vi) VOC control, and (v) carbon dioxide control. Temperature control may refer to maintaining, as much as possible, the temperature within the building within a specified range. Relative humidity control may refer to maintaining, as much as possible, the relative humidity within the building within a specified range. Particulate control may refer to maintaining, as much as possible, the amount of particulate within the building less than a predetermined threshold. VOC control may refer to maintaining, as much as possible, the amount of VOCs within the building less than a threshold. Carbon dioxide control may refer to maintaining, as much as possible, the amount of carbon dioxide within the building less than a threshold. The order of prioritization for (i)-(v) may be preset to a default order.

The thermostat 116 and/or the IAQ control module 404 may control the mitigation devices 424 based on the prioritization. For example, when particulate control is the first priority, the thermostat 116 may control the mitigation devices 424 to decrease particulate as quickly as possible as opposed to, for example, controlling the mitigation devices 424 to more quickly adjust temperature or relative humidity or to more quickly decrease the amount of VOCs and/or the amount of carbon dioxide.

The user interfaces provided by the customer device 524 provide visual information to the user regarding real-time measurements, historical measurements over a period of time, trends, and efficacy of IAQ mitigation and control. The user interfaces also enable the user to adjust setpoints to be used to control the mitigation devices 424 to control comfort and IAQ within the building. The user interfaces also enable the user to adjust prioritization of which IAQ conditions are mitigated and the sequence in which the IAQ conditions are mitigated.

Relative humidity and temperature may both have an effect on the amount of VOCs, the amount of carbon dioxide, and the amount of particulate. The thermostat 116 and/or the IAQ control module 404 controls the mitigation devices 424 to mitigate deviations of the temperature outside of the desired temperature range and deviations of the relative humidity outside of the desired relative humidity range. However, controlling temperature and/or humidity may have adverse effects on VOCs, particulate, and $CO_2$. As a result, the thermostat 116 may need to coordinate control modes based on the prioritization of IAQ objectives. The thermostat 116 controls the mitigation devices 424 based on the control modes.

The control modes include the cooling mode, the heating mode, an extra heating mode, a humidify mode, a dehumidify mode, an extra dehumidify mode, a Departicle (or remove particulate) mode, a $DeCO_2$ (or remove carbon dioxide) mode, an extra $DeCO_2$ mode, a DeVOC (or remove VOC) mode, and an extra DeVOC mode. In various implementations, the thermostat 116 and/or the IAQ control module 404 activate only one of the control modes at a time and determine a sequence for activating control modes when at least one of (I) and (II) is true and at least one of (A), (B), and (C) is true:

(I) the temperature is outside of the predetermined temperature range for heating or the predetermined temperature range for cooling; or (II) the relative humidity is outside of the predetermined relative humidity range; and (A) the amount of particulate is greater than the predetermined amount of particulate;

(B) the amount of VOCs is greater than the predetermined amount of VOCs; or (C) the amount of carbon dioxide is greater than the predetermined amount of carbon dioxide.

The thermostat 116 and/or the IAQ control module 404 also activates an associated one of the control modes when one of (I), (II), (A), (B), and (C) is true and the other ones of (I), (II), (A), (B), and (C) are not true and when two or more of (I), (II), (A), (B), and (C) are true and the other ones of (I), (II), (A), (B), and (C) are not true.

When the heating mode is active, the thermostat 116 and/or the IAQ control module 404 operates the burner 120 and/or the heat pump to generate heat. The circulator blower 108 may operate at a predetermined medium speed when the heating mode is active. The heating mode may be activated when the temperature is less than the lower temperature limit of the heating temperature range.

When the extra heating mode is active, the thermostat 116 and/or the IAQ control module 404 may additionally (to the burner 120 and/or the heat pump and the circulator blower 108) operate an electric heater to generate additional heat. The extra heating mode may be activated when the outside temperature is less than a predetermined threshold. The heating mode and the extra heating mode may be deactivated when the temperature becomes greater than the upper temperature limit of the heating temperature range. In other words, the temperature range creates hysteresis, preventing short cycling of the heat.

When the cooling mode is active, the thermostat 116 and/or the IAQ control module 404 operates the condensing unit 164. In the example of a heat pump, the thermostat 116 may control the reversing valve 272 to provide cooling. The circulator blower 108 may operate at a predetermined high speed when the cooling mode is active. The predetermined high speed is greater than the predetermined medium speed. The cooling mode may be activated when the temperature is greater than the upper temperature limit of the cooling temperature range. The cooling mode may be deactivated when the temperature becomes less than the lower temperature limit of the cooling temperature range. The cooling mode may naturally have a dehumidifying effect.

When the humidify mode is active, the thermostat 116 and/or the IAQ control module 404 operates the humidifier 432. The thermostat 116 also operates the circulator blower 108 at a predetermined speed, such as the predetermined high speed when the humidify mode is active. The humidify mode may be activated when the relative humidity is less than the first predetermined relative humidity. The humidify mode may be deactivated when the relative humidity becomes greater than the second predetermined relative humidity. Other options for humidification without the use of the humidifier 432 are discussed below.

When the dehumidify mode is active, the thermostat 116 and/or the IAQ control module 404 may operate the dehumidifier 436. Additionally or alternatively, while the dehumidify mode is active, the thermostat 116 may toggle operation of the circulator blower 108 between operation at a predetermined low speed for a predetermined period and the predetermined high speed for the predetermined period. The predetermined period may be, for example, 5 minutes or another suitable period. The dehumidify mode may be activated when the relative humidity is greater than the third predetermined relative humidity.

When the extra dehumidify mode is active, the thermostat 116 and/or the IAQ control module 404 may also operate the circulator blower 108 at the predetermined high speed. The thermostat 116 may additionally operate the compressor 148 and/or an electric heater to provide more rapid dehumidification when the extra dehumidify mode is active. Additionally, or alternatively, the thermostat 116 may transition to the cooling mode. The dehumidify mode may be activated when the relative humidity is at least a predetermined amount (for example, 1 percent) greater than the third predetermined relative humidity. The dehumidify mode and the extra dehumidify may be deactivated when the relative humidity becomes less than the fourth predetermined relative humidity.

When the Departicle mode is active, the thermostat 116 and/or the IAQ control module 404 may operate the circulator blower 108 at a predetermined speed, such as the predetermined high speed. Additionally or alternatively, the thermostat 116 may operate the air cleaner/purifier 428 when the Departicle mode is active. The Departicle mode may be activated when the amount of particulate is greater than the predetermined amount of particulate. The Departicle mode may be deactivated when the amount of particulate becomes less than the predetermined amount of particulate.

When the DeVOC mode is active, the thermostat 116 and/or the IAQ control module 404 may operate the inducer blower 132 at a predetermined speed, such as the predetermined low speed. Additionally or alternatively, the thermostat 116 may operate one or more ventilators, such as one or more bathroom fans or range hood fans. The DeVOC mode may be activated when the amount of VOCs is greater than the predetermined amount of VOCs.

When the extra DeVOC mode is active and the VOC filter 106 is present, the thermostat 116 and/or the IAQ control module 404 may operate the circulator blower 108 at the predetermined high speed. The thermostat 116 may additionally operate one or more other ventilators to more rapidly decrease VOCs when the extra DeVOC mode is active. The extra DeVOC mode may be activated when the amount of VOCs remains greater than the predetermined amount of VOCs for greater than a predetermined period when the DeVOC mode is active, such as 1 hour. The extra DeVOC mode and the DeVOC may be deactivated when the amount of VOCs becomes less than the predetermined amount of VOCs.

When the $DeCO_2$ mode is active, the thermostat 116 and/or the IAQ control module 404 may operate the circulator blower 108 at a predetermined speed, such as the predetermined low speed. Additionally or alternatively, the thermostat 116 and/or the IAQ control module 404 may operate one or more ventilators, such as one or more bathroom fans or range hood fans. The $DeCO_2$ mode may be activated when the amount of carbon dioxide is greater than the predetermined amount of carbon dioxide.

When the extra $DeCO_2$ mode is active, the thermostat 116 and/or the IAQ control module 404 may operate the circulator blower 108 at the predetermined high speed. The thermostat 116 and/or the IAQ control module 404 may additionally operate one or more other ventilators to more rapidly decrease carbon dioxide when the extra $DeCO_2$ mode is active. The extra $DeCO_2$ mode may be activated when the amount of carbon dioxide remains greater than the predetermined amount of carbon dioxide for greater than a predetermined period when the $DeCO_2$ mode is active, such as 1 hour. The extra $DeCO_2$ mode and the $DeCO_2$ may be deactivated when the amount of carbon dioxide becomes less than the predetermined amount of carbon dioxide.

Flowcharts

Figure 10A:
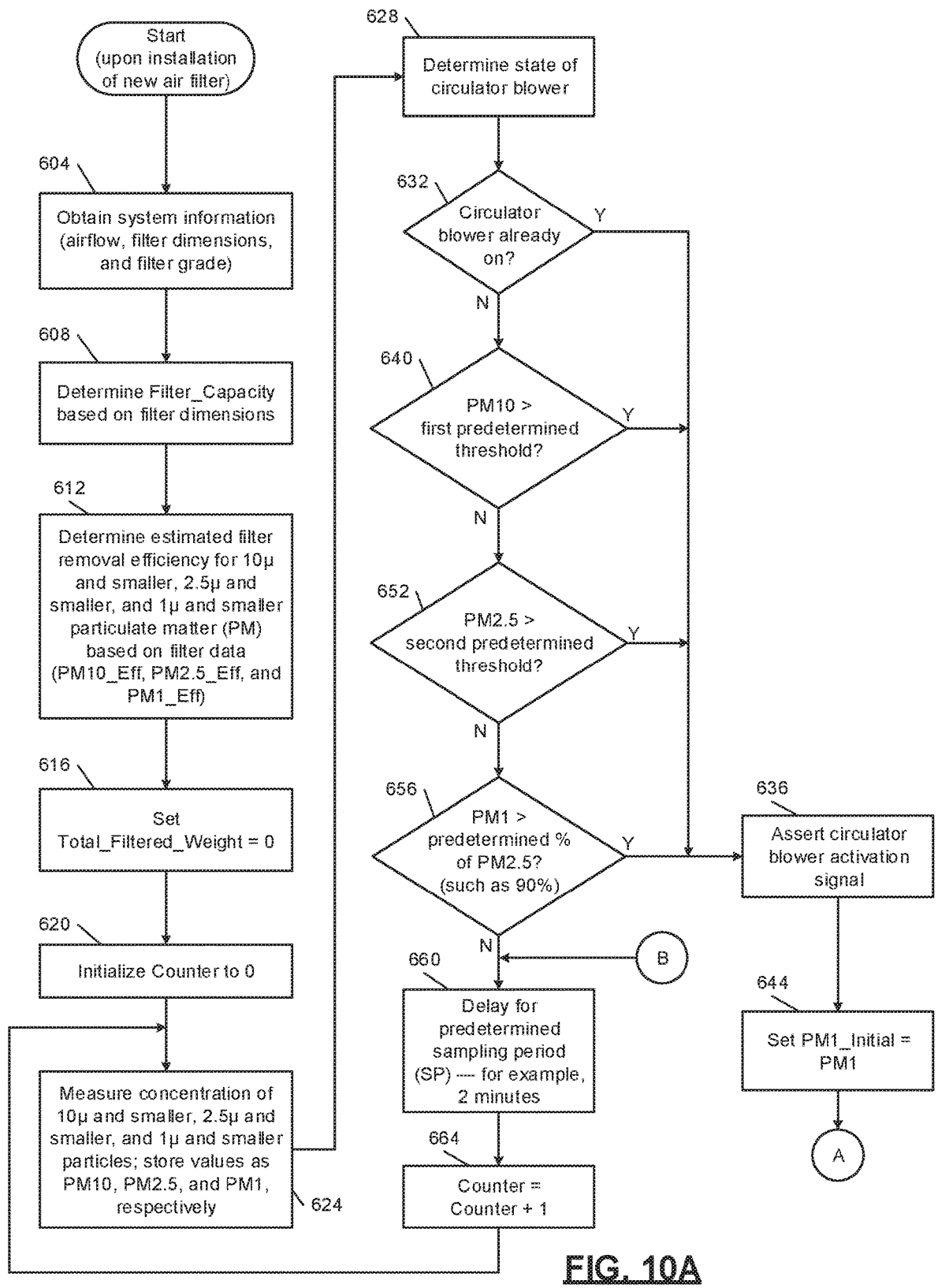
FIGS. 10A and 10B together are a flowchart depicting an example method of controlling a mitigation device and estimating filter usage based on granular particulate matter measurements.
Figure 10B:
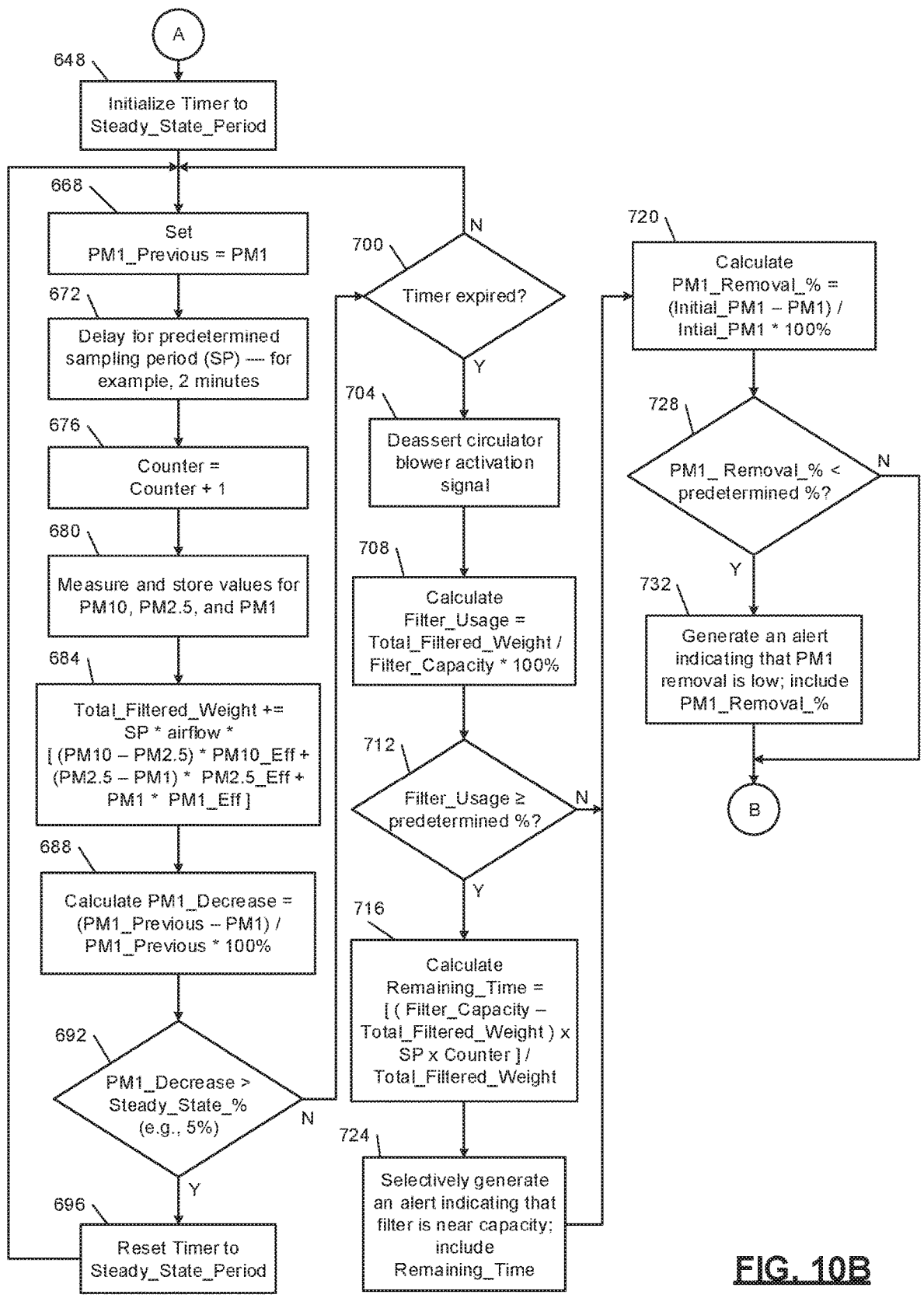

In FIGS. 10A and 10B, a flowchart depicts example mitigation device control and air filter lifetime estimation based on granular particulate matter measurements. In this flowchart, the mitigation device is the particulate matter filter of an HVAC system, which is activated by a circulator blower drawing air through the filter. Some or all of the control depicted in FIGS. 10A and 10B is performed by an IAQ control module, such as the IAQ control module 404. In various implementations, some or all of the control may instead occur in the thermostat 116, in the remote monitoring system 420, or in a personal electronic device, such as a smart phone or tablet. In various implementations, the IAQ control module may simply be implemented as software or firmware within, for example, the thermostat 116.

In various implementations, the control may activate the circulator blower of the HVAC system via a standard call for fan made by the thermostat 116. However, other communication interfaces may be used. The measured levels of particulate matter may be received from the IAQ sensor module 304 or from multiple sensor modules. In various implementations, each sensor module may be dedicated to a respective range of sizes of particulate matter. These levels may be combined and, in cases where there are overlapping measurements, harmonized, being used by the IAQ control module. Alerts sent to an operator (such as a homeowner, resident, building operator, or HVAC contractor) may be sent directly to the operator or provided to the remote monitoring system 420 for distribution.

Control begins in FIG. 10A at 604 upon installation of a new air filter. In various implementations, when the IAQ control system is first installed, a new air filter may also be installed so that the IAQ control system can begin monitoring the life of the air filter. Installation of a first filter may be standard because the cost of an air filter may be substantially less than the cost of the IAQ control system and installation.

At 604, control obtains system information for the HVAC system, including air flow information, dimensions of the air filter, and filter grade. For example, the filter grade may be specified as a minimum efficiency reporting value (MERV) metric. The airflow and filter dimensions may remain the same and may therefore be obtained from storage. Meanwhile, the filter grade may be specified by the user upon installation of the filter. In the absence of specification by the user, a predetermined grade may be used as a default. For example, a predetermined grade of MERV 14 may be physically printed on the HVAC system to convey the recommended MERV rating to the operator servicing the HVAC system. Control may therefore assume that the operator will replace the filter with another MERV 14 filter.

Control continues at 608, where control estimates the filter capacity (Filter_Capacity) based on the filter dimensions. For example, the filter capacity may be estimated based on total square footage of filtration area, where thicker filters provide for additional square footage. At 612, control determines estimated filter removal efficiencies for various sizes of particulate matter. These efficiencies may be estimated based on standards corresponding to the MERV rating. In general, each range of particulate matter sizes has a corresponding removal efficiency for a given MERV standard. Higher MERV standards generally have higher removal efficiencies for each size of particulate matter.

In the example described here, the particulate matter removal efficiency is determined for particles 10 μm smaller than (PM10_EFF), particulate matter smaller than 2.5 μm (PM2.5_EFF) and particulate matter smaller than 1 μm (PM1_EFF). In other words, the ranges of PM are, in microns, 0-10, 0-2.5, and 0-1, respectively. These ranges are different: overlapping but not co-extensive. In fact, each range is a subset of the next. Note that 0 is not truly the lower bound of the range because the sensitivity of the sensor defines the lower bound: detection of infinitesimally small particles may be possible at the Large Hadron Collider but is not feasible in residential or commercial systems.

At 616, control initializes a total weight of filtered particulate matter (Total_Filtered_Weight) to 0. At 620, control initializes a counter variable to 0. The counter may be incremented on a periodic schedule while the circulator blower is running and may therefore be a proxy for how long the circulator blower has been running. The counter can then be used, based on that predetermined period, to estimate filter usage.

At 624, control measures the level of particulate matter smaller than 10 μm (PM10), the level of particulate matter smaller than 2.5 μm (PM2.5), and the level of particulate matter smaller than 1 μm (PM1). At 628, control determines the current state of the circulator blower. For example, if a call for heat, call for cool, or call for fan is currently asserted by the thermostat, the circulator blower would be expected to be on. At 632, if the circulator blower is already on, control transfers to 636; if the circulator blower is not already on, control transfers to 640.

At 636, control asserts the circulator blower activation signal. At this moment, because the circulator blower is already on, the assertion of the circulator blower activation signal may not have immediate effect. However, once the pre-existing call for heat, cool, or fan is removed, assertion of the circulator blower activation signal will prevent the circulator blower from turning off. Control continues at 644, where an initial PM1 value (PM1_Initial) is set equal to the most recently measured value of PM1. Control then continues at 648 in FIG. 10B.

Returning to 640, control determines whether PM10 is greater than a first predetermined threshold. If so, control transfers to 636; otherwise, control transfers to 652. At 652, control determines whether PM2.5 is greater than a second predetermined threshold. If so, control transfers to 636; otherwise, control transfers to 656. At 656, control determines whether PM1 is more than a predetermined percentage (such as 90%) of PM2.5. If so, control transfers to 636; otherwise, control transfers to 660. In other words, any of the conditions 640, 652, and 656 will lead to assertion of the circulator blower activation signal at 636.

At 660, control delays for a predetermined sampling period (SP), such as two minutes. The sampling period may be set based on how long it takes measurement devices to respond to changes in particulate matter in the air. For example, if a decrease in particulate matter is not registered for a minute or two, there is no need to sample the measurement more quickly. Control continues at 664, where the counter is incremented. Control then returns to 624 to acquire new measurements.

In FIG. 10B at 648, control initializes a timer to a predetermined value (Steady_State_Period) and begins counting down the timer. Control continues at 668, where the most recently measured PM1 is stored into a holding variable (PM1_Previous). At 672, control delays for the predetermined sampling period, which matches the predetermined sampling period of 660. At 676, control increments the counter. At 680, control measures and stores values for PM10, PM2.5, and PM1. This may be performed in the same manner as 624. Control continues at 684, where control increments the total filtered weight by the product of the sampling period, the air flow through the filter, and a sum of estimated particulate matter removed by the filter per unit of time. The sum is calculated as the product of the effectiveness of the filter at removing PM10 and the difference between PM10 and PM2.5 plus the product of the effectiveness of the filter at removing PM 2.5 and the difference between PM2.5 and PM1 plus the product of the effectiveness of the filter at removing PM1 and the value of PM1.

At 688, control calculates an amount of decrease (PM1_Decrease) caused by operation of the filter. This may be expressed as a percentage by multiplying 100% by PM1_Previous being divided into the difference between PM1_Previous and PM1. At 692, control determines whether the decrease in PM1 is more than a steady-state percentage of change, such as 5%. If so, the filter still appears to be removing PM1 and therefore control continues at 696; otherwise, control transfers to 700. At 696, control resets the timer to begin a new steady-state period and control returns to 668.

At 700, control determines whether the timer has expired. In other words, if the amount of PM1 decrease has been within the steady-state percentage for each sampling period throughout the length of the timer (steady-state period), the level of PM1 has reached steady-state and further operation of the circulator blower appears unlikely to affect the level. If, at 700, the timer has expired, control transfers to 704; otherwise, control returns to 668. At 704, control deasserts the circulator blower activation signal. This allows the circulator blower to turn off in the absence of a call for heat, cool, or fan from the thermostat. Note, however, that deasserting the circulator blower activation signal does not necessarily turn off the circulator blower if a call for heat, cool, or fan is present.

At 708, control calculates a filter usage variable (Filter_Usage) in terms of a percentage by multiplying 100% by total filtered weight divided by filter capacity. At 712, control determines whether the filter usage is greater than a predetermined percentage, such as 70%, 80%, or 90%. If so, control transfers to 716; otherwise, control transfers to 720. At 716, control calculates the amount of remaining time expected for the filter before filtration or airflow is substantially affected. The remaining time is calculated by determining the product of the sampling period, the counter value and the difference between filter capacity and total filtered weight. This quantity is divided by total filtered weight to arrive at remaining time. When the estimate of total filtered weight exceeds the filter capacity, the remaining time actually becomes negative in this calculation. However, in various implementations, a negative time may not be revealed to an operator and instead a remaining time of zero may be shown. At 724, control selectively generates an alert indicating that the filter is near capacity. The alert may include the remaining time so that the HVAC operator can determine how urgently a new filter needs to be procured and installed. The alert may be generated only at predetermined intervals, such as once per day or, if the remaining time is great enough, a longer interval such as once per week. Control then continues at 720.

At 720, control calculates the amount of PM1 removed (PM1_Removal_%). This may be determined as a percentage by dividing the difference between PM1_Initial and PM1 by PM1_Initial and multiplying by 100%. Control continues at 728. If the calculated PM1 removal percentage is less than a predetermined percentage, the effectiveness of the filter may be questioned and control transfers to 732; otherwise, control returns to 660 in FIG. 10A. At 732, control generates an alert indicating that PM1 removal is low. The alert may indicate the calculated PM1 removal percentage and may also display the expected PM1 removal percentage. The predetermined percentage threshold of 728 may be preprogrammed based on filter grade and other HVAC system parameters. For example, the predetermined percentage may be obtained from a lookup table indexed by MERV rating.

Figure 11A:
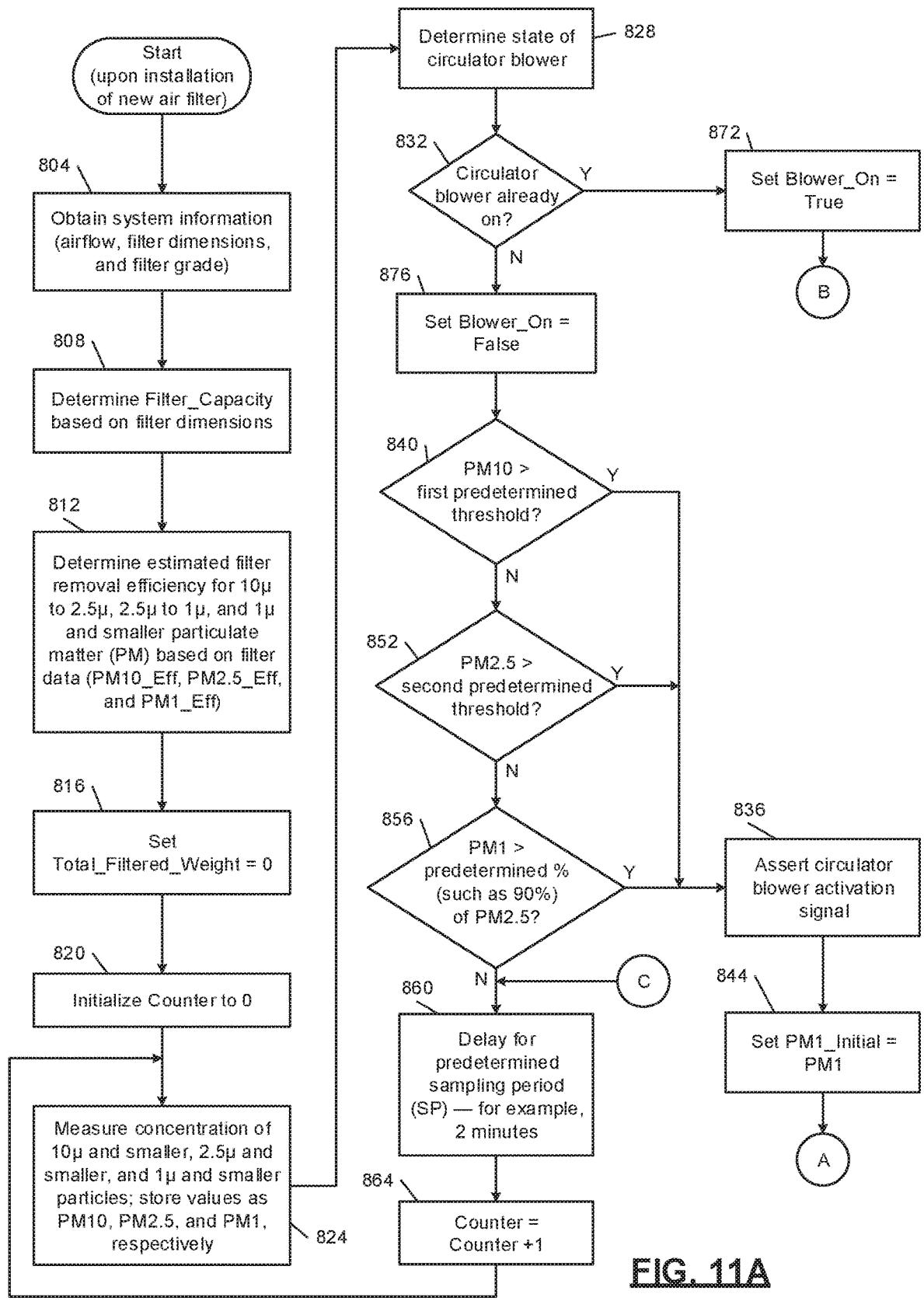
FIGS. 11A and 11B together are a flowchart depicting another example method of controlling a mitigation device and estimating filter usage based on granular particulate matter measurements.
Figure 11B:
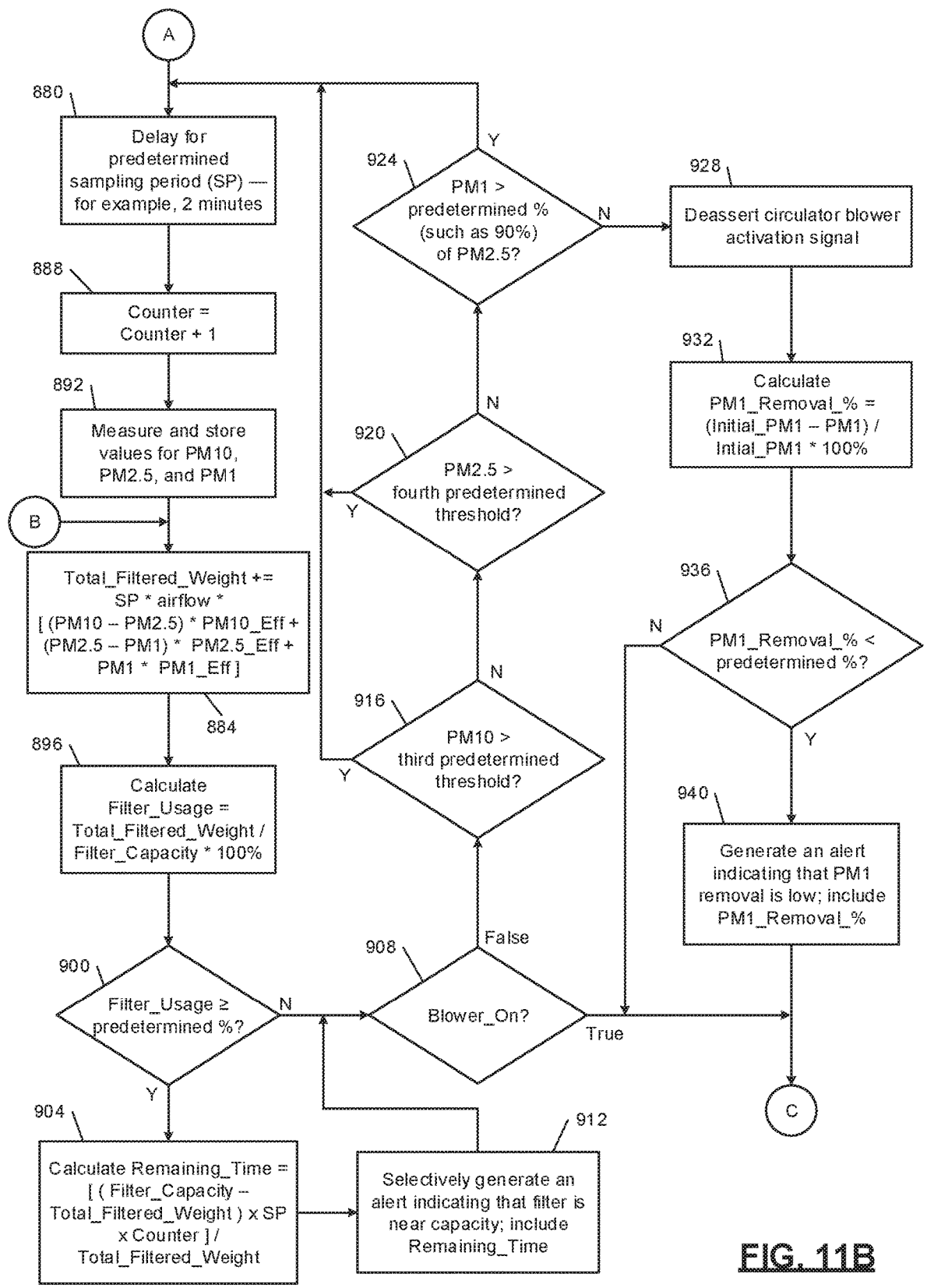

In FIGS. 11A and 11B, another implementation of particulate-matter-size-based HVAC system control and filter usage estimation is shown. Elements of FIG. 11A that are similar to those of FIG. 10A use parallel reference numerals to those of FIG. 10A. Specifically, elements 804, 808, 812, 816, 820, 824, 828, 832, 836, 840, 844, 852, 856, 860, and 864 may be implemented similarly to those elements of FIG. 10A having the same last two digits of the reference numeral but beginning with 6. However, in FIG. 11A, if the circulator blower is already on at 832, control transfers to 872; otherwise, control transfers to 876. At 876, control sets a variable Blower_On to false, indicating that the circulator blower was not already on. This variable is used in FIG. 11B. Control then continues at 840. At 844, after setting the variable PM1 Initial to the value of PM1, control transfers to 880 in FIG. 11B. At 872, control sets the Blower_On variable to true indicating the circulator blower was already on. Control then transfers to 884 of FIG. 11B.

In FIG. 11B at 880, control delays for a predetermined sampling period that matches the predetermined sampling period of 860 in FIG. 11A. Control continues at 888, where the counter variable is incremented. Control continues at 892, where control obtains and stores measured values for PM10, PM2.5, and PM1. Control then continues at 884. At 884, control increments the total filtered weight by the product of the sampling period, the airflow, and the sum of particulate matter removal efficiencies, similar to 684 of FIG. 10B.

Control continues at 896, where control calculates filter usage based on the total filtered weight divided by the filter capacity times 100%. Control continues at 900, where if the filter usage is greater than a predetermined percentage, control transfers to 904; otherwise, control transfers to 908. As examples only, the predetermined percentage may be 70%, 80%, or 90%. At 904, control calculates a remaining lifetime expected from the filter, which may be calculated similarly to 716 of FIG. 10B. Control then continues at 912. At 912, control selectively generates an alert indicating that the filter is near capacity. The alert may include the calculated remaining time. Control then continues at 908.

At 908, control determines whether the Blower_On variable is set to true. If so, control returns to 860 of FIG. 11A. Otherwise, the blower was not initially on when the circulator blower activation signal was asserted and therefore exit conditions will be imposed before the circulator blower activation signal is deasserted. The exit conditions may be specified by 916, 920, and 924. If at 908, the Blower_On variable is set to false, control transfers to 916.

At 916, control determines whether PM10 is greater than a third predetermined threshold. If so, control transfers to 880; otherwise, control transfers to 920. The third predetermined threshold may be the same as or different than (such as less than) the first predetermined threshold of 840 in FIG. 11A. At 920, control determines whether PM2.5 is greater than a fourth predetermined threshold. If so, control returns to 880; otherwise, control transfers to 924. The fourth predetermined threshold may be the same as or different than (such as less than) the second predetermined threshold of 852 of FIG. 11A. At 924, control determines whether PM1 is more than a predetermined percentage (such as 90%) of PM2.5. If so, control returns to 880; otherwise, control transfers to 928.

At 928, control deasserts the circulator blower activation signal. Control continues at 932, where a PM1 removal percentage is calculated as a difference between PM1 Initial and PM1 divided by PM1_Initial times 100%. At 936, control determines whether the calculated PM1 removal percentage is less than a predetermined percentage. If so, control transfers to 940; otherwise, control returns to 860 of FIG. 11A. At 940, control generates an alert indicating that the filter's PM1 removal is lower than expected. The alert may include the calculated value of PM1 removal percentage.

Plots

Figure 12:
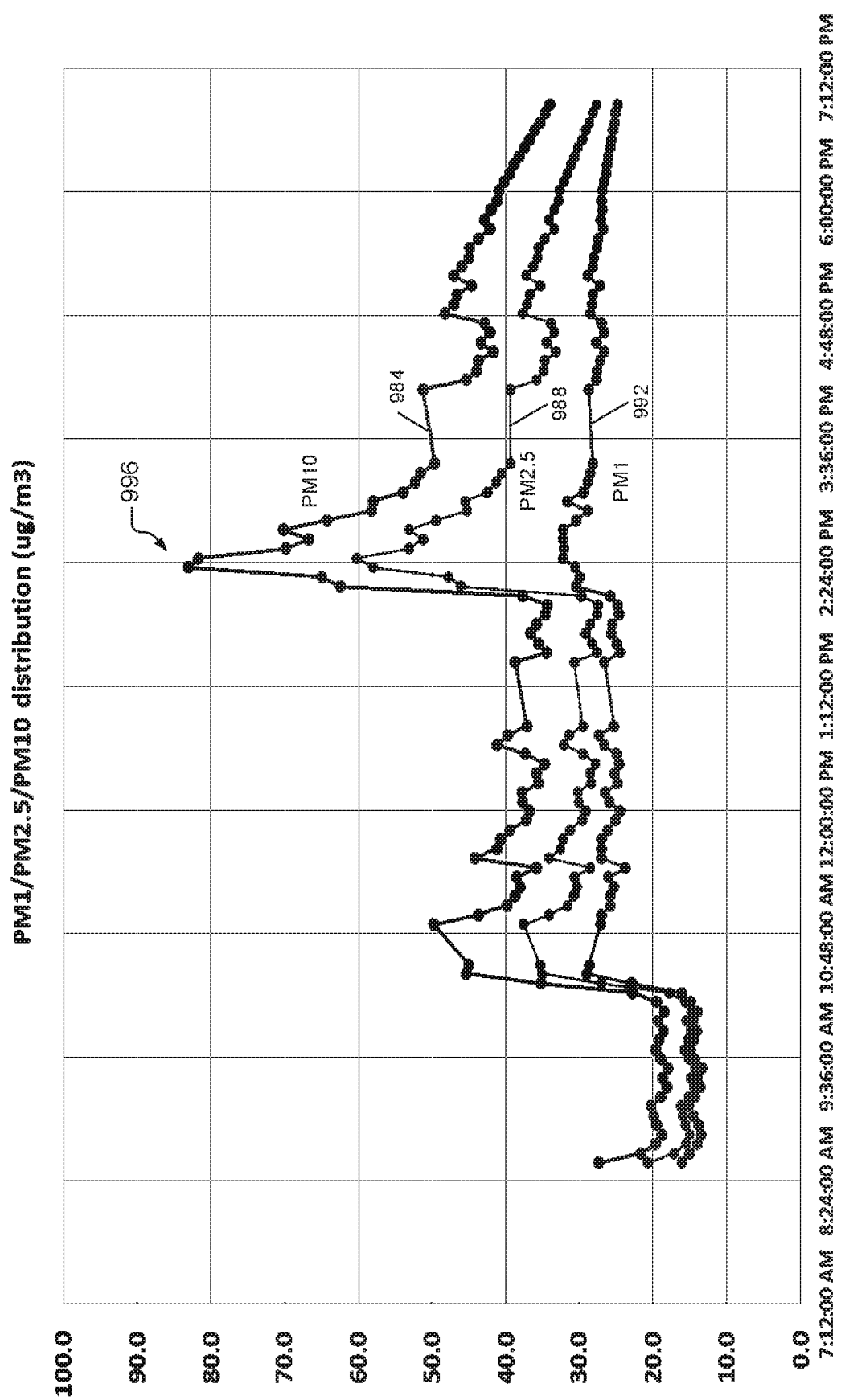
FIG. 12 is a graph showing levels of particulate matter of different size over a 12-hour period.

In FIG. 12, plots 984, 988, and 992 of PM10, PM2.5, and PM1, respectively, are displayed with respect to time. A peak 996 of the PM10 plot 984 is reached at approximately 2:24 PM. For example only, the peak 996 may result from oil smoking in a pan. The peak at 996 may exceed a predetermined threshold for acceptable PM10, PM2.5, or PM1 values, initiating particulate matter mitigation. Therefore, over time the values of the plots 984, 988, and 992 trend downward. In various implementations, such as the control described in FIGS. 10A and 10B, the mitigation device may be turned off once the PM1 plot 992 achieves steady-state—that is, where each decrease in PM1 over a period of time (such as 20 minutes) is less than a threshold such as 5%. In other implementations, such as the control described in FIGS. 11A and 11B, the mitigation device may be turned off once the value of PM1 is less than or equal to a predetermined percentage, such as 90%, of PM2.5.

In various implementations, the IAQ control module may use PM10, PM2.5, and PM1 data, such as the data shown in FIG. 12, to predict future PM levels. For example, over the course of a week the IAQ control module may determine that PM10 consistently increases every day around 2:30 PM (shown in FIG. 12 as peak 1060). The recurring increase in PM may be caused by regularly repeated activities, such as cooking. Based on the recurring PM spikes, the IAQ control module may determine that an increase in PM is likely to occur every day around 2:30 PM. The IAQ control module may initiate mitigation—for example, activating the circulator blower of an HVAC system—prior to the expected PM increases. This preemptive mitigation may reduce the time required to mitigate the increases in PM and maintain PM within a tighter envelope.

Additional Embodiments

According to the present disclosure, an indoor air quality (IAQ) sensor module can be used to determine the usage of a filter of a mitigation device, such as an HVAC system. The HVAC system may mitigate unwanted temperatures or humidity, and by cycling air, may mitigate other air quality issues. Further, drawing air through the HVAC system's filter may mitigate air pollutants. The IAQ sensor module includes a particulate sensor that measures an amount (e.g., concentration) of particulate matter in the air and/or a volatile organic compound (VOC) sensor that measures an amount of VOCs in the air.

The IAQ sensor module is wirelessly connected to a thermostat of the HVAC system, such as via Bluetooth or WiFi. The IAQ sensor module may additionally or alternatively be wirelessly connected to an IAQ control module. The IAQ control module and/or the thermostat determine the usage of the filter in the mitigation device based on the measurements from the IAQ sensor module. For example, the IAQ control module and/or the thermostat may determine the amount of air passing though the filter and the level of air pollutant in the air, based on either the particulate matter or the VOCs measured by the IAQ sensor, to estimate the amount of air pollutant collected by the filter. In addition, the IAQ control module and/or the thermostat may determine a capacity of the filter and estimate how much time remains until the filter reaches the capacity.

The amount of air passing through the filter is proportional to the speed of a fan (called a circulator blower) that draws or pushes air through the filter. The IAQ module may determine the speed of the fan and, therefore, the amount of air passing through the filter based on the current or power consumed by a motor of the fan. For example, the IAQ control module may measure the current that passes through the motor and determine the speed of the fan based on the measured current. Additionally, the IAQ control module may measure a voltage supplied to the motor and use the measured current and voltage to calculate the apparent power consumed by the motor. Alternatively, the IAQ module may use a power measurement integrated circuit (IC) to measure the real power consumed by the motor. The IAQ module then determines the speed of the fan based on either the apparent power or the real power.

In various implementations, the speed of the fan may be inferred according to the operation mode of the HVAC system—for example, a certain fan speed may be used for heating, a certain fan speed may be used for cooling, and a same or different speed may be used for fan-only operation. Accordingly, the IAQ module may determine the speed of the circulator blower and, therefore, the amount of air passing through the filter based on the operation mode of the HVAC system. The IAQ control module may receive information about present operation mode of the HVAC system from a thermostat. Alternatively, the IAQ control module may determine the operation mode of the HVAC system based on power consumed by the HVAC system. For example, the IAQ control module may receive power data from an energy monitor, such as a whole home energy monitor, that indicates whether the circulator blower of the HVAC system is running and indicates the present mode of the HVAC system. The IAQ control module can determine the speed of the circulator blower (or the airflow through the filter) based on the indicated operation mode. In other implementations, airflow may be measured directly, such as with an airflow sensor.

Based on the rate of airflow through the filter, the rate of filter loading can be adjusted. For example, with a certain ambient level of particulate matter in the air, airflow that is 20% higher may result in 20% (or some fraction thereof, such as ¾, leading to 15%) faster loading of the filter. Using the knowledge of airflow, then, the model of filter loading can include a gain factor based on airflow.

The IAQ control module and/or the thermostat can provide information on the filter usage as well as the measurements of the IAQ sensor and other data (e.g., statuses of mitigation devices, local outdoor air conditions, etc.) to one or more user devices (e.g., of tenants, occupants, customers, contractors, etc.) associated with the building. For example, the building may be a single-family residence, and the customer may be the homeowner, a landlord, or a tenant. In other implementations, the building may be a light commercial building, and the customer may be the building owner, a tenant, or a property management company. Since the determined filter usage is based on operational conditions of the mitigation device, the system may notify a user when the filter needs to be changed based on actual filter usage rather than requiring the user to rely on other less accurate, conventional filter replacement schedules.

Figure 13:
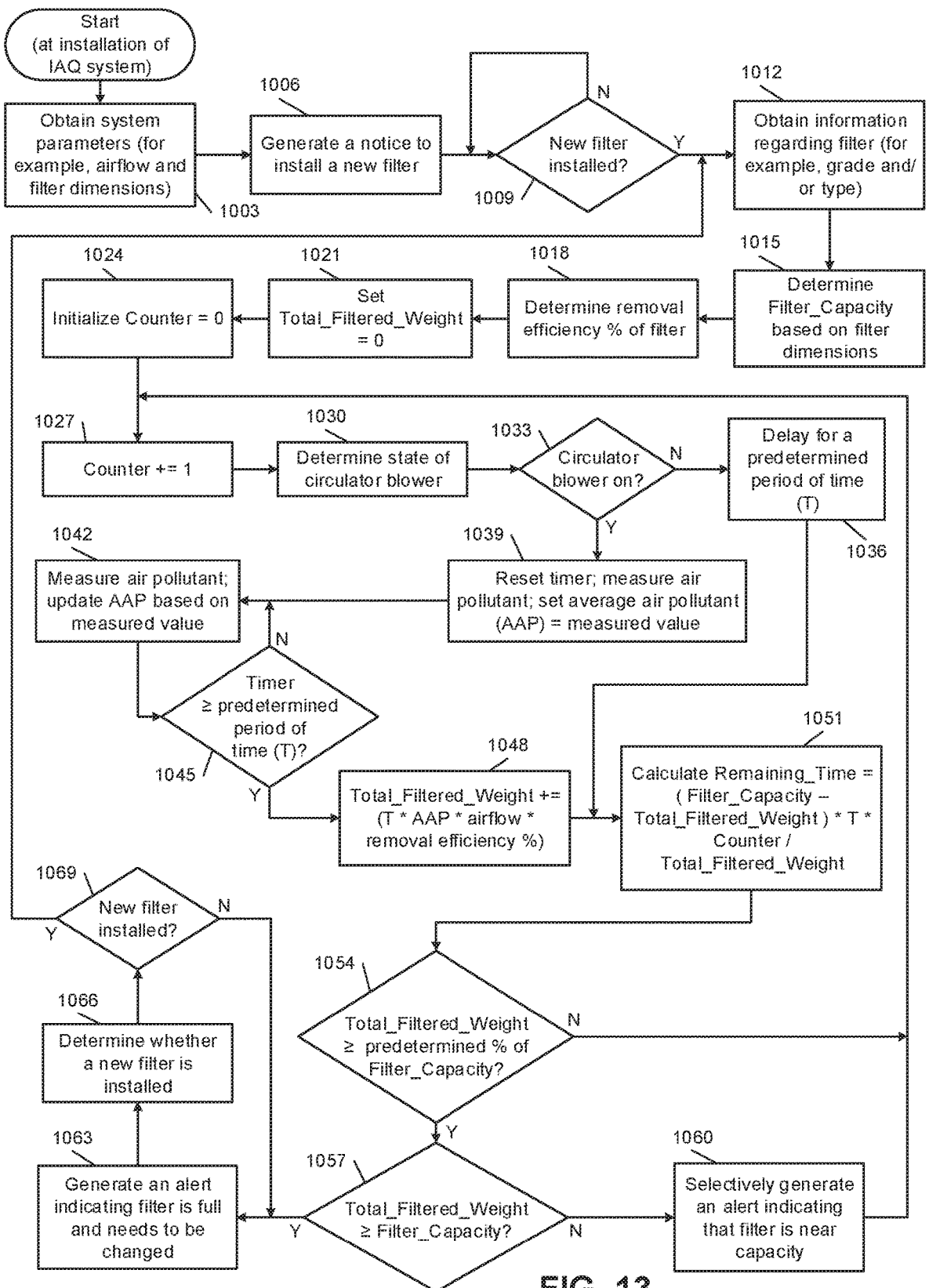
FIG. 13 is a flowchart depicting an example method of determining filter usage in a mitigation device based on IAQ parameters.

FIG. 13 is a flowchart depicting an example method of determining filter usage in a mitigation device based on measured IAQ parameters. In various implementations, control may be performed by the IAQ control module 404. In other implementations, control may be performed by the thermostat 116 or by the IAQ control module 404 and the thermostat 116.

Although the example method is described below with respect to a filter in an HVAC system, the method may be implemented in a single point air purifier (such as the air cleaner/purifier 428 of FIG. 4A) or any other mitigation device that uses a particulate matter filter, an absorbent type VOC filter, or a combination particulate matter and absorbent type VOC filter. For example, in a single point system, a filter, fan, air pollutant sensor, and control module may be collocated in a single device. The control module may operate according to the flowchart of FIG. 13.

In other implementations, the single point system includes a filter and a fan but may omit the control module (or the control module may be disabled). The single point system can then be controlled as a mitigation device by another controller, such as the IAQ control module 404, which may also monitor the life of the filter using the control of FIG. 13. The air pollutant sensor may be used to provide readings to the IAQ module 404 or may be omitted or disabled when the IAQ control module 404 has another source of pollutant level data. The IAQ control module 404 may operate the single point system in addition to a whole-home system for faster response if air in the space surrounding the single point system (for example, the room in which the single point system is located) has a high level of pollutants. The IAQ control module 404 may also operate the single point system in the absence of the whole-home system if the space surrounding the single point system has a higher pollutant level than other areas of the home.

According to FIG. 13, control begins at 1003, with the installation of an IAQ control system. At 1003, control obtains system parameters of the HVAC system—for example, the airflow of the HVAC system and the dimensions of a filter of the HVAC system, such as the air filter 104 or the VOC filter 106. The obtained airflow may be a nominal airflow associated with the components of the HVAC system—for example, the air handler unit 136. Control continues with 1006 where control generates a notice to install a new filter in the HVAC system. In various implementations, the notice may be displayed on the customer device 524 and/or on the thermostat 116. Control continues with 1009. At 1009, control determines whether a new filter has been installed. For example, the IAQ control system may prompt an operator to use the customer device 524 to confirm that a new filter has been installed. In various implementations, the operator may be a building owner, such as a homeowner. In other implementations, the operator may be an HVAC contractor. If 1009 is false, control remains at 1009. If 1009 is true, control progresses to 1012.

At 1012, control obtains information about the newly installed filter—for example, a MERV rating of an air filter or a weight of filtering material of a VOC filter. Control continues with 1015 where control determines a capacity of the installed filter (Filter_Capacity) based on the obtained filter dimensions. Control continues with 1018 where control determines the removal efficiency of the installed filter (removal efficiency %). For example, the IAQ control module 404 may determine the removal efficiency % based on either the obtained MERV rating or the filtering material of installed filter. Control then continues with 1021.

At 1021, control sets the total filtered weight of the installed filter (Total_Filtered_Weight) to zero and, at 1024, control initializes a counter to zero. Control continues with 1027 where the state of the circulator blower 108 is determined. In various implementations, the IAQ control module 404 may communicate with the thermostat 116 to determine the state of the circulator blower 108. Control continues with 1033 where control determines whether the circulator blower 108 is on. If 1033 is false, control transfers to 1036. At 1036, control delays for a predetermined period of time (T). For example, the predetermined period of time may be one minute or 30 seconds. Control continues with 1051, as described below. If 1033 is true, control progresses to 1039.

At 1039, control resets a timer, measures a level of air pollutant, and sets an average air pollutant (AAP) variable to the measured level. The IAQ control system uses at least one sensor, such as the IAQ sensor module 304, to measure the level of air pollutant. In implementations that determine the usage of an air filter, the measured air pollutant is particulate matter—for example, dust. In implementations that determine the usage of a VOC filter, the measured air pollutant is at least one type of VOC. In various implementations, two or more IAQ sensor modules may be used to measure air pollutant levels throughout a building and the IAQ control module 404 uses an average of the values received from the IAQ sensor modules. Control continues with 1042 where control measures the air pollutant, as described above, and updates the AAP. Control continues with 1045 where control determines whether the timer is greater than or equal to the predetermined period of time (T). If 1045 is false, control returns to 1042. If 1045 is true, control progresses to 1048 where the value of Total_Filtered_Weight is updated using equation 1 below.

$$\text{Total\_Filtered\_Weight} += T*AAP*\text{airflow}*(\text{removal efficiency \%}) \tag{1}$$

In various implementations, control may use the nominal airflow associated with the components of the HVAC system as the value of airflow in equation 1. In other implementations, control may determine the value of airflow in equation 1 based on the speed of the circulator blower 108. Control may determine the speed of the circulator blower by measuring the current or power consumed by a motor of the circulator blower 108. Alternatively, control may determine the speed of the circulator blower 108 based on a present operation mode of the HVAC system—for example, cooling, heating, or fan only. Control may receive the present operation mode of the HVAC system from the thermostat 116, Alternatively, control may determine the present operation mode of the HVAC system based on power data received from an energy monitor, such as a whole home energy monitor. The power data may include the present operation mode and/or the power consumed by the HVAC system. If the present operation mode is not included in the power data, control may infer the present operation mode based on the power consumed by the HVAC system.

Control continues with 1051 where control determines the remaining life of the filter based on the capacity of the filter and past usage. For example, the IAQ control module 404 may calculate Remaining_Time using equation 2 below.

$$\text{Remaining\_Time} = \frac{(\text{Filter\_Capacity} - \text{Total\_Filtered\_Weight})*T*\text{Counter}}{\text{Total\_Filtered\_Weight}} \tag{2}$$

The product of the predetermined period of time and the value of the counter (T*Counter) represents the total length of time that the filter has been installed. Control continues with 1054. At 1054, control determines whether the filter has reached a predetermined usage level, such as 90% of the capacity of the filter. In other words, the IAQ control module 404 may determine if Total_Filtered_Weight is greater than or equal to 90% of Filter_Capacity. If 1054 is false, control returns to 1027. If 1054 is true, control transfers to 1057 where control determines whether the filter is full by determining if Total_Filtered_Weight is greater than or equal to Filter_Capacity. If 1057 is false, control progresses to 1060. At 1060, control selectively generates an alert indicating that the filter is near capacity. In various implementations, the alert may be displayed on the customer device 524 and/or on the thermostat 116. In various implementations, the IAQ control module 404 may only generate the alert once per day—for example, the first time that control reaches 1060 each day. In other implementations, the IAQ control module 404 may generate the alert every time control reaches 1060.

If 1057 is true, control transfers to 1063 where control generates an alert that indicates the filter is full and that a new filter needs to be installed. In various implementations, the alert may be displayed on the customer device 524 and/or on the thermostat 116. Control continues with 1066 where control determines whether a new filter has been installed. For example, the IAQ control module 404 may prompt a user to use the customer device 525 to confirm that a new filter has been installed. At 1069, control determines whether the new filter has been installed. If 1069 is false, control returns to 1063. If 1069 is true, control returns to 1012. In some implementations, in order to protect components of the HVAC system from damage, control may disable the HVAC system until a new filter is installed.

Figure 14:
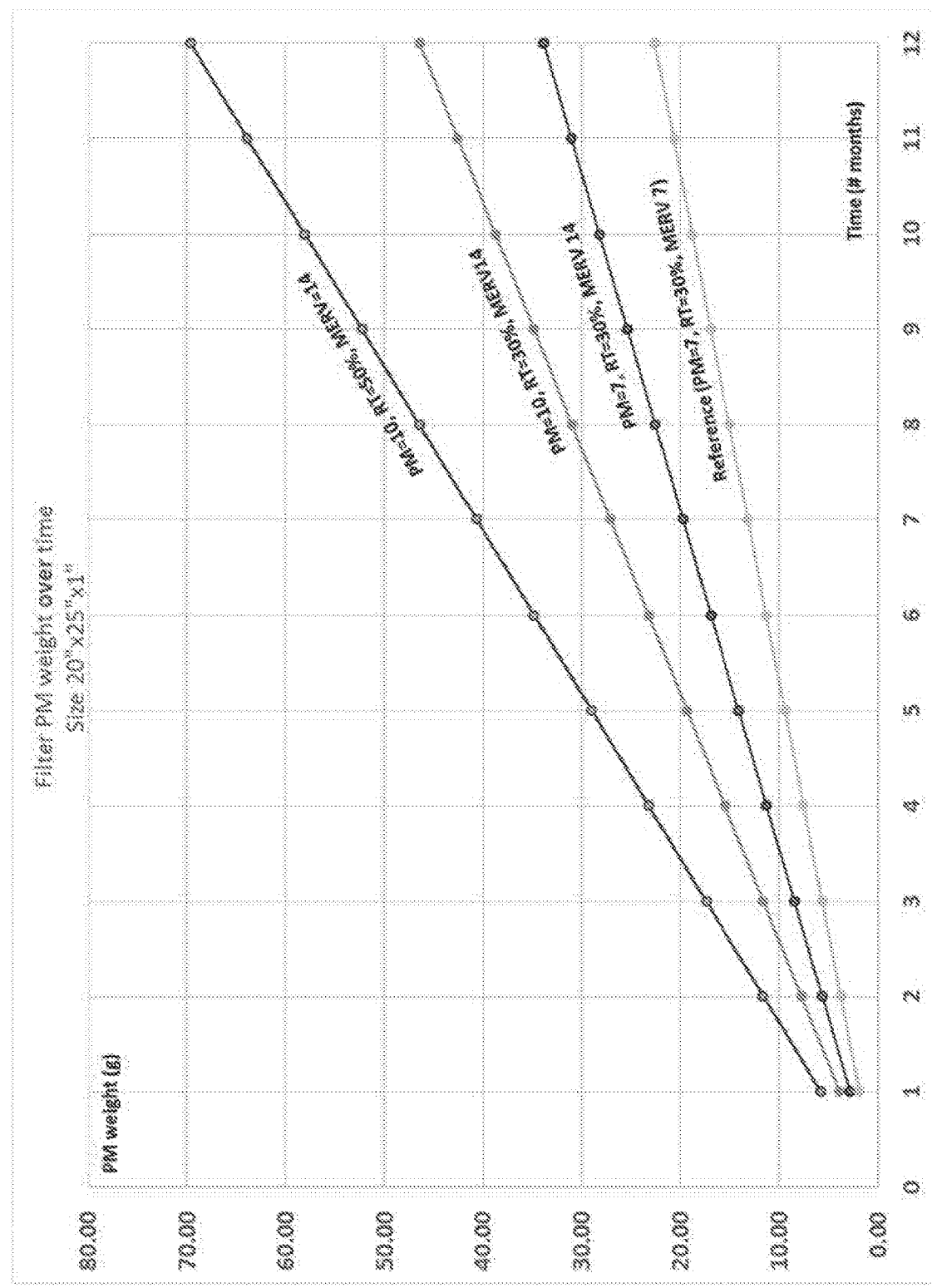
FIG. 14 is a graph showing the estimated weights of different air filters over time.

FIG. 14 is a graph showing the estimated weight of accumulated pollutant in four different air filters over a period of 12 months. The four air filters depicted in FIG. 14 each measure 20 inches by 25 inches by one inch. Three of the filters depicted have a MERV rating of 14 and one of the filters depicted has a MERV rating of 7. As shown in the graph, the pollutant weight in the MERV 14 rated filters increase at a faster rate than in the MERV 7 rated filter, even when subjected to the same operating conditions—an average measured particulate matter (PM) of 7 micrograms/m$^3$ and an average fan run time (RT) of 30%. In addition, the graph shows that an increase in either the average measured particulate matter or the average fan run time will result in an increase in the rate that the filter accumulates pollutants.

FIG. 15 is a table showing the estimated life in months of a MERV 7 rated air filter under various operating conditions. For example, the table shows that when the average particulate matter (PM) is 7 micrograms/m$^3$ and the average fan run time (RT) is 30%, the filter is estimated to reach capacity in 12 months. If either the average measured particulate matter or the average fan run time is increased, the life of the filter decreases due to the increased weight of the filtered particulate matter. For example, when the average measured particulate matter is 13 micrograms/m$^3$ and the average fan run time is 80%, the filter is estimated to reach capacity in 2.4 months.

In some implementations, actual measured air pollutant levels and fan runtimes of an HVAC system may be used to populate a table similar to that shown in FIG. 15. The populated table may be presented to an operator of the HVAC system to inform the operator how the various measured parameters influence filter life. The operator may use the information presented in the populated table to adjust the operation of the HVAC system to meet their specific IAQ needs. For example, the operator may increase the use of a fan-only mode of the HVAC system to reduce air pollutant levels.

FIG. 16 is a table showing the estimated weight of trapped pollutant in a MERV 14 rated air filter measuring 20 inches by 25 inches by one inch over various periods of time. The estimated trapped pollutant weights are based on the filter being used in an air handler of a 3 ton AC unit that has an average air flow of 1100 cubic feet per minute (cfm), which is equivalent to 1868 cubic meters per hour ($m^3$/h). Further, the estimated weights are based on an average particulate matter level of roughly 9.7 micrograms/$m^3$ and an average fan runtime of 30%. The pollutant weights in the table were calculated by multiplying the average particulate matter, the efficiency of the air filter, the airflow, and the average fan run time. Under the above conditions, the filter is estimated to trap 0.13 grams of pollutant each day, 0.91 grams per week, and 3.9 grams per month. Further, after six months of operation, under the above conditions, the filter is estimated to have accumulated 23.4 grams of pollutant and will be near the filter's estimated capacity of 25 grams.

Further Embodiments

Figure 17:
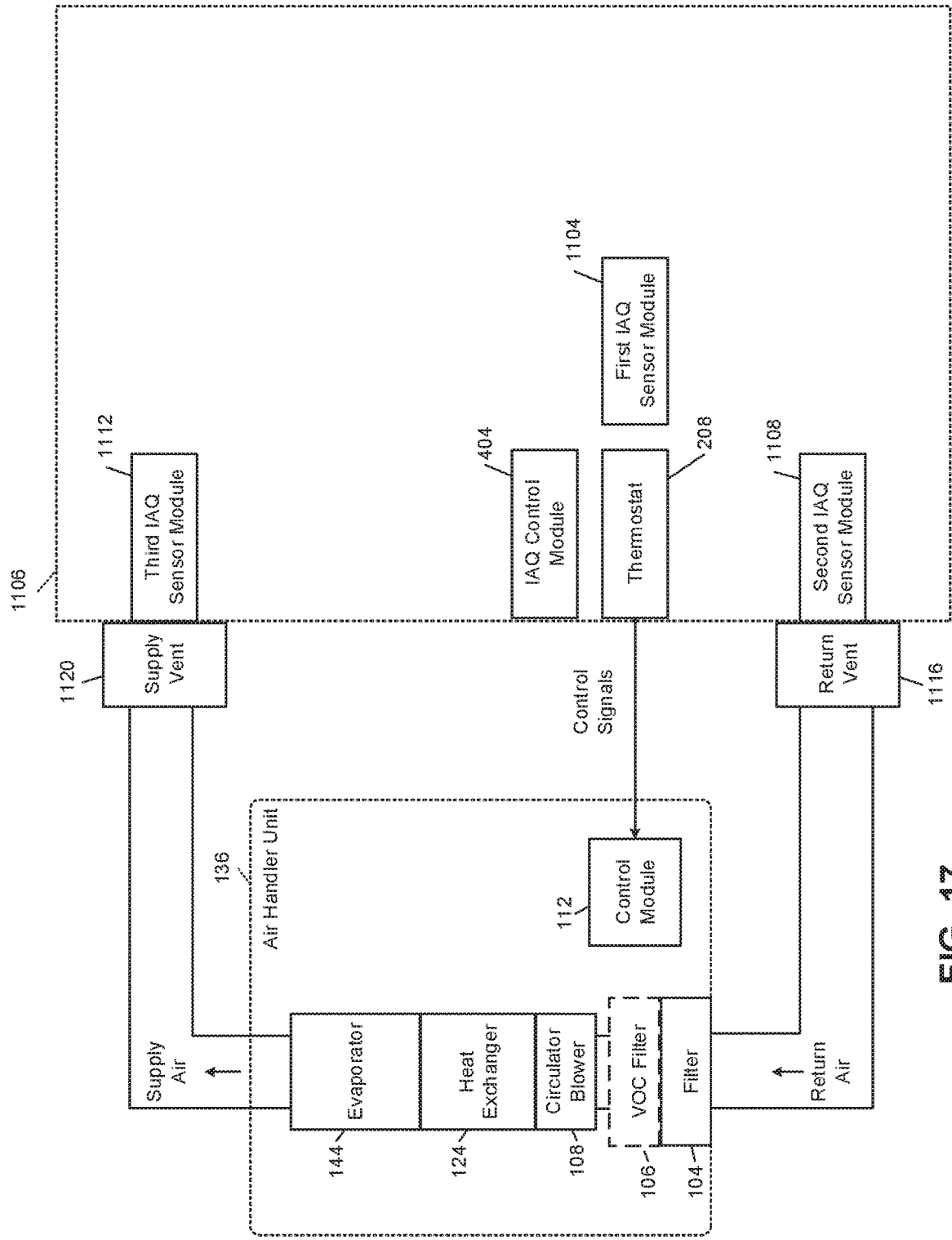
FIG. 17 is a functional block diagram of an example IAQ-based fan control system.

Referring now to FIG. 17, a functional block diagram of an IAQ-parameter-based HVAC control system is presented. In one implementation, the HVAC control system includes the IAQ control module 404, the thermostat 116, and a first IAQ sensor module 1104. The first IAQ sensor module 1104 is located in a room 1106 that is supplied with air from the air handler unit 136 and is configured to measure and transmit air pollutant levels of the room 1106—such as an amount of particulate matter and/or VOCs in the room 1106. The first IAQ sensor module 1104 may be implemented by the IAQ sensor module 304. In various implementations, the first IAQ sensor module 1104 may be located near the thermostat 116. In other implementations, the first IAQ sensor module 1104 may be incorporated into the thermostat 116.

In other implementations, the HVAC control system may include a second IAQ sensor module 1108 and/or a third IAQ sensor module 1112. The second IAQ sensor module 1108 is located near a return vent 1116 that supplies air to the air handler unit 136 or in ductwork leading to the air filter 104. The second IAQ sensor module 1108 is configured to measure and transmit air pollutant levels-such as an amount of particulate matter and/or VOCs—in air upstream of the circulator blower 108. The third IAQ sensor module 1112 is located near a supply vent 1120 that emits air supplied from the air handler unit 136 or within ductwork leading to the supply vent 1120. The third IAQ sensor module 1112 is configured to measure and transmit air pollutant levels in air supplied by the air handler unit 136—in other words, air pollutant levels in air downstream of the circulator blower 108. The second IAQ sensor module 1108 and the third IAQ sensor module 1112 may be IAQ sensors such as the IAQ sensor module 304.

Figure 18:
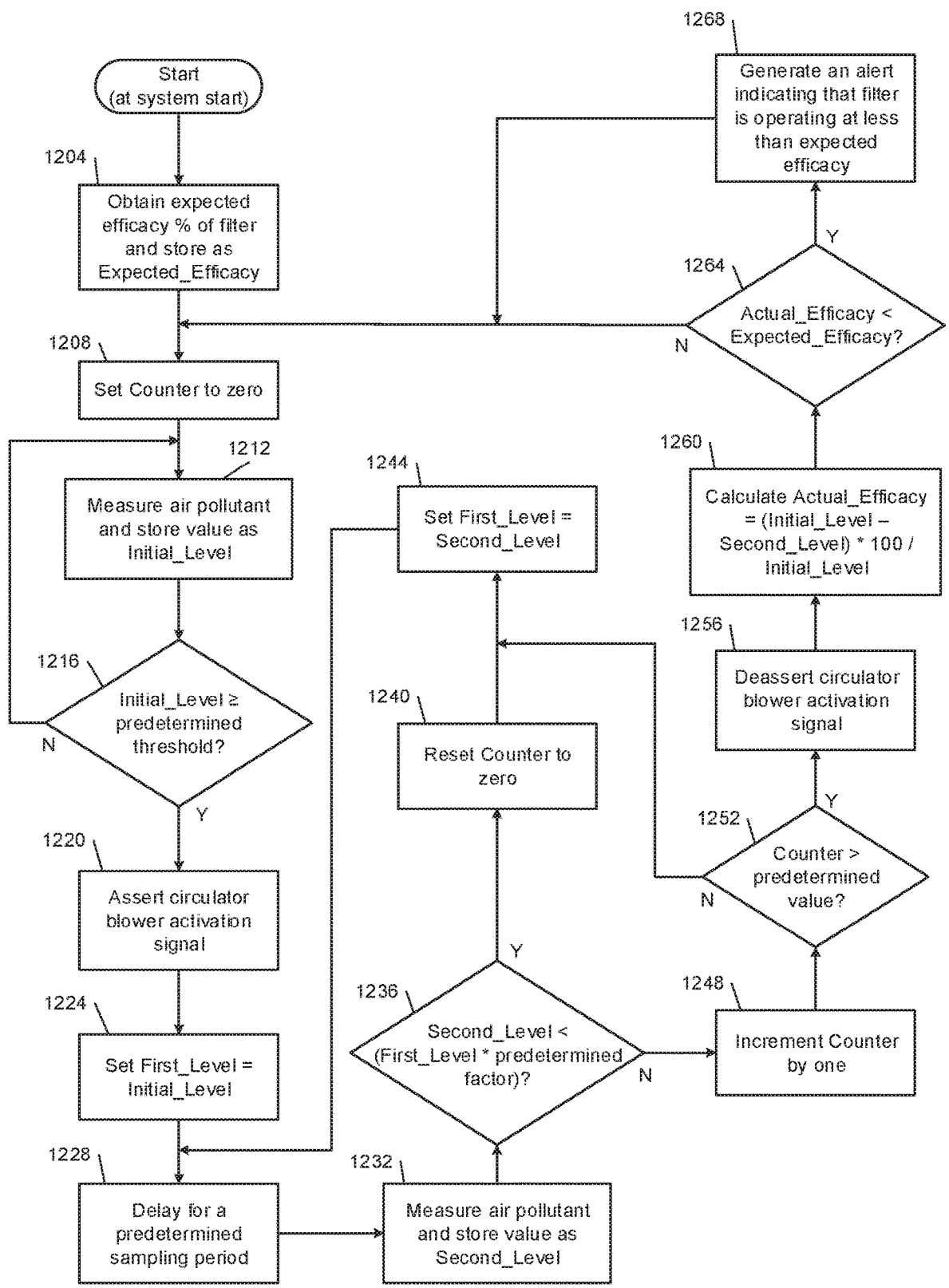
FIG. 18 is a flowchart depicting an example method of controlling a mitigation device based on measurements from a single IAQ sensor.

FIG. 18 is a flowchart depicting an example method of controlling a fan of a mitigation device based on IAQ measurements from a single IAQ sensor, such as the first IAQ sensor module 1104. Although the example method is described below with respect to controlling a circulator blower in an air handler of an HVAC system, such as the circulator blower 108 of the air handler unit 136, the method may be implemented in a single point air purifier or another mitigation device. In an example implementation, control may be performed by the IAQ control module 404. In other implementations, control may be performed by the thermostat 116 or shared by a combination of the IAQ control module 404 and the thermostat 116.

Control begins at 1204 upon startup of the HVAC system. At 1204, control may obtain an expected efficacy of an installed filter and store the value as Expected_Efficacy. For example, the IAQ control module 404 may receive the expected efficacy from the customer device 524 and/or the remote monitoring system 420. Control continues with 1208 where a counter is set to zero. The counter is used to determine a length of time during which a measured pollutant level does not appreciably decrease.

At 1212, control measures a level of air pollutant and stores the value as an initial pollutant level (Initial_Level). For example, the IAQ control module 404 may receive a pollutant level transmitted from the first IAQ sensor module 1104. In other implementations, the IAQ control module may receive a pollutant level transmitted from the second IAQ sensor module 1108 or the third IAQ sensor module 1112. Control then progresses to 1216 where control determines whether the initial pollutant level (Initial_Level) is greater than or equal to a predetermined threshold. If so, control progresses to 1220; otherwise, control returns to 1212.

At 1220, control asserts a circulator blower activation signal. The circulator blower activation signal controls the state of a circulator blower, such as the circulator blower 108. For example, assertion of the circulator blower activation signal causes the control module 112 to actuate one or more switching relays to turn on the circulator blower 108. Deassertion of the circulator blower activation signal may result in the control module 112 deactivating the circulator blower 108. For example, the circulator blower 108 is turned off when the circulator blower activation signal is deasserted and no signal from the thermostat 116 (such as a call for heat, cool, or fan) is directing the circulator blower 108 to be turned on. Control continues with 1224.

At 1224, control sets a first pollutant level (First_Level) equal to the initial pollutant level (Initial_Level). Control then continues with 1228 where control delays for a predetermined sampling period, such as one minute. The delay provides sufficient time for the level of air pollutant to be affected by the mitigation device—in other words, for particulate matter in the air to be trapped in the air filter 104 or for VOCs in the air to be trapped in the VOC filter 106. Control continues with 1232 where a second pollutant level is measured and stored as Second Level. Control continues with 1236.

At 1236, control determines whether the second pollutant level (Second_Level) is less than the product of the first pollutant level (First_Level) and a predetermined factor— for example, whether Second Level is less than 95% of First Level. If 1236 is true, an appreciable decrease in pollutant level has been observed and control progresses to 1240 where the counter is reset to zero. Control then continues with 1244 where the first pollutant level (First_Level) is set equal to the second pollutant level (Second_Level). Control then returns to 1228. If 1236 is false, control transfers to 1248 where the counter is incremented by one, indicating that a sampling period has passed without an appreciable decrease in pollutant level. Control continues with 1252.

At 1252, control determines if the counter is greater than a predetermined value. If so, control progresses to 1256; otherwise, control returns to 1244. The predetermined value represents a number of consecutive sampling periods in which the level of measured air pollutant has not significantly decreased. In an example implementation, the predetermined value is five and the sampling period is one minute—in other words, control determines whether the level of air pollutant has not significantly decreased in any of the last five minutes. In various other implementations, the predetermined value and the predetermined sample period may be set to other, different values, such that control determining that 1252 is true indicates that activation of the fan of the mitigation device is no longer having a significant effect on the measured level of air pollutant.

At 1256, control causes the circulator blower activation signal to be deasserted. Control continues with 1260 where control may calculate an efficacy of the installed filter based on the stored pollutant levels (Actual_Efficacy). For example, the IAQ control module 404 may calculate the value of Actual Efficacy using equation 1 below.

$$\text{Actual\_Efficacy} = \frac{\text{Initial\_Level} - \text{Second\_Level}}{\text{Initial\_Level}} * 100 \quad (1)$$

Control then continues with 1264. At 1264, control determines whether the calculated efficacy of the filter (Actual Efficacy) is less than the expected efficacy of the filter (Expected_Efficacy). If 1264 is true, control progresses to 1268 where control generates an alert indicating that the filter is operating at less than the expected efficacy. For example, the thermostat 116 and/or the customer device 524 may display an indication that the filter is operating at less than the expected efficacy. The displayed indication may include the calculated efficacy of the filter (Actual_Efficacy). If 1264 is false, control returns to 1208.

In some implementations, the pollutant-level-based circulator blower control of FIG. 18 may be used without calculating or evaluating efficacy of the filter. In such implementations, elements 1204 and 1260-1268 would be omitted; then, control in FIG. 18 would begin at 1208 upon startup of the HVAC system and would return from 1256 directly to 1208.

Figure 19:
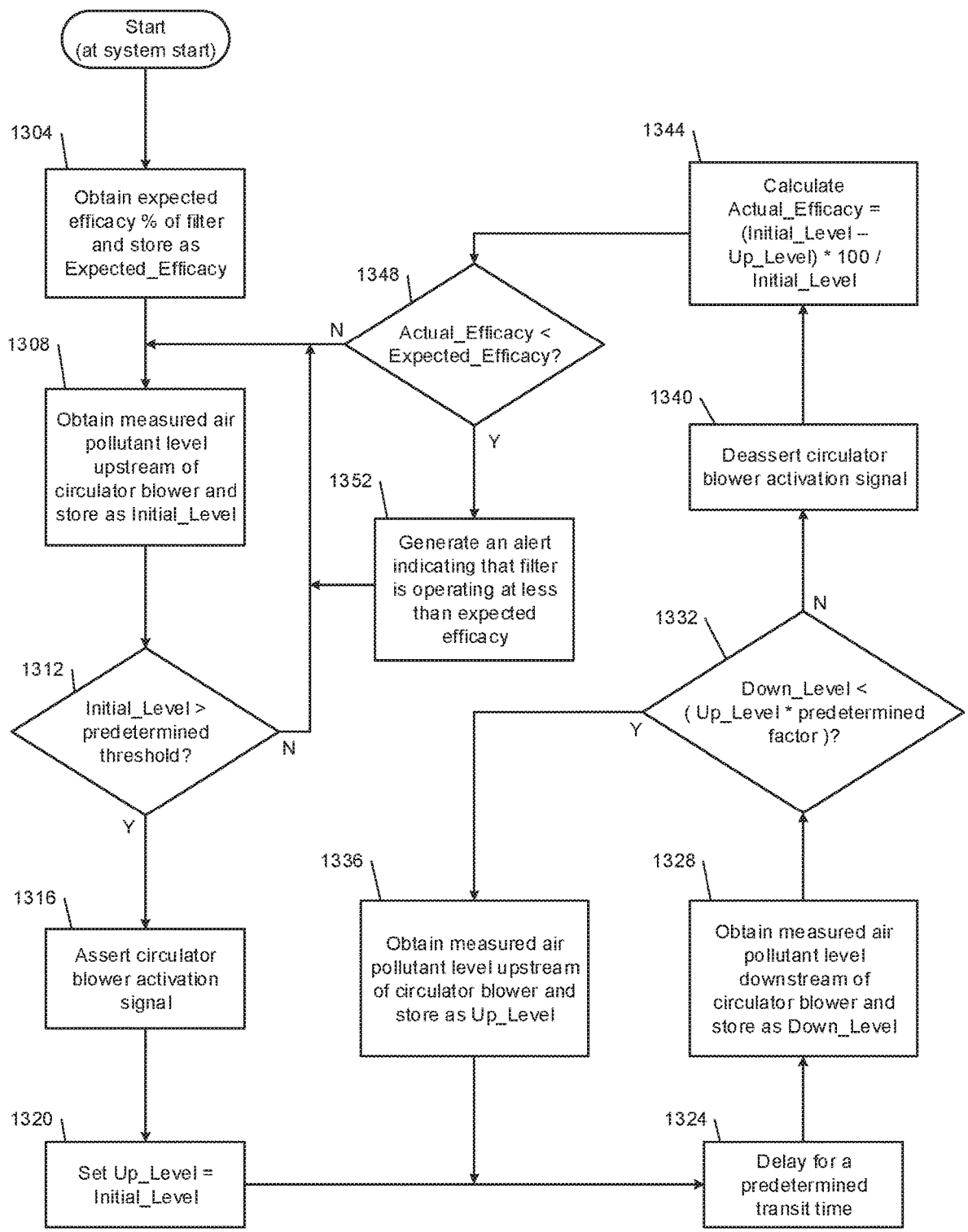
FIG. 19 is a flowchart depicting an example method of controlling a mitigation device based on measurements from two IAQ sensors.

FIG. 19 is a flowchart depicting an example method of controlling a mitigation device based on IAQ measurements from two IAQ sensors—for example, the second IAQ sensor module 1108 and the third IAQ sensor module 1112. In various implementations, control of the mitigation device may be based on the first IAQ sensor module 1104 and the second IAQ sensor module 1108 or based on the first IAQ sensor module 1104 and the third IAQ sensor module 1112.

Although the example method is described below with respect to controlling a circulator blower in an air handler of an HVAC system, such as the circulator blower 108 of the air handler unit 136, the method may be implemented in a single point air purifier or another mitigation device. In an example implementation, control may be performed by the IAQ control module 404. In other implementations, control may be performed by the IAQ control module 404 and/or the thermostat 116.

Control begins at 1304 upon startup of the HVAC system. At 1304, control may obtain an expected efficacy of an installed filter and store the value as Expected_Efficacy. For example, the IAQ control module 404 may receive the expected efficacy from the customer device 524 and/or the remote monitoring system 420. Control continues with 1308 where control measures a level of air pollutant in air upstream of the circulator blower 108—for example, near the supply vent 1120—and stores the value as an initial pollutant level (Initial_Level). In an example implementation, the IAQ control module 404 may receive a pollutant level transmitted by the third IAQ sensor module 1112. In other implementations, the IAQ control module 404 may receive a pollutant level transmitted by the first IAQ sensor module 1104.

Control progresses to 1312 where control determines whether the initial pollutant level (Initial_Level) is greater than a predetermined level. If so, control progresses to 1316; otherwise, control returns to 1308. At 1316, control asserts a circulator blower activation signal. Control continues with 1320 where an upstream pollutant level (Up_Level) is set equal to the initial pollutant level (Initial_Level).

Control then continues with 1324 where control delays for a predetermined transit time, such as one minute. The delay provides sufficient time for air upstream of the circulator blower to be drawn through the air filter 104 or the VOC filter 106. Control continues with 1328 where control measures a level of air pollutant downstream of the circulator blower 108—for example, near the return vent 1116—and stores the value as a downstream pollutant level (Down_Level). In the example implementation, the IAQ control module 404 may receive a pollutant level transmitted by the second IAQ sensor module 1108. In other implementations, the IAQ control module 404 may receive a pollutant level transmitted by the first IAQ sensor module 1104. Control then continues with 1332.

At 1332, control determines whether the downstream pollutant level (Down_Level) is less than the product of the upstream pollutant level (Up_Level) and a predetermined factor—for example, whether Down_Level is less than 95% of Up_Level. If 1332 is true, control progresses to 1336 where control measures a level of air pollutant upstream of the circulator blower 108 and stores the value as Up_Level. Control then returns to 1324. If 1332 is false, control transfers to 1340 where control causes the circulator blower activation signal to be deasserted.

Control continues with 1344 where control may calculate an efficacy of the installed filter based on the stored pollutant levels (Actual_Efficacy). For example, the IAQ control module 404 may calculate the value of Actual Efficacy using equation 2 below.

$$\text{Actual\_Efficacy} = \frac{\text{Initial\_Level} - \text{Up\_Level}}{\text{Initial\_Level}} * 100 \quad (2)$$

Control then continues with 1348 where control determines whether the calculated efficacy of the filter (Actual_Efficacy) is less than the expected efficacy of the filter (Expected_Efficacy). If so, control progresses to 1352 where control generates an alert indicating that the filter is operating at less than the expected efficacy. For example, the thermostat 116 and/or the customer device 524 may display an indication that the filter is operating at a less than expected efficacy. The displayed indication may include the calculated efficacy of the filter (Actual_Efficacy). If 1348 is false, control returns to 1308.

In some implementations, the pollutant-level-based circulator blower control of FIG. 19 may be used without calculating or evaluating the efficacy of the filter. In such implementations, elements 1304 and 1324-1352 may be omitted; control would instead begin in FIG. 19 at 1308 upon startup of the HVAC system and would return from 1340 directly to 1308.

Figure 20:
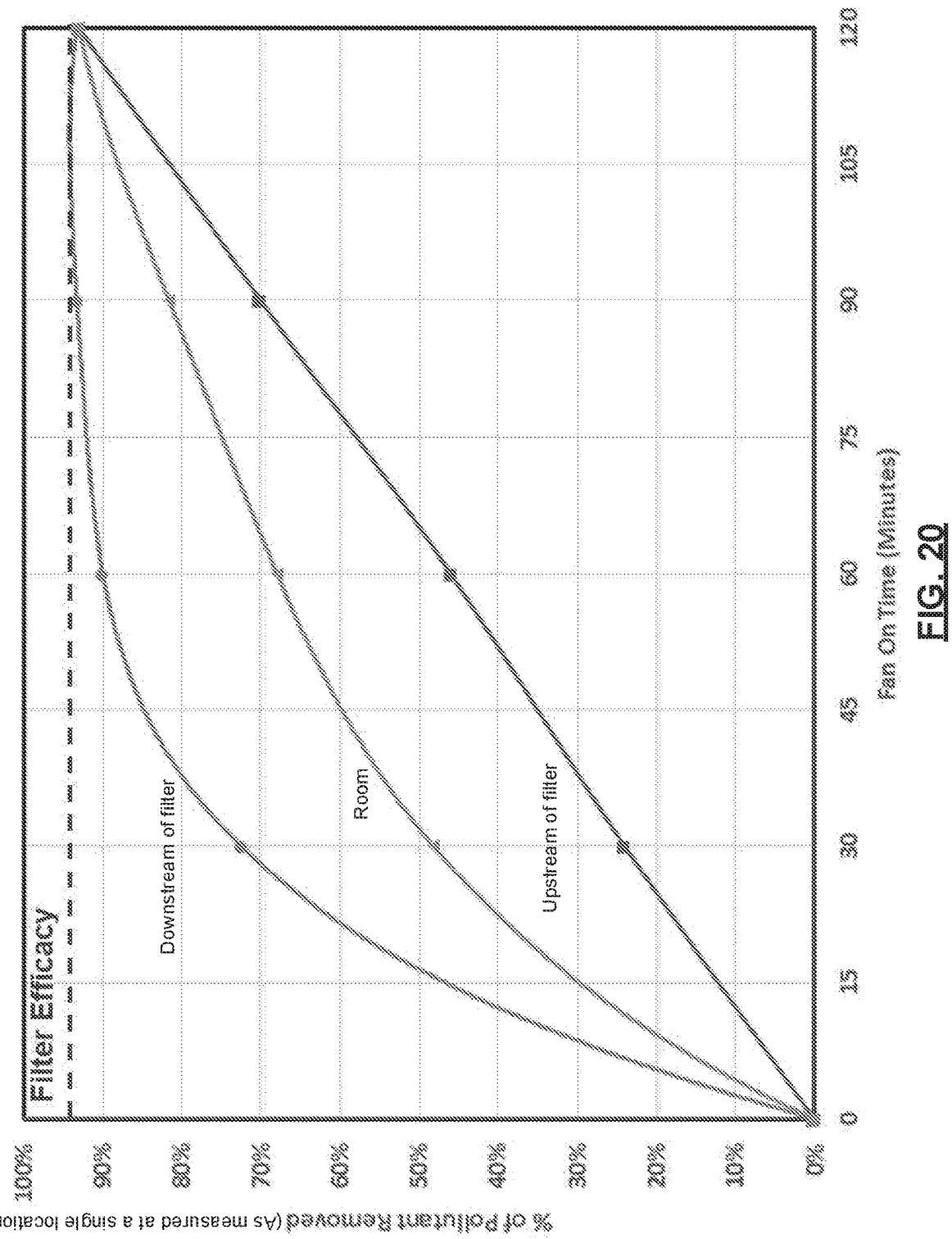
FIG. 20 is a graph showing estimated percentages of pollutant removed by a mitigation device over a period of time.

FIG. 20 is a graph showing an illustrative percentage of pollutant removed by a mitigation device over a period of time. The graph depicts the reduction of pollutant during operation of the mitigation device, as measured at three separate locations: a point downstream of a filter of the migration device, within a room serviced by the mitigation device, and a point upstream of the filter of the mitigation device. In FIG. 20, the efficacy of the filter is the percentage of pollutant removed at the point where the slopes of at least one of the three lines approach zero. As shown in the graph, the slope of the downstream and room lines approach zero after 120 minutes and approximately 94 percent of the measured pollutant has been removed. In the mitigation scenario depicted in FIG. 20, the efficacy of the filter is approximately 94 percent.

Figure 21:
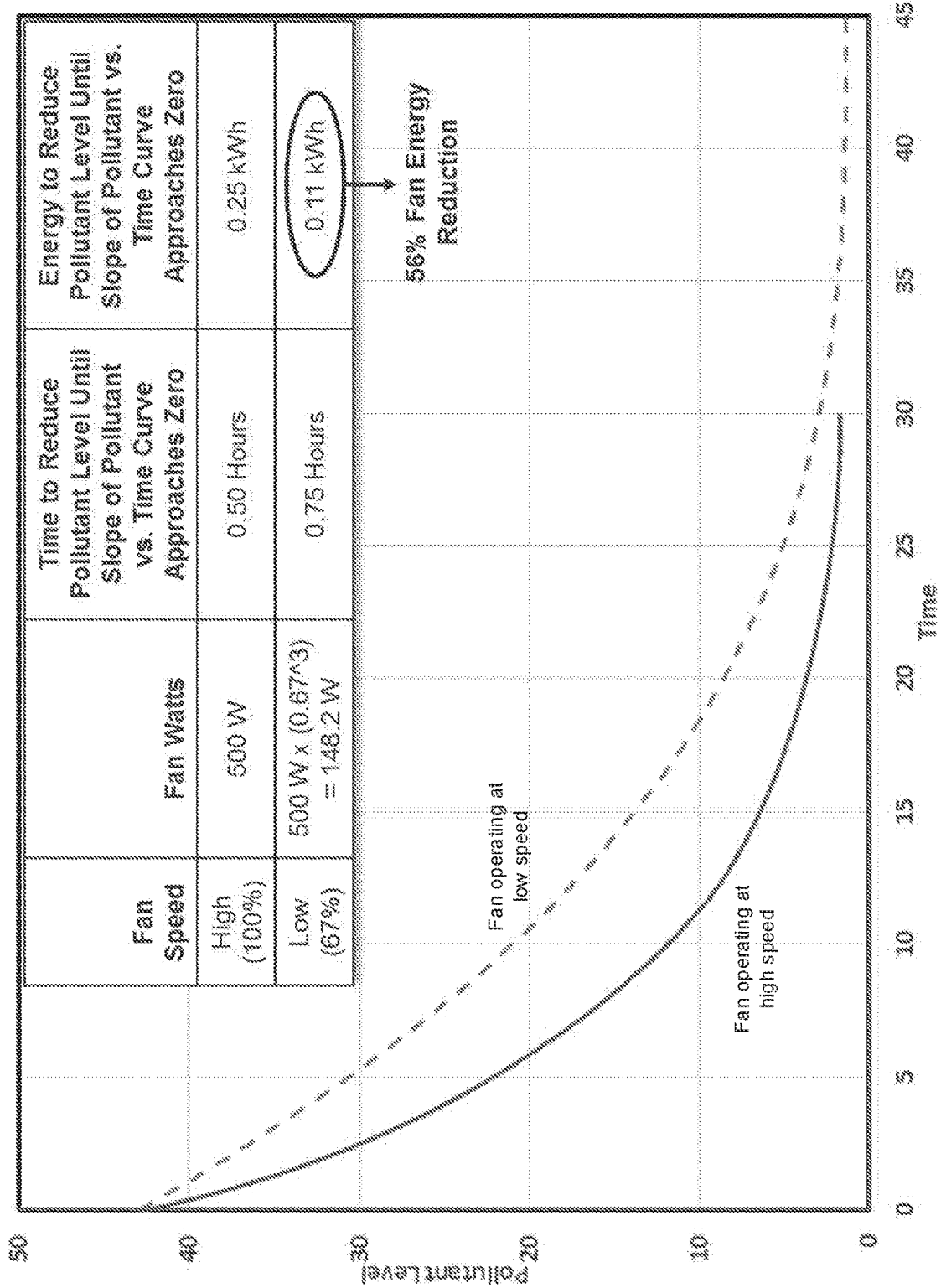
FIG. 21 is a graph showing estimated pollutant levels over a period of time for an HVAC system operating with two different fan speeds.

FIG. 21 is a graph showing illustrative pollutant levels over a period of time for an HVAC system operating at a high fan speed vs a low fan speed. As shown in FIG. 21, operating the fan at high speed for 30 minutes results in the pollutant level reaching a steady state—the point in time at which drawing air through the HVAC system's filter no longer appreciably reduces the measured pollutant level. In comparison, steady state is reached in 45 minutes when the fan is operated at low speed. In this example, operating the fan at high speed consumes 500 watts and requires 0.25 kilowatt hours to reach the steady state, while operating the fan at low speed consumes approximately 148 watts and requires 0.11 kilowatt hours to reach the steady state.

As shown in FIG. 21, while operating the fan at low speed requires a longer runtime in comparison to operating the fan at high speed, the total power required to achieve the same reduction in measured pollutant is less. Accordingly, in various implementations, assertion of the blower activation signal causes the circulator blower 108 to operate at a low speed unless a signal from the thermostat 116 (such as a call for heat, cool, or fan) is directing the circulator blower 108 to operate at a higher speed.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A control system for a mitigation device, the control system comprising:
a processor; and
a computer-readable medium that includes instructions executable by the processor, wherein the instructions include:
monitoring a first measured particulate matter (PM) level of a conditioned space of a building, wherein the first measured PM level includes PM having a first range of sizes;
monitoring a second measured PM level of the conditioned space, wherein the second measured PM level includes PM having a second range of sizes, and wherein the first and second ranges are different but overlapping;
when the first measured PM level is greater than a first predetermined threshold, asserting an activation signal, wherein the activation signal forces operation of a fan of the mitigation device; and
when the second measured PM level is greater than a predetermined percentage of the first measured PM level, asserting the activation signal, wherein the activation signal forces operation of the fan of the mitigation device.

2. The control system of claim 1 wherein:
the first range is bounded at an upper end by a first size and unbounded at a lower end;
the second range is bounded at an upper end by a second size and unbounded at a lower end;
the first size is 2.5 micrometers; and
the second size is 1 micrometer.

3. The control system of claim 1 wherein the instructions include, while the activation signal is asserted:
monitoring the second measured PM level;
de-asserting the activation signal in response to the second measured PM level reaching steady state; and
determining that the second measured PM level has reached steady state in response to the second measured PM level decreasing by less than a predetermined amount in each of a predetermined number of consecutive windows of time.

4. The control system of claim 1 wherein the instructions include, while the activation signal is asserted:
monitoring the first measured PM level and the second measured PM level; and
de-asserting the activation signal in response to concurrence of (i) the first measured PM level being less than a second predetermined threshold and (ii) the second measured PM level being less than a second predetermined percentage of the first measured PM level.

5. The control system of claim 1 wherein the instructions include, while the activation signal is asserted:
monitoring the first measured PM level, the second measured PM level, and a third measured PM level, wherein the third measured PM level includes PM having a third range of sizes, wherein the third range is different than the first range and the second range; and de-asserting the activation signal in response to concurrence of (i) the first measured PM level being less than a second predetermined threshold, (ii) the second measured PM level being less than a second predetermined percentage of the first measured PM level, and (iii) the third measured PM level being less than a third predetermined threshold.

6. The control system of claim 1 wherein the instructions include:
determining a difference between the first measured PM level at a first time and at a second time, wherein the first time corresponds to the assertion of the activation signal and the second time corresponds to subsequent de-assertion of the activation signal; and
in response to the difference being less than a predetermined removal expectation, generating an alert indicating low PM removal.

7. The control system of claim 1 wherein:
monitoring the first measured PM level includes receiving values of the first measured PM level from an indoor air quality (IAQ) sensor module; and
monitoring the second measured PM level includes receiving values of the second measured PM level from the IAQ sensor module.

8. The control system of claim 1 wherein:
the mitigation device is a heating, ventilation, and air conditioning (HVAC) system of the building; and
the activation signal forces operation of a circulator blower of the HVAC system of the building.

9. The control system of claim 8 wherein the instructions include:
determining an airflow associated with the circulator blower;
determining a first removal efficiency of a filter of the HVAC system with respect to the first range of sizes of PM;
determining a second removal efficiency of the filter with respect to the second range of sizes of PM;
determining a retention threshold corresponding to a capacity of the filter;
while the circulator blower is operating, incrementing a weight of filtered pollutant based on (i) the airflow, (ii) a product of the first measured PM level and the first removal efficiency, and (iii) a product of the second measured PM level and the second removal efficiency; and
in response to the weight exceeding the retention threshold, generating an alert suggesting replacement of the filter.

10. The control system of claim 1 wherein the mitigation device is one of an air purifier, a ventilator, and a humidifier.

11. A method of controlling a mitigation device, the method comprising:
monitoring a first measured particulate matter (PM) level of a conditioned space of a building, wherein the first measured PM level includes PM having a first range of sizes;
monitoring a second measured PM level of the conditioned space, wherein the second measured PM level includes PM having a second range of sizes, and wherein the first and second ranges are different but overlapping;
when the first measured PM level is greater than a first predetermined threshold, asserting an activation signal, wherein the activation signal forces operation of a fan of the mitigation device; and
when the second measured PM level greater than a predetermined percentage of the first measured PM level, asserting the activation signal, wherein the activation signal forces operation of the fan of the mitigation device.

12. The method of claim 11 wherein:
the first range is bounded at an upper end by a first size and unbounded at a lower end;
the second range is bounded at an upper end by a second size and unbounded at a lower end;
the first size is 2.5 micrometers; and
the second size is 1 micrometer.

13. The method of claim 11 further comprising, while the activation signal is asserted:
monitoring the second measured PM level;
de-asserting the activation signal in response to the second measured PM level reaching steady state; and
determining that the second measured PM level has reached steady state in response to the second measured PM level decreasing by less than a predetermined amount in each of a predetermined number of consecutive windows of time.

14. The method of claim 11 further comprising, while the activation signal is asserted:
monitoring the first measured PM level and the second measured PM level; and
de-asserting the activation signal in response to concurrence of (i) the first measured PM level being less than a second predetermined threshold and (ii) the second measured PM level being less than a second predetermined percentage of the first measured PM level.

15. The method of claim 11 further comprising, while the activation signal is asserted:
monitoring the first measured PM level, the second measured PM level, and a third measured PM level, wherein the third measured PM level includes PM having a third range of sizes, wherein the third range is different than the first range and the second range; and
de-asserting the activation signal in response to concurrence of (i) the first measured PM level being less than a second predetermined threshold, (ii) the second measured PM level being less than a second predetermined percentage of the first measured PM level, and (iii) the third measured PM level being less than a third predetermined threshold.

16. The method of claim 11 further comprising:
determining a difference between the first measured PM level at a first time and at a second time, wherein the first time corresponds to the assertion of the activation signal and the second time corresponds to subsequent deassertion of the activation signal; and
in response to the difference being less than a predetermined removal expectation, generating an alert indicating low PM removal.

17. The method of claim 11 wherein:
monitoring the first measured PM level includes receiving values of the first measured PM level from an indoor air quality (IAQ) sensor module; and
monitoring the second measured PM level includes receiving values of the second measured PM level from the IAQ sensor module.

18. The method of claim 11 wherein:
the mitigation device is a heating, ventilation, and air conditioning (HVAC) system of the building; and the activation signal forces operation of a circulator blower of the HVAC system of the building.

19. The method of claim 18 further comprising:

determining an airflow associated with the circulator blower;

determining a first removal efficiency of a filter of the HVAC system with respect to the first range of sizes of PM;

determining a second removal efficiency of the filter with respect to the second range of sizes of PM;

determining a retention threshold corresponding to a capacity of the filter;

while the circulator blower is operating, incrementing a weight of filtered pollutant based on (i) the airflow, (ii) a product of the first measured PM level and the first removal efficiency, and (iii) a product of the second measured PM level and the second removal efficiency; and in response to the weight exceeding the retention threshold, generating an alert suggesting replacement of the filter.

20. The method of claim 11 wherein the mitigation device is one of an air purifier, a ventilator, and a humidifier.

* * * * *